US012240145B2

(12) United States Patent
Riccobene et al.

(10) Patent No.: US 12,240,145 B2
(45) Date of Patent: *Mar. 4, 2025

(54) ARTICULATING COMPOSITE SURFACE COVERING MAT AND METHOD OF MAKING

(71) Applicant: Riccobene Designs LLC, Albuquerque, NM (US)

(72) Inventors: Dominic T. Riccobene, Los Ranchos, MN (US); Thomas S. Riccobene, Jr., Los Ranchos, MN (US)

(73) Assignee: RICCOBENE DESIGNS LLC, Albuquerque, NM (US)

( * ) Notice: Subject to any disclaimer, the term of this patent is extended or adjusted under 35 U.S.C. 154(b) by 86 days.

This patent is subject to a terminal disclaimer.

(21) Appl. No.: 17/817,741

(22) Filed: Aug. 5, 2022

(65) Prior Publication Data

US 2022/0371221 A1 Nov. 24, 2022

Related U.S. Application Data

(63) Continuation of application No. 16/895,053, filed on Jun. 8, 2020, now Pat. No. 11,413,786, which is a continuation of application No. 16/365,894, filed on Mar. 27, 2019, now Pat. No. 10,682,786, which is a continuation-in-part of application No. PCT/US2018/031495, filed on May 8, 2018.

(60) Provisional application No. 62/504,343, filed on May 10, 2017.

(51) Int. Cl.

| | |
|---|---|
| ***B28B 7/00*** | (2006.01) |
| ***B28B 1/14*** | (2006.01) |
| ***E01C 5/06*** | (2006.01) |
| ***E02D 17/20*** | (2006.01) |
| ***E02D 31/06*** | (2006.01) |

(52) U.S. Cl.

CPC ................ *B28B 7/007* (2013.01); *B28B 1/14* (2013.01); *E01C 5/06* (2013.01); *E02D 17/20* (2013.01); *E02D 31/06* (2013.01)

(58) Field of Classification Search

CPC ........... B28B 1/14; B28B 7/007; E02D 17/20; E02D 31/06; E01C 5/06

USPC ................................................ 404/34–46, 72

See application file for complete search history.

(56) References Cited

U.S. PATENT DOCUMENTS 5,501,753 A * 3/1996 Stark ..................... E02D 31/004 210/170.07
6,793,858 B2 * 9/2004 Motz ................... B28B 23/0012 264/297.6
11,000,970 B2 * 5/2021 Gordon ............... C04B 40/0067
11,097,446 B2 * 8/2021 Motz ................... B28B 23/0012
2008/0274306 A1 * 11/2008 Moore .................. B44C 5/0453 264/308

(Continued)

*Primary Examiner* — Raymond W Addie

(74) *Attorney, Agent, or Firm* — Greer, Burns & Crain, Ltd

(57) ABSTRACT

An articulating composite surface covering mat and process of forming the mat are provided. The mat has multiple units having a regular, natural or irregular appearance, and each unit a flexible geogrid extending therethrough. A method of forming the mat includes forming the mat upside-down on a bottom surface of a bottom mold, placing the top mold over the bottom mold to form the mold assembly, locating a geogrid in the mold assembly, latching the mold assembly together with magnets, and adding the filler to the mold assembly.

2 Claims, 46 Drawing Sheets

(56) References Cited

U.S. PATENT DOCUMENTS

| | | | | |
|---|---|---|---|---|
| 2018/0187405 | A1* | 7/2018 | Hamel | B28B 7/346 |
| 2019/0360201 | A1* | 11/2019 | Matys | B28B 1/14 |

* cited by examiner

56

ARTICULATING COMPOSITE SURFACE COVERING MAT AND METHOD OF MAKING

RELATED APPLICATIONS

This application is a continuation of U.S. application Ser. No. 16/895,053, filed Jun. 8, 2020, which is a continuation of U.S. application Ser. No. 16/365,894, filed Mar. 27, 2019, now U.S. Pat. No. 10,682,786, issued Jun. 16, 2020, which is a continuation-in-part of Patent Cooperation Treaty (PCT) International Application PCT/US2018/031495 filed on May 8, 2018, which claims the benefit of U.S. Provisional Application No. 62/504,343 filed May 10, 2017. The aforementioned applications are expressly incorporated herein by reference in their entirety and for all purposes.

TECHNICAL FIELD

The present invention relates generally to blocks, patios, fences, walls, retaining walls or surface covering mats, and particularly to surface covering mats for use in landscaping or for other site development needs, and more particularly to a surface is covering mat that is used over stabilized hills and slopes.

BACKGROUND ART

Surface covering mats are often comprised of stone, brick, plastic, or concrete that are arranged to form a covering over a surface. These surface covering mats may be utilized for many reasons including as a surface for walking, for vehicular traffic, as a decorative element or as a protective surface. Surface covering mats that are predominately concrete or other rigid materials are generally not flexible, are difficult to install, or are unable to articulate over uneven surfaces, particularly on slopes. Terrain on a development site often includes hills and slopes that may be constructed of relatively stable or stabilized engineered soil that requires additional protection from elements such as wind, rain, and snow to stay in place over time and with little added maintenance. Conventional protective applications for these uneven surfaces are generally difficult and/or expensive to install, aesthetically unpleasing or difficult to maintain. Conventional methods typically utilize plants and grasses, hand placed natural stone, manufactured block, mechanically placed block or a mechanically sprayed-on concrete shell such as gunite.

Utilizing plants and grasses in conjunction with surface coverings on slopes is sometimes aesthetically desirable. Additionally, the roots of plants help to protect the surface by holding it together. Depending on site conditions and geographic regions, plants are difficult to grow and maintain due to location, cold, heat, lack of moisture or other conditions.

When utilizing hand placed natural stone, every stone is a different shape size and thickness requiring them to be handled individually. Each stone must be carefully fitted together and embedded into the soil to help prevent it from sliding or rolling and is also to achieve the desired visual aesthetic in the exposed surface. Hand placed stonework is slow to install and also generally requires the installer to be a skilled craftsman with knowledge of stone cutting, fitting and placement. For these and other reasons, hand placing stone is generally known to be difficult and slow, especially on slopes, making the work expensive.

When manufactured blocks are used, they are normally used as ballast over geogrid to hold it in place. Geogrids, used widely in Civil Engineering applications to provide tensile reinforcement of soil, are geosynthetic materials made from polymers such as polypropylene, polyethylene or polyester which are formed as an open grid that allow soil to strike through the apertures allowing the two materials to interlock together to give a composite behavior. In a typical installation, geogrid is first applied directly over the slopes and then covered with protective ballasting elements such as gravel, stone or blocks. On slopes, gravel has limited appeal unless the grid contains large holding pockets to contain the gravel, making the grid expensive. Additionally, these installations are sometimes considered unsightly and difficult to install. Stone is rarely used because of its irregular nature. Manufactured block requires that each block be hand placed or, if mechanical installation is used, the blocks need to be cabled together prior to installation. This requires the block to first be individually placed on a flat surface then cabled together into large mats. These mats then must be moved to the area of installation by using a crane to lift the mats onto flatbed trucks for transport to the installation site where another crane must lift the mats into position. These mats are large and their final cabled shapes require them to be pre-engineered to fit specific places on the site.

When gunite is used, a wire or plastic mesh is applied over the slope and then concrete is sprayed over the mesh, providing a thin yet solid surface covering held together by the mesh. The process is fast, and compared to other methods, comparably inexpensive. However, the visual appearance of gunite is not usually desirable. Further, since application of gunite results in a solid shell over the surface, sometimes erosion may happen in the soil beneath the gunite covering which cannot be seen from the surface. This is a problem because if the erosion beneath the shell removes soil, the gunite can crack or collapse which leaves the slope unsightly, potentially dangerous and expensive to repair.

SUMMARY

In accordance with the present invention, an articulating composite surface covering mat includes multiple units having a natural or irregular appearance and formed of a filler, each having an irregular peripheral shape and a flexible geogrid extending between and through the units. Irregular gaps are formed between the multiple units and have irregular spacing as measured horizontally at the geogrid. A peripheral surface of the mat is defined by segments of peripheral surfaces of at least some of the multiple units. The peripheral surface of the mat has at least three sides, at least two sides including the segments of the peripheral surfaces of the multiple units defining S-curve geometry. At least two of the three sides of the mat has a center point, and a first segment of the side is a 180-rotation of a second segment of the side about the center point.

A process for the formation of an articulating composite surface covering mat that includes spaced apart units that are held together by a geogrid includes the step of disposing a bottom mold on a substantially level surface, where the bottom mold has a generally planar bottom surface that defines the top surface of the formed mat, and the where the bottom mold has transverse walls extending from the bottom surface. Additional steps include locating a geogrid onto at least one cavity that is defined by the bottom mold or a top mold or a combination of both the bottom and the top molds, such that the geogrid is generally horizontal, where the geogrid extends into each of the spaced apart units to be formed. Another step includes placing the top mold over the bottom mold to form the mold assembly, where the bottom mold and the top mold define the cavity therebetween for receiving the geogrid, and where the top mold has a generally planar top surface and transverse walls extending therefrom. A further step includes sealingly engaging at least a portion of the transverse walls of the top mold with corresponding transverse walls of the bottom mold at a location of no geogrid therebetween, and adding a filler to the mold assembly through openings in the top mold.

A process for the formation of multiple articulating composite surface covering mats, where each mat includes spaced apart units that are held together by a geogrid and define a mat peripheral surface, includes the steps of disposing a bottom mold on a substantially level surface, where the bottom mold has a generally planar bottom surface that defines the top surface of the formed mat, and transverse walls extending from the bottom surface of the bottom mold. A first portion of the transverse walls in the bottom mold define the spaced apart units to be formed, and a second portion of the transverse walls in the bottom mold define the mat peripheral surfaces of the multiple mats to be formed. Further steps include locating a geogrid horizontally onto at least one cavity defined by the bottom mold or the top mold or a combination of both the bottom and top molds, where the geogrid extends over the first portion of transverse walls defining the spaced apart units and into each of the spaced apart units within each of the multiple mats, but where the geogrid does not extend over the second portion of the transverse walls defining the peripheral surfaces of the multiple mats to be formed. Additional steps include placing the top mold over the bottom mold to form the mold assembly, where the bottom mold and the top mold define the cavity therebetween for receiving the geogrid, and where the top mold has a generally planar top surface and transverse walls extending therefrom. More steps include engaging the transverse walls of the top mold with the second portion of transverse walls of the bottom mold at the peripheral surface of the multiple mats to be formed, and adding the filler to the mold assembly at an opening in the generally planar top surface of the top mold.

A process for the formation of differently shaped articulating composite surface covering mats which each comprise spaced apart units that are held together by a geogrid is also provided. The process includes providing multiple mold assemblies that each define differently shaped spaced apart units, where the mold assemblies have a top mold and a bottom mold each having transverse walls that include cavity walls and sealing walls. The process also includes placing a universal geogrid having positive space and negative space into one of the multiple mold assemblies, where the universal geogrid is received in one of the multiple mold assemblies such that the positive space of the universal geogrid is received in a cavity defined between the cavity walls of at least one of the top mold and the bottom mold, and the negative space of the universal geogrid at least one of located at the engagement of the sealing walls of the top mold and the bottom mold. Further, the universal geogrid is receivable into at least two of the multiple mold assemblies that define differently shaped spaced apart units such that the positive space of the universal geogrid is received in the cavity defined between the cavity walls of at least one of the top mold and the bottom mold, and the negative space of the universal geogrid is located at the engagement of the sealing walls of the top mold and the bottom mold.

DETAILED DESCRIPTION

Figure 1:
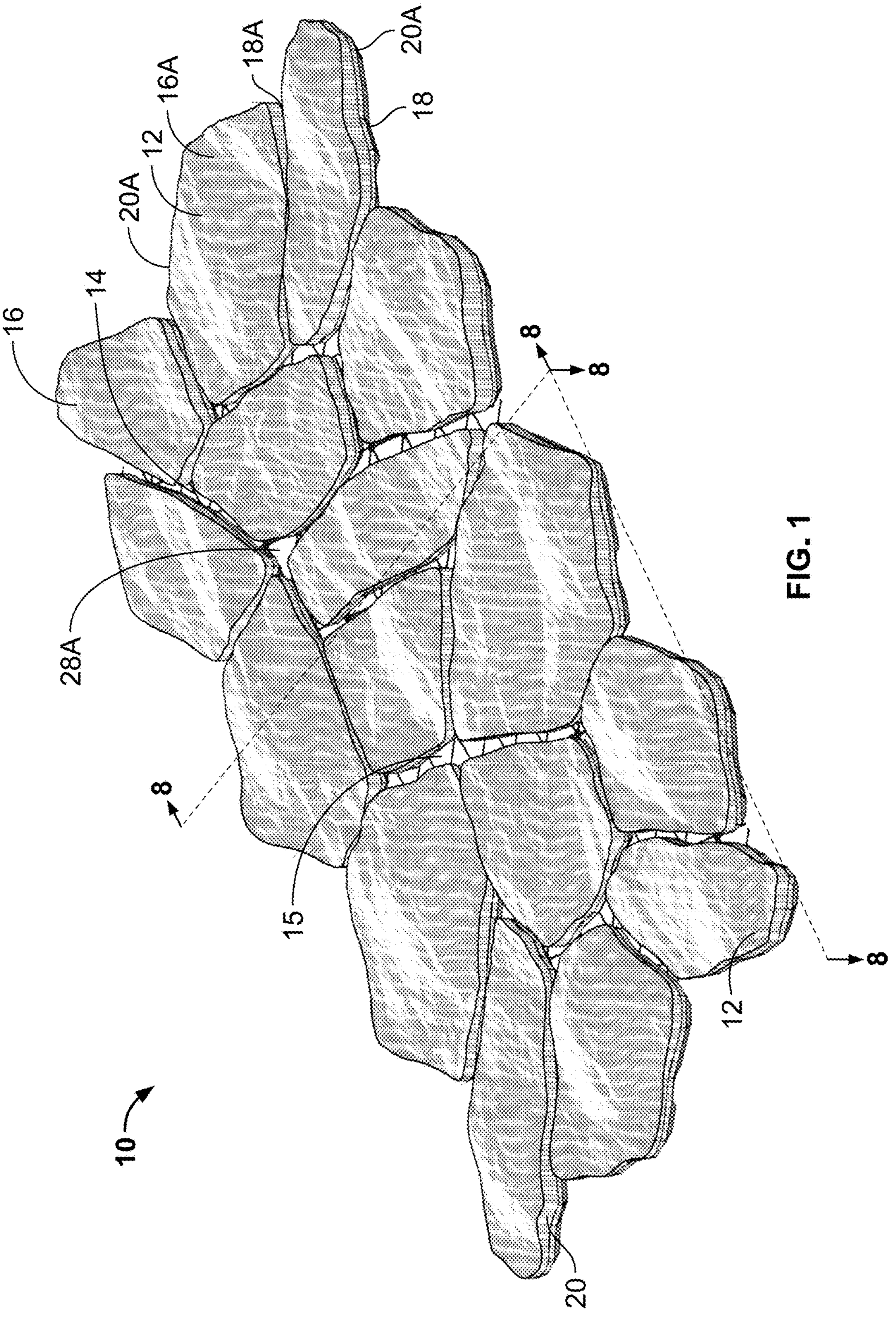
FIG. 1 is a top perspective view of an articulating composite surface covering mat, the mat being shaded to indicate an irregular surface texture.

FIGS. 1-51 depict the preferred embodiments of articulating composite surface covering mats (herein "mats") and a method of making mats.

Referring to FIG. 1-8, a first embodiment of mat is indicated generally at 10. The mat 10 includes multiple irregularly shaped units 12. By the term "irregularly shaped" it is meant that the peripheral side of the unit 12 appears jagged or roughhewn, or comprises complex curves, and is not a straight line or a simple curve, e.g., a circular arc. However, it should be understood that an irregularly shaped side might comprise a multiplicity of straight-line segments angled with respect to each other, such that the general appearance of the side is irregular. Optionally, one or more portions of sides could consist of or include a straight segment or a regular geometric curve.

All of the units 12 are at least partially embedded horizontally with at least one section of geogrid 14. The geogrid 14 provides a flexible connection between the individual units 12 forming the mat 10. The mat 10 is relatively thin and flexible, is of a generally consistent thickness, and can perform as a structurally sound protective shell over stabilized soil or substrate S. In use, multiple mats 10 are placed next to each other to form an overall surface covering.

Figure 4:
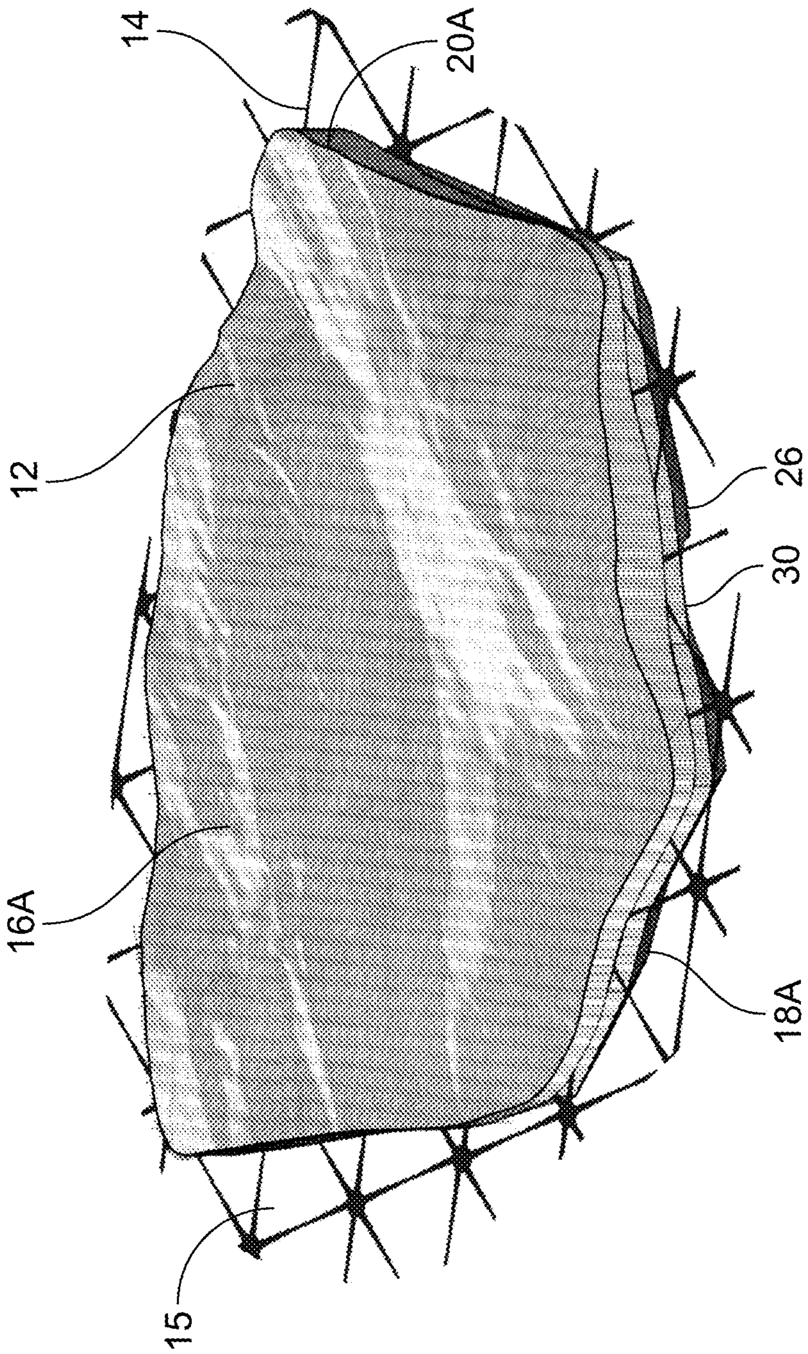
FIG. 4 is a top perspective view of an example embodiment of interior unit of the surface covering mat having an embedded section of geogrid running horizontally through the unit and extending out from its sides, the unit being shaded to indicate an irregular surface texture.
Figure 5:
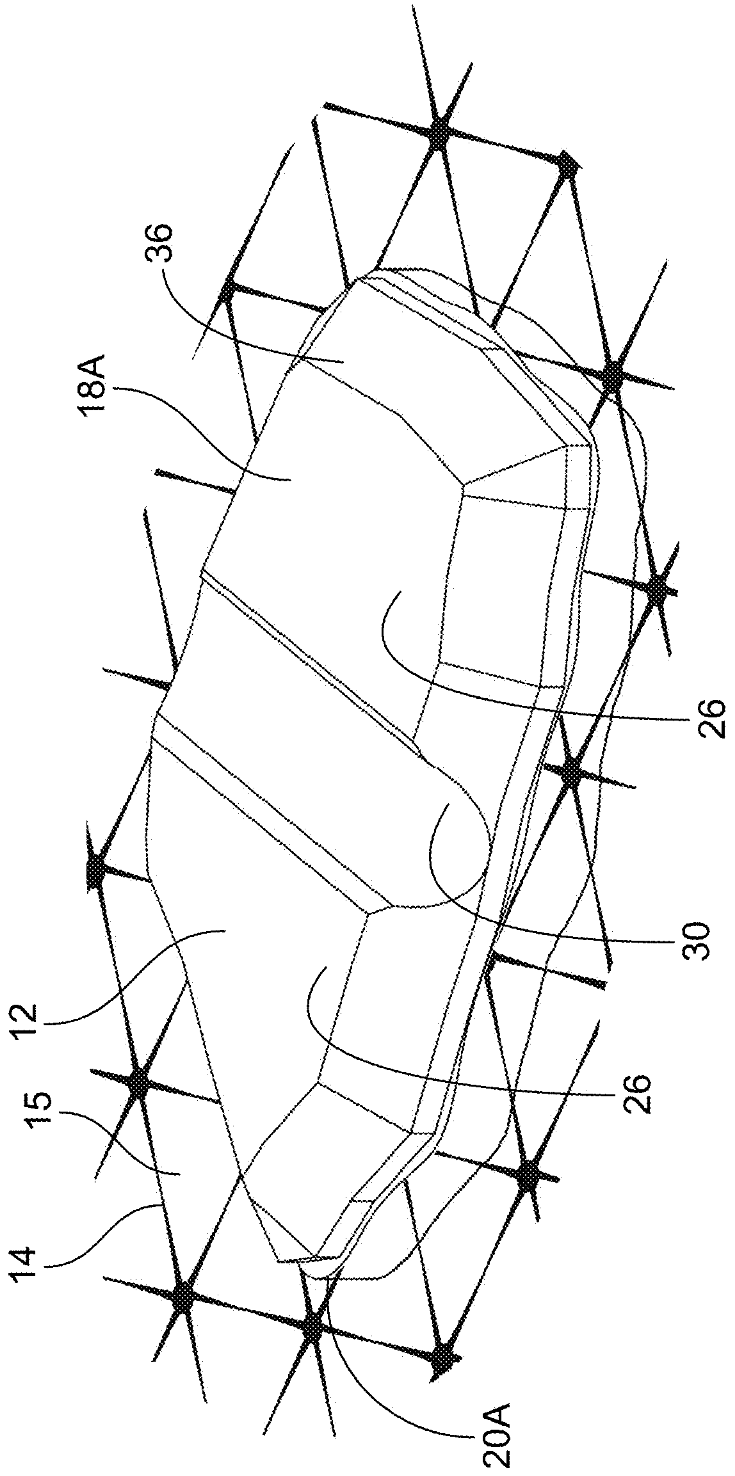
FIG. 5 is a bottom perspective view of an example embodiment of interior unit of the surface covering mat having the embedded section of geogrid running horizontally through the unit and having two cleats that are formed on a bottom surface of the unit.
Figure 6:
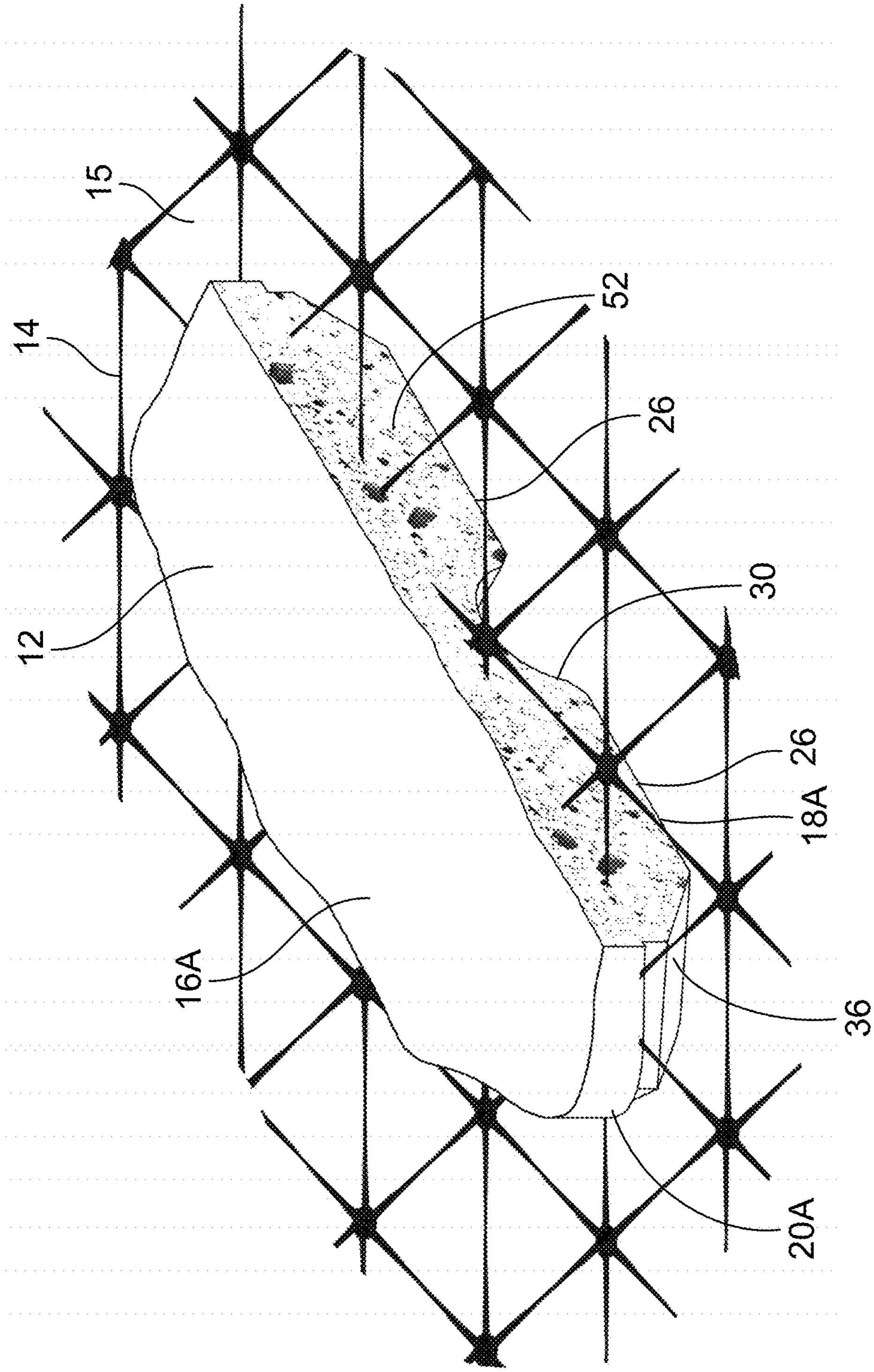
FIG. 6 is a cross-section view of an example embodiment of interior unit of the surface covering mat and shows the embedded section of geogrid running horizontally through and extending out from the unit, the unit having cleats on the bottom surface.
Figure 7:
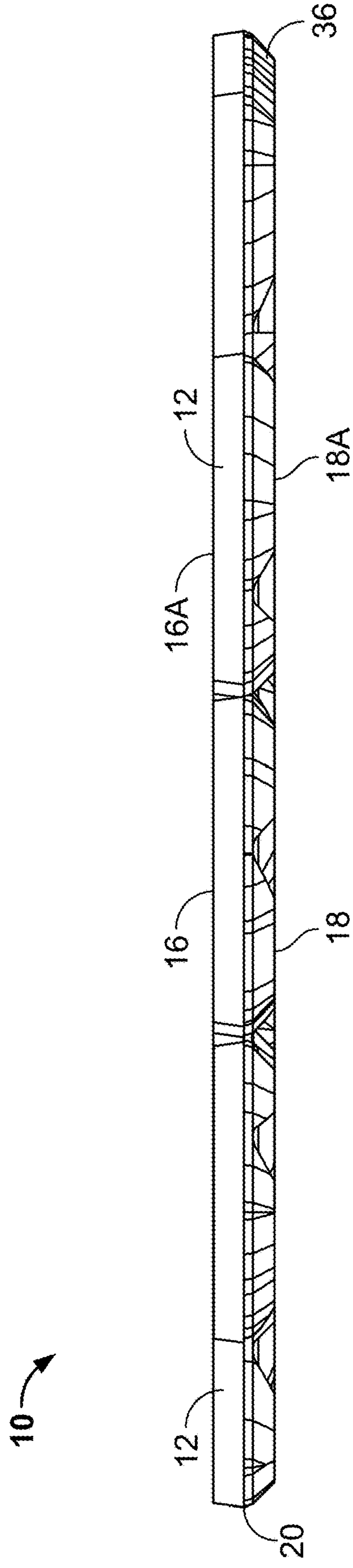
FIG. 7 is a side elevation view of an example embodiment of surface covering mat.

The mat 10 has a generally planar configuration that includes a top surface 16, a bottom surface 18 opposite of the top surface, and a peripheral surface 20 extending substantially perpendicularly between the top surface and the bottom surface. Likewise, each unit 12 includes a top surface 16A, a bottom surface 18A and a peripheral surface 20A. The top surface 16, 16A is preferably irregular, and more preferably has a stone texture or other surface textures to provide a natural appearance (as best seen in FIG. 4). Further, the top surface 16A can include false joints. Alternatively, for some applications, the top surface 16A may be smooth.

The peripheral surface 20 of the mat 10, as viewed from a top plan view, appears irregularly shaped. The peripheral surface 20 of the mat 10 generally defines a rectangular or square shape 29 (seen annotated in FIG. 2). However, as will be discussed below, the mat 10 can have at least three sides. In the preferred embodiment of FIG. 2, there are four total sides including two sides 22 and two ends 24. Each side 22, 24 consists of segments of peripheral surfaces 20A of some of the units 12 located at the exterior of the mat. It is contemplated that the mat 10 may contain both exterior and interior units 12, or may only contain exterior units 12 (i.e. all units 12 in the mat 10 define the peripheral surface 20 of the mat). The segments of the peripheral surfaces 20A of the exterior units 12 form a center rotation geometry, or "S-curve".

Figure 2:
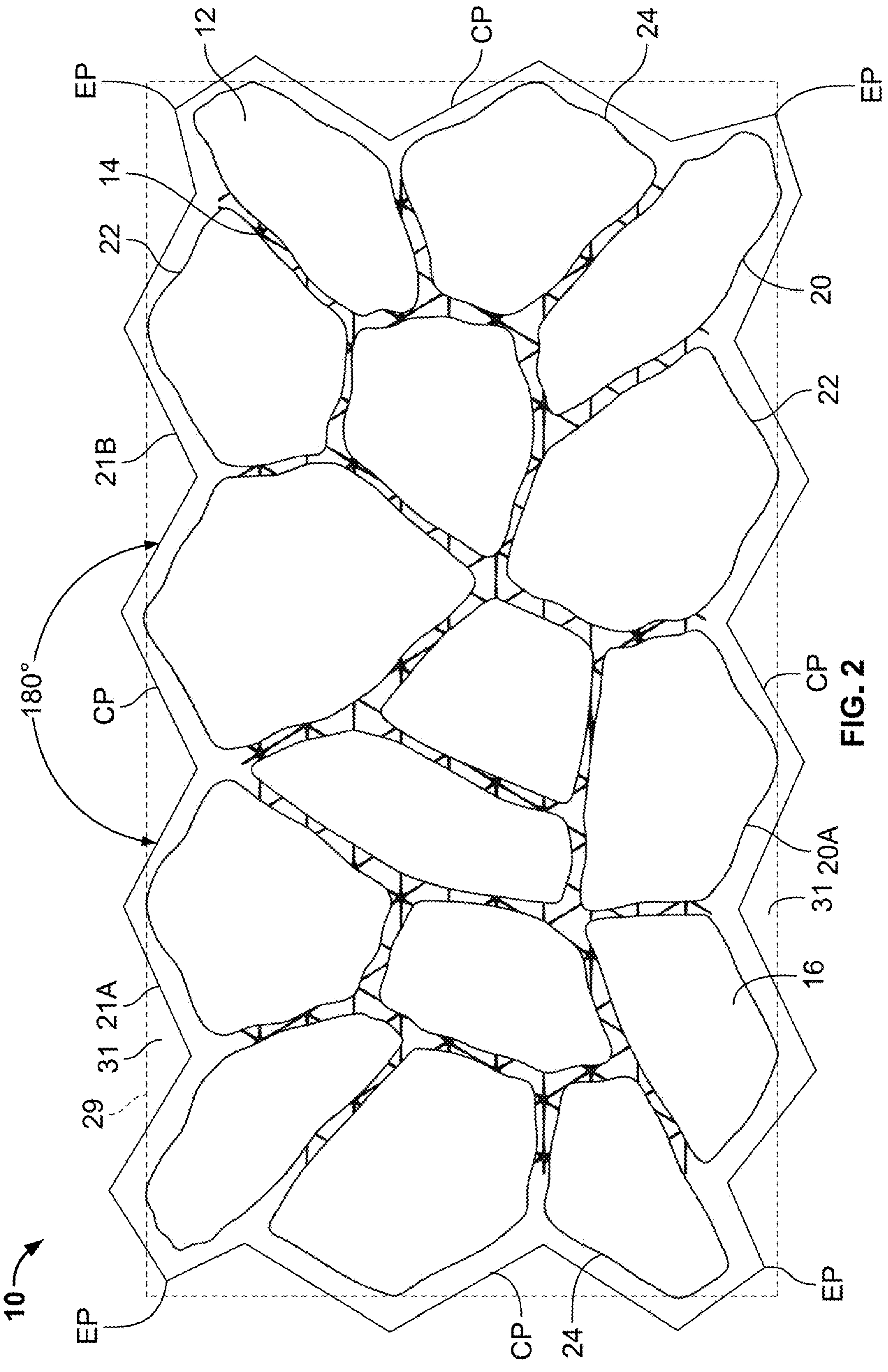
FIG. 2 is a top plan view of the surface covering mat.
Figure 3:
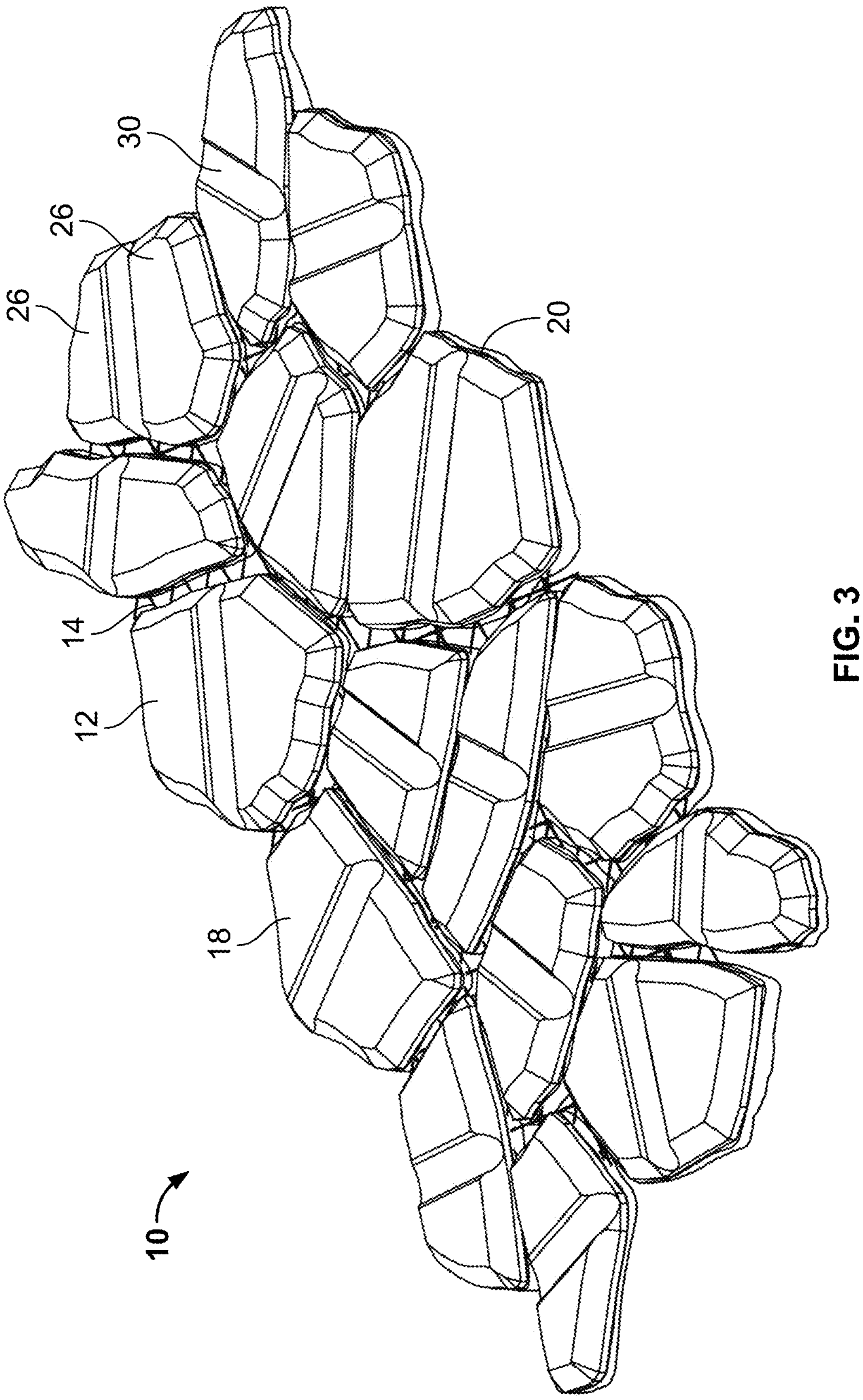
FIG. 3 is a bottom perspective view of the surface covering mat.

FIG. 2 has been annotated to include a peripheral line immediately outside the peripheral surface 20 of the mat 10 for purposes of demonstrating the "S-curve" geometry of the sides 22, 24 of the mat. It should be noted that the annotated line is moved outwardly but adjacent to the actual peripheral surface 20 for purposes of clarity only. The purpose of the annotated line is to show the "S-curve" geometry of the peripheral surface 20, prior to surface irregularities being added to the peripheral surface 20. That is, the annotated line demonstrates the foundational S-curve geometry of the peripheral surface 20 of the mat 10, before that foundational geometry is obscured visually to the eye by adding irregularities to the peripheral surface 20 so that each unit 12 look like natural stone.

By the term "S-curve" it is meant that a first segment 21A of each side 22, 24 extending from the centerpoint CP to the endpoint EP would be identical to a second segment 21B of each side extending from the centerpoint to the opposite endpoint if the first segment 21A was rotated 180-degrees about the centerpoint. The resulting S-curve may be smoothly curved, non-smoothly curved, regular, or irregular.

For purposes of this patent application, the term "S-curve" is used in its broadest sense to mean any shape that is a center 180-degree rotation, other than a straight line. For further disclosure of S-curve geometry, reference is made to U.S. Pat. Nos. 8,336,274 and 8,726,595 to Riccobene, the disclosures of which are entirely incorporated herein.

An S-curve is formed in the peripheral surface 20 of the mat 10 at each of the sides 22 and each of the ends 24, as viewed from the top plan view in FIG. 2. Preferably, the S-curve formed in the two sides 22 are substantially identical, such that the S-curve in one side is substantially a translation of the S-curve in the other side. Additionally, preferably the S-curve formed in the two ends 24 are substantially identical, such that the S-curve at one end is substantially a translation of the S-curve at the other end. The S-curve geometry along each side 22 and each end 24 of the mat 10 facilitates adjacent mats 10 fitting together (as will be further described with reference to FIGS. 9-13), where the adjacent mats are either duplicates of the original mat, or the adjacent mats are non-duplicates of the original mat but have substantially similar S-curve geometry to the original mat. With the S-curve geometry applied over multiple mats 10, where the multiple mats are not identical but have substantially similar S-curve geometry at their sides 22, 24, multiple configurations of mats can be fitted together in multiple layout configurations.

In one embodiment, the mat 10 has at least three sides 22. The peripheral surface 20 of the mat 10 defines S-curve geometry on at least two of the three sides. Those at least two sides have a center point CP, and the first segment 21A of the side is a 180-rotation of the second segment 21B of the side about the center point CP. Further, in an embodiment of mat 10 having four or more sides 22, 24, at least two of the sides have the S-curve geometry that allows the mat to mate with an adjacent mat.

Referring back to the preferred embodiment of FIG. 2, while the S-curve geometry is present in each of the sides 22 and ends 24, the peripheral surface 20 can be irregularly shaped in the plane that is parallel with the top surface 16, such that the peripheral surface 20 substantially follows the S-curve geometry but is not 100% identical to the S-curve geometry when the irregularities are added to the units 12. This can be seen in FIG. 2 where the peripheral surfaces 20A of the units 12 look like natural stone, but still have the foundational S-curve geometry.

Additionally, the peripheral surface 20 can be irregularly-shaped in the plane extending perpendicularly from the top surface 16 to the bottom surface 18. For example, the peripheral surface 20 can taper or be non-uniform from the top surface 16 to the bottom surface 18, adding to its irregular shape (best seen in FIGS. 4-7). Between these surface irregularities at the peripheral surface 20 within a single mat 10, is and surface irregularities that may be present at the peripheral surface in an adjacent mat, as long as both mats have substantially similar S-curve geometry, the adjacent mats will mate with each other to form a surface covering yet appear seamless without substantial gaps between mats. The term, "without substantial gaps" means no gaps and/or comparatively small gaps that may be filled with sand or mortar, and that are not as large as a single unit, such as between the mating sides of the units 10 and between individual units 12.

Figure 8:
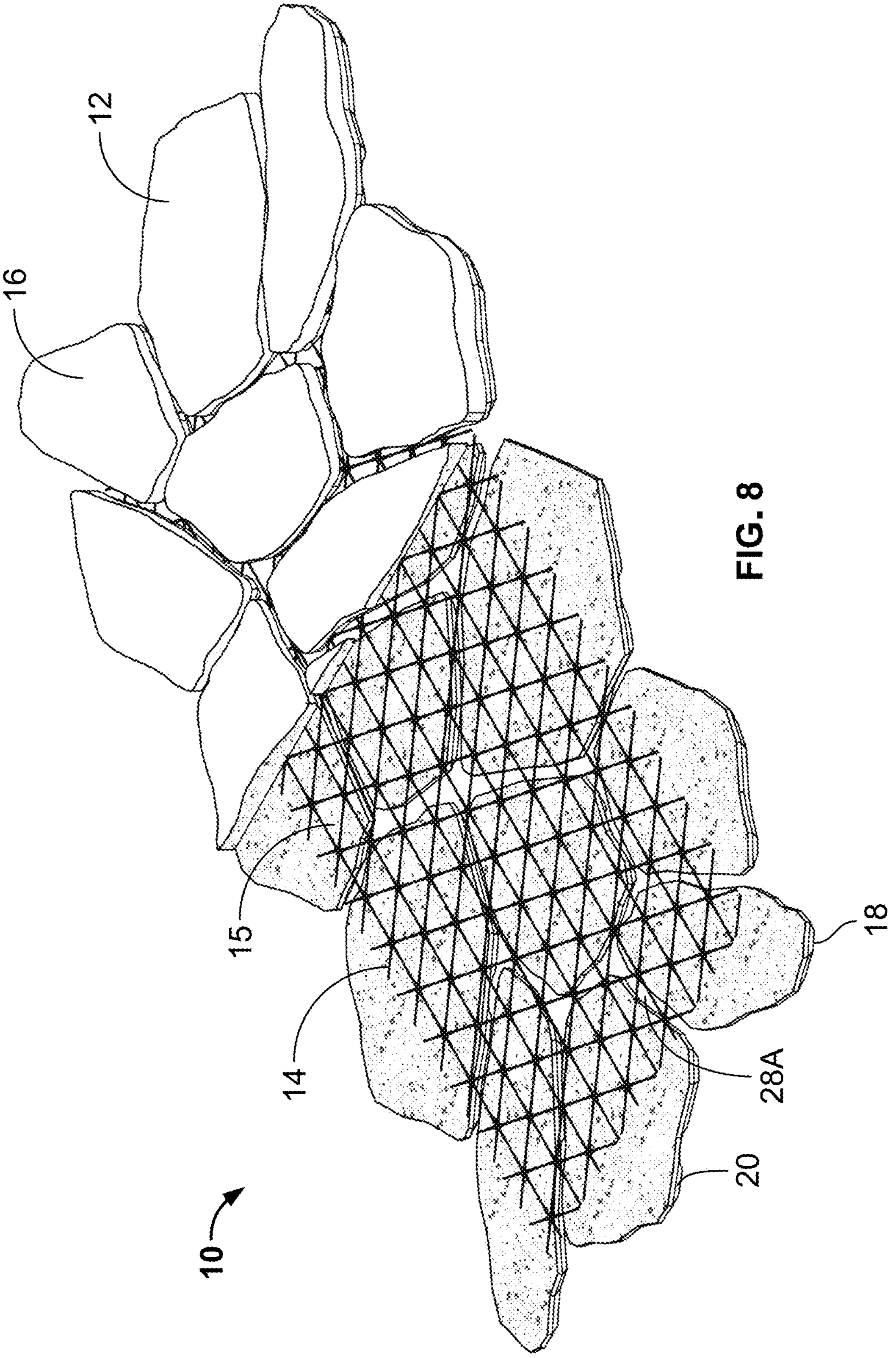
FIG. 8 is a partial cross-section view of the surface covering mat, where the area of cross-section is horizontally above and along the plane of the geogrid, and additionally cross-sectioned vertically through the top surface of the mat, as indicated in FIG. 1.
Figure 9:
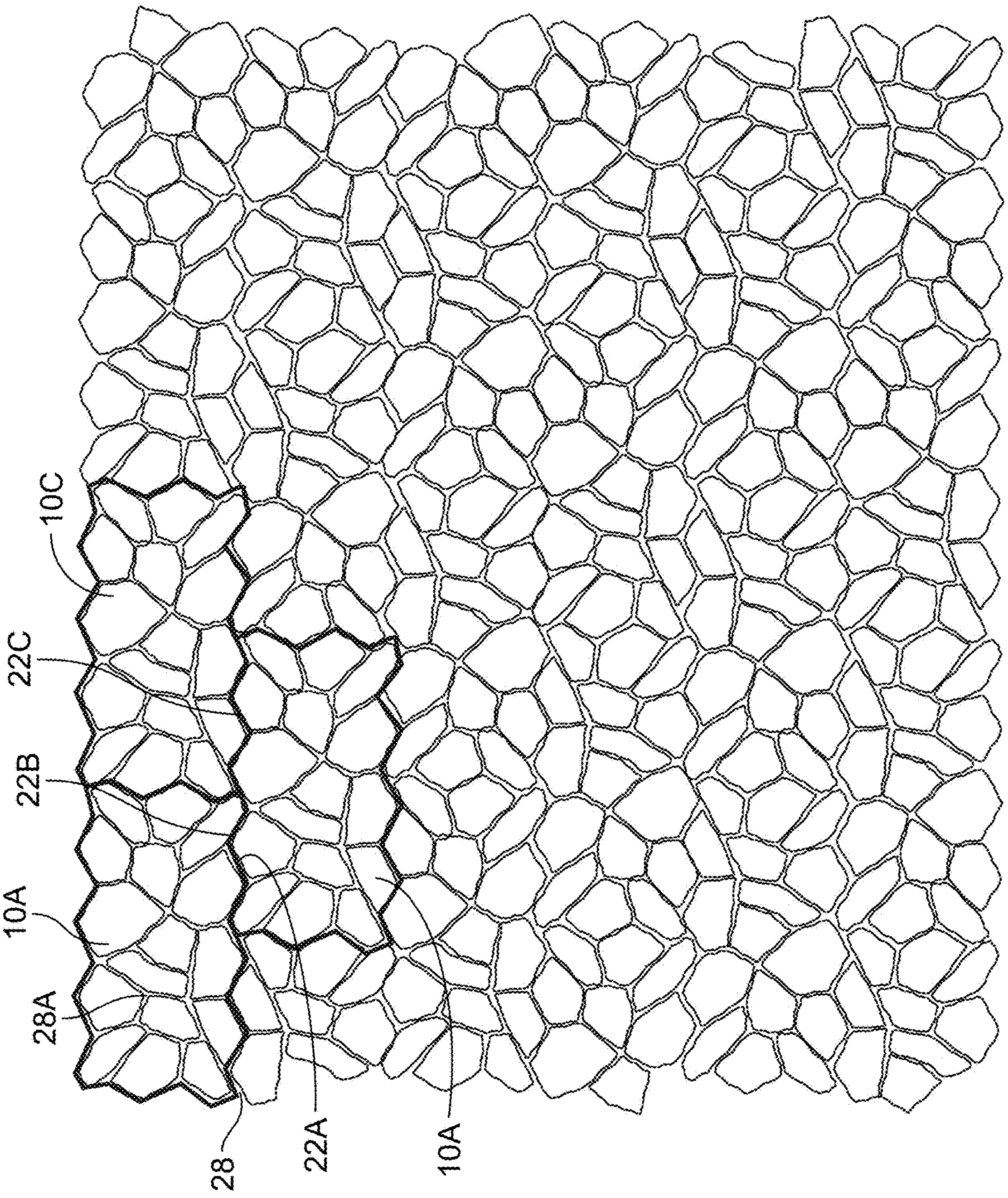
FIG. 9 is a laying out pattern of multiple surface covering mats in a half-bond arrangement, with exemplary adjacent mats outlined in bold for purposes of showing their spatial relationship.
Figure 10:
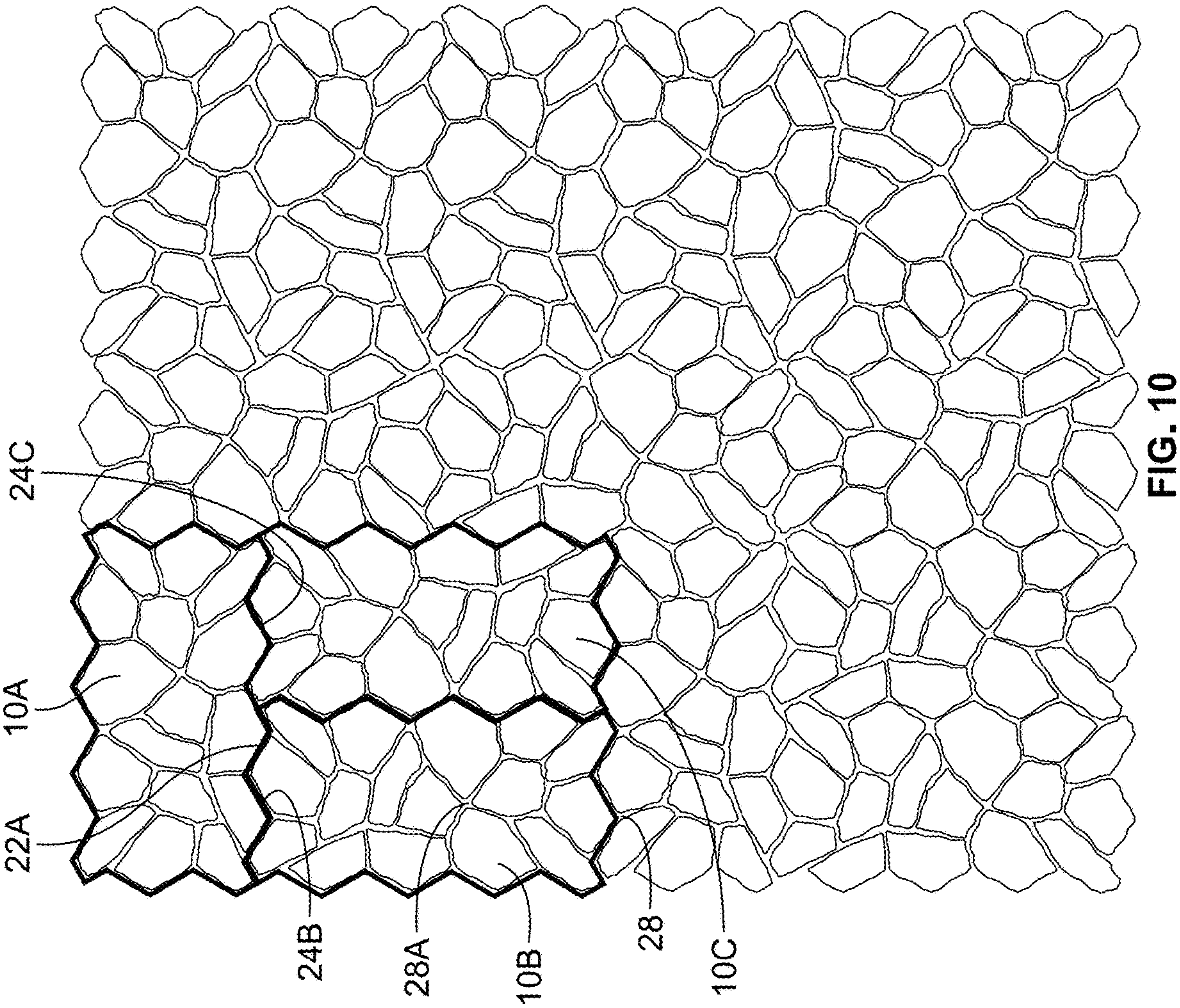
FIG. 10 is a laying out pattern of multiple surface covering mats in a basket weave arrangement, with exemplary adjacent mats outlined in bold for purposes of showing their spatial relationship.
Figure 11:
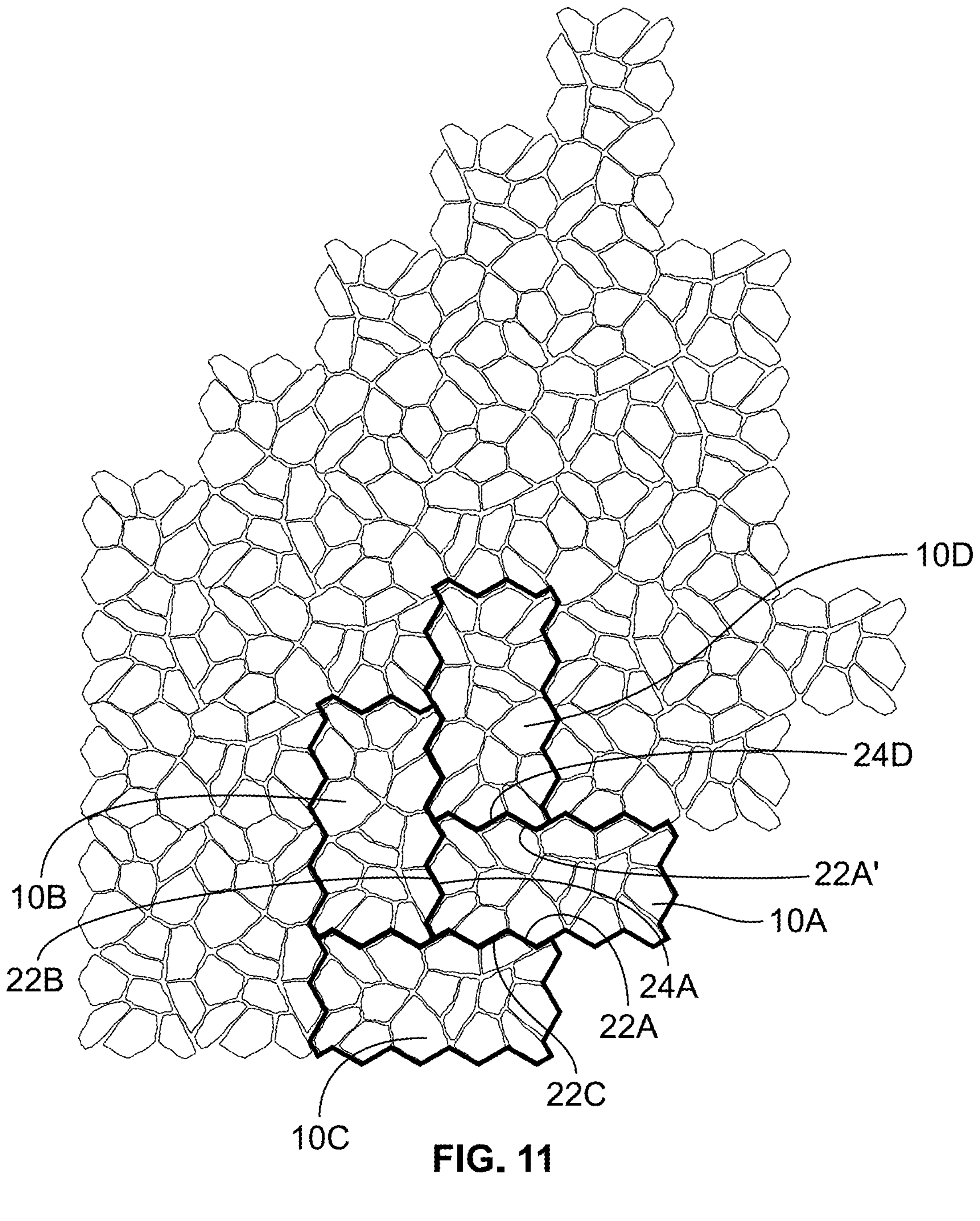
FIG. 11 is a laying out pattern of multiple surface covering mats in a herringbone arrangement, with exemplary adjacent mats outlined in bold for purposes of showing their spatial relationship.
Figure 12:
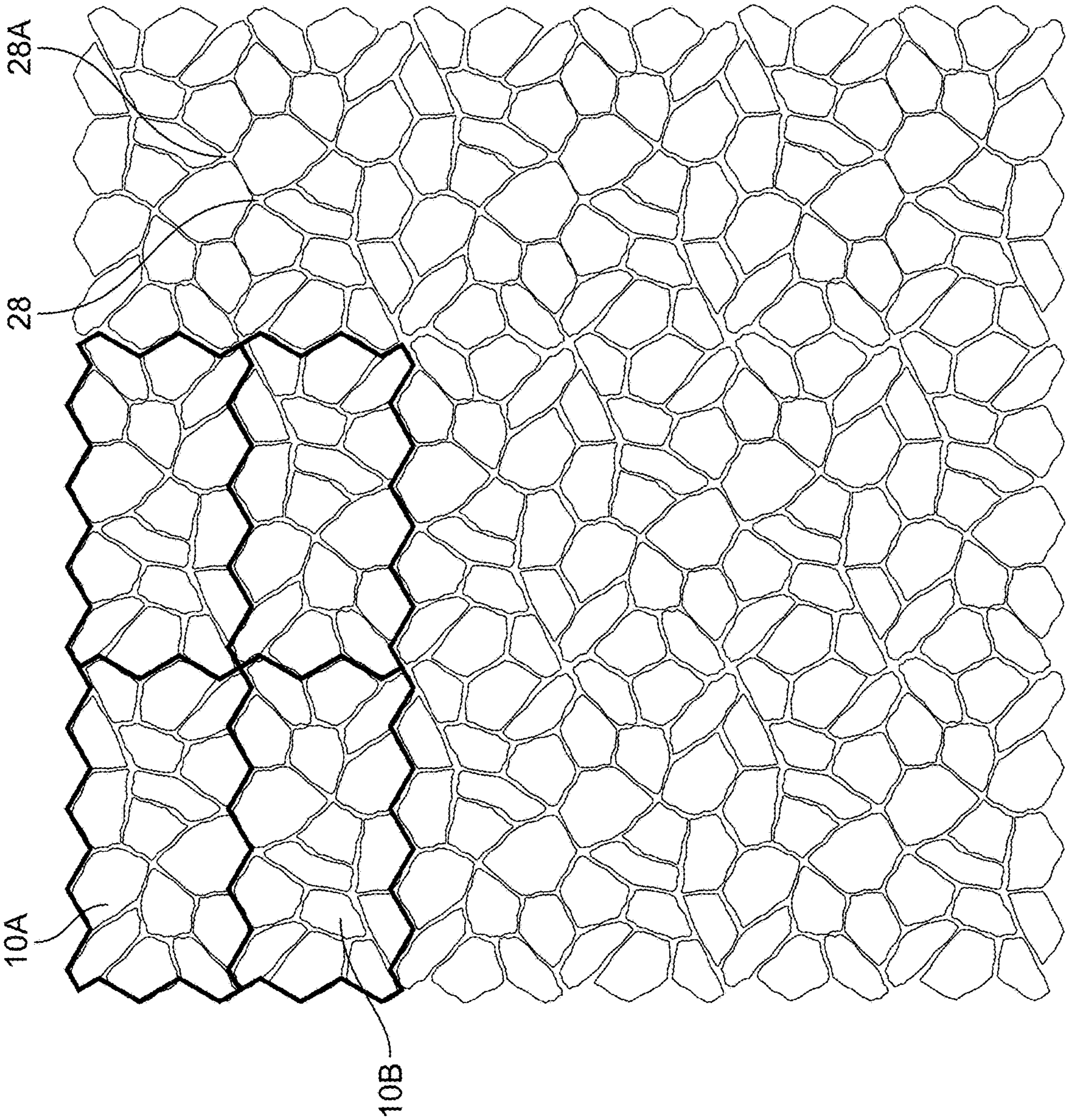
FIG. 12 is a laying out pattern of multiple surface covering mats in a straight arrangement, with exemplary adjacent mats outlined in bold for purposes of showing their spatial relationship.
Figure 13:
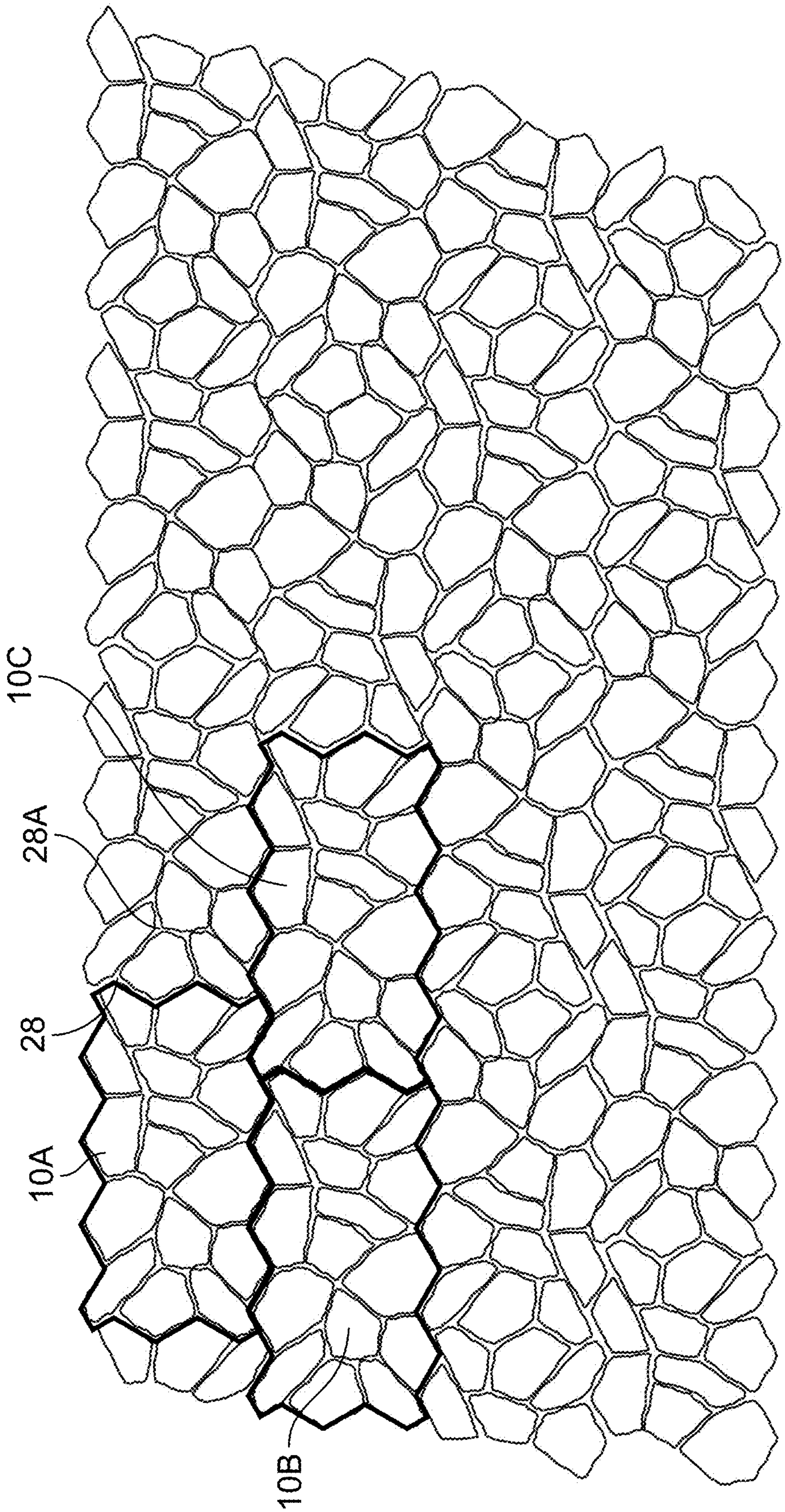
FIG. 13 is a laying out pattern of multiple surface covering mats in an offset bond arrangement, with exemplary adjacent mats outlined in bold for purposes of is showing their spatial relationship.
Figure 14:
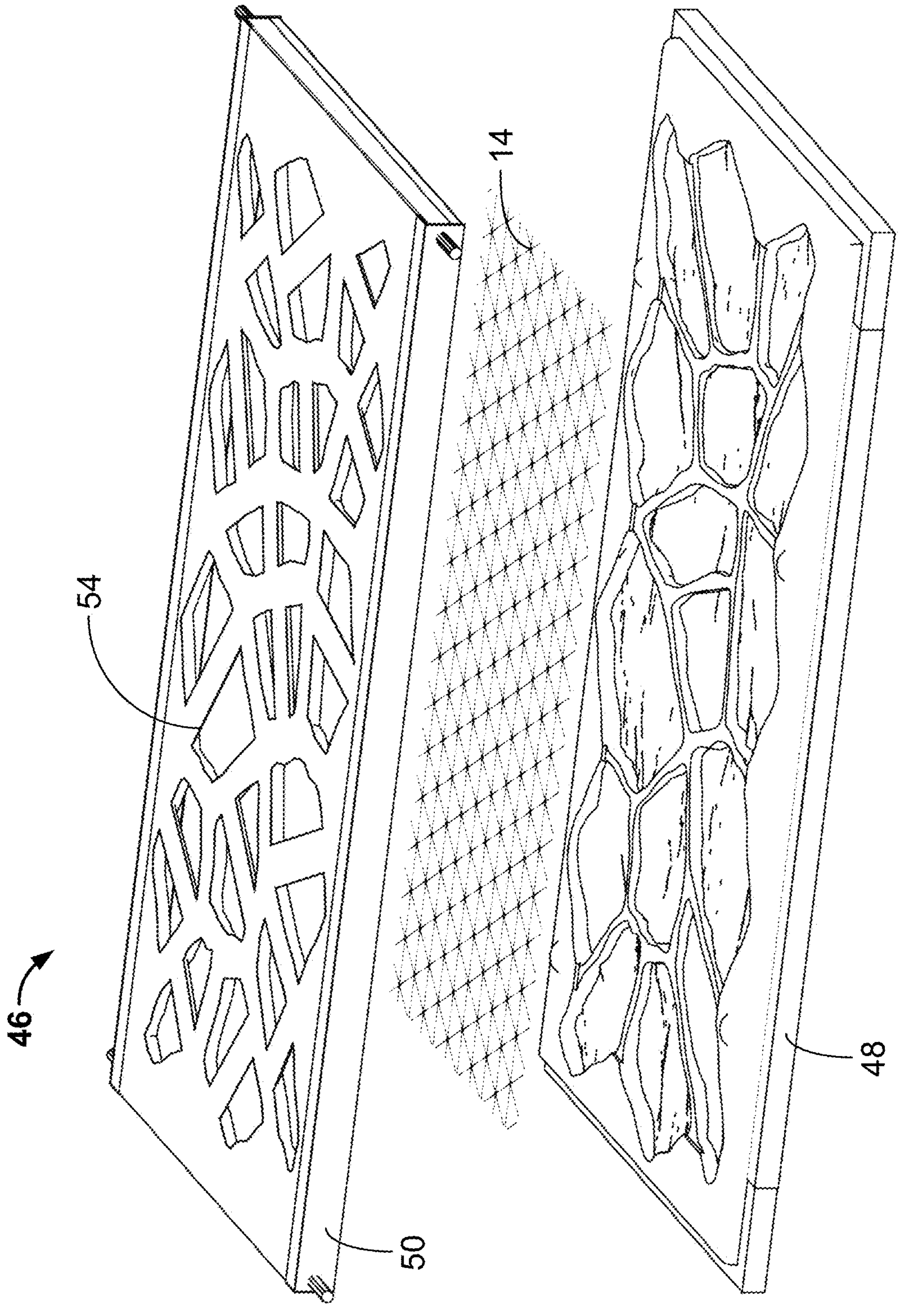
FIG. 14 is an exploded perspective view of a bottom mold, geogrid and top mold of a first embodiment of a mold assembly.
Figure 15:
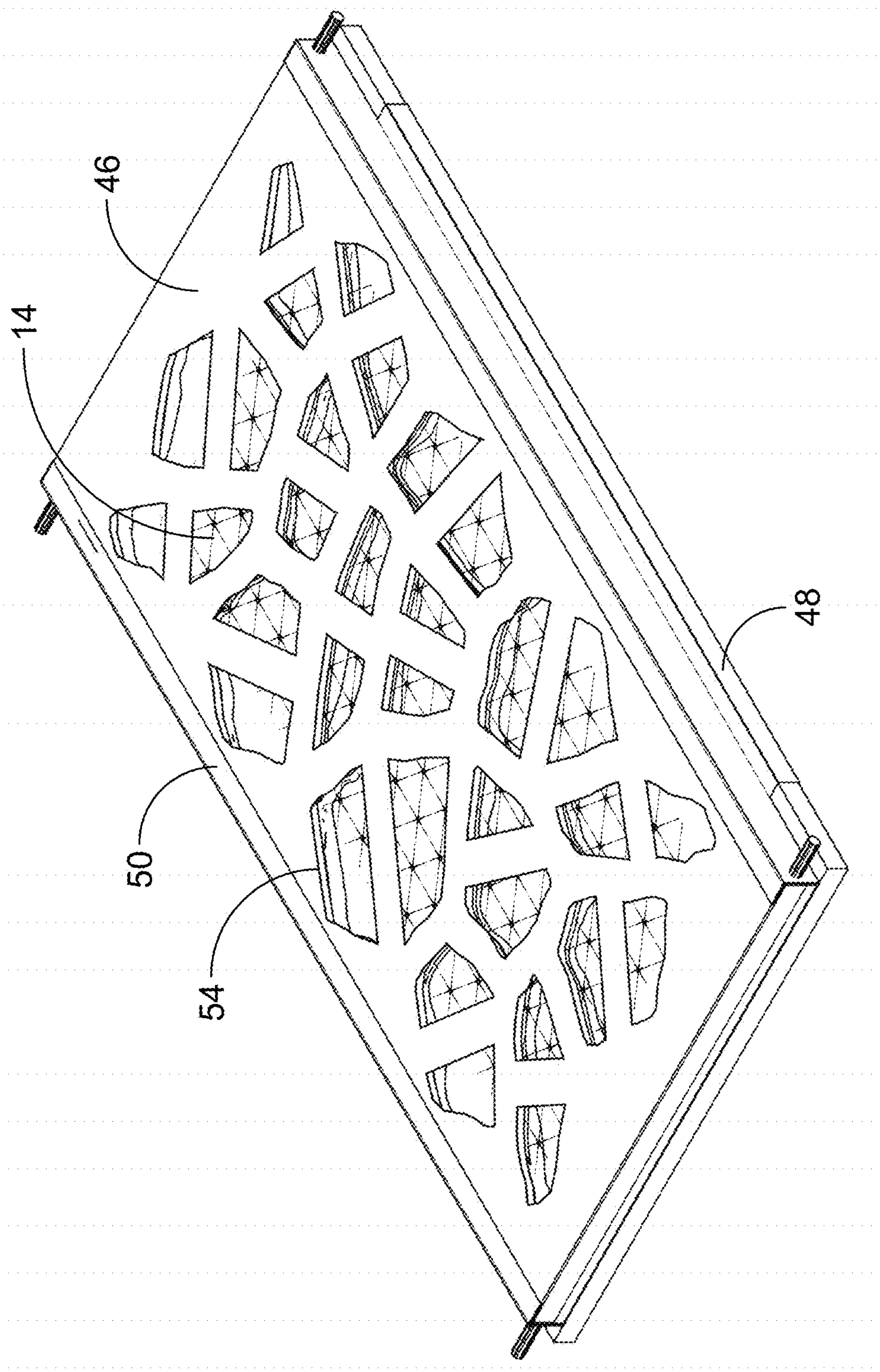
FIG. 15 is a perspective view of the assembled mold of FIG. 14 that is ready to be filled.
Figure 16:
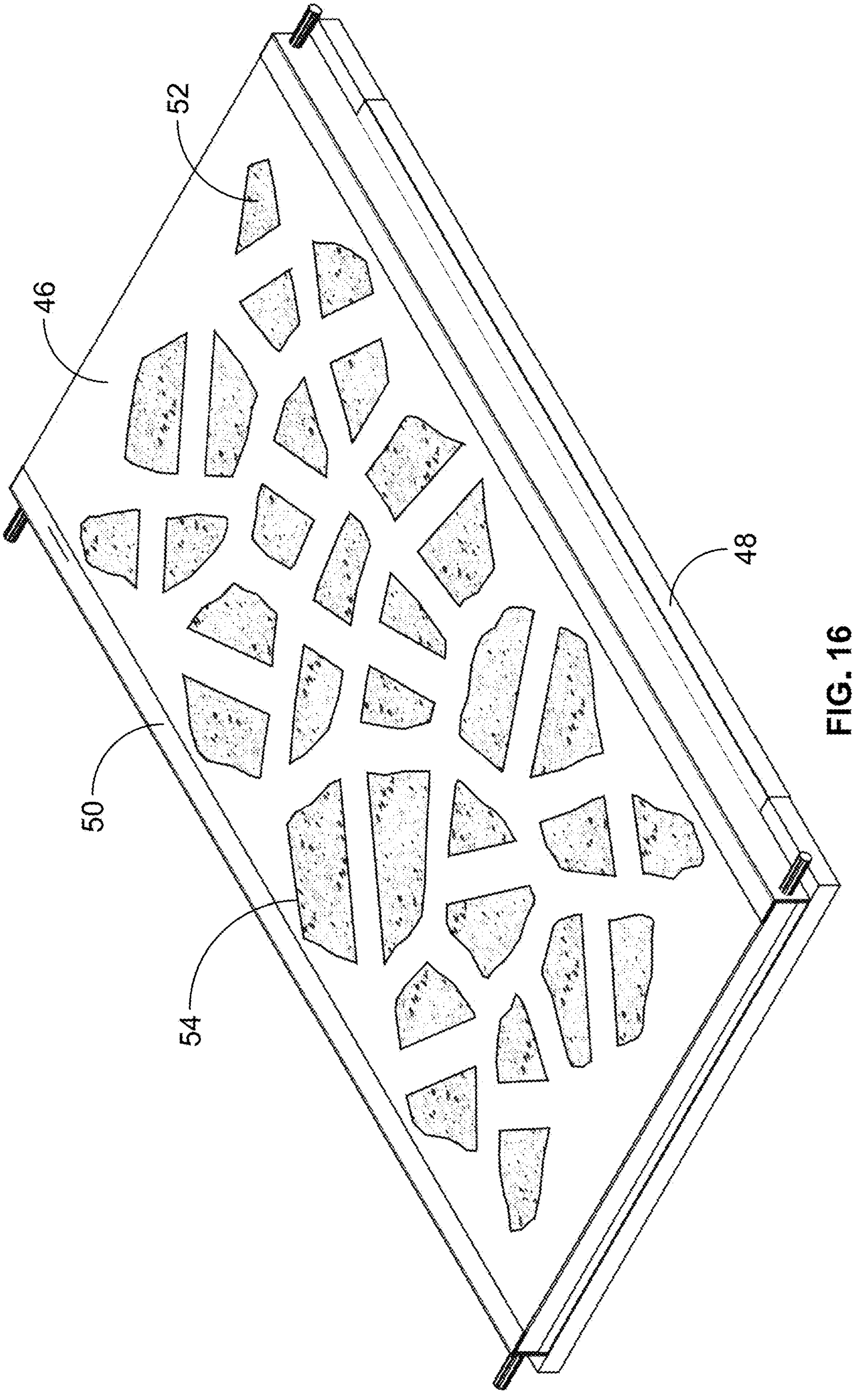
FIG. 16 is a perspective view of the assembled mold of FIG. 15 that is filled to the top of the top mold, where the filled material is shaded to indicate concrete.
Figure 17:
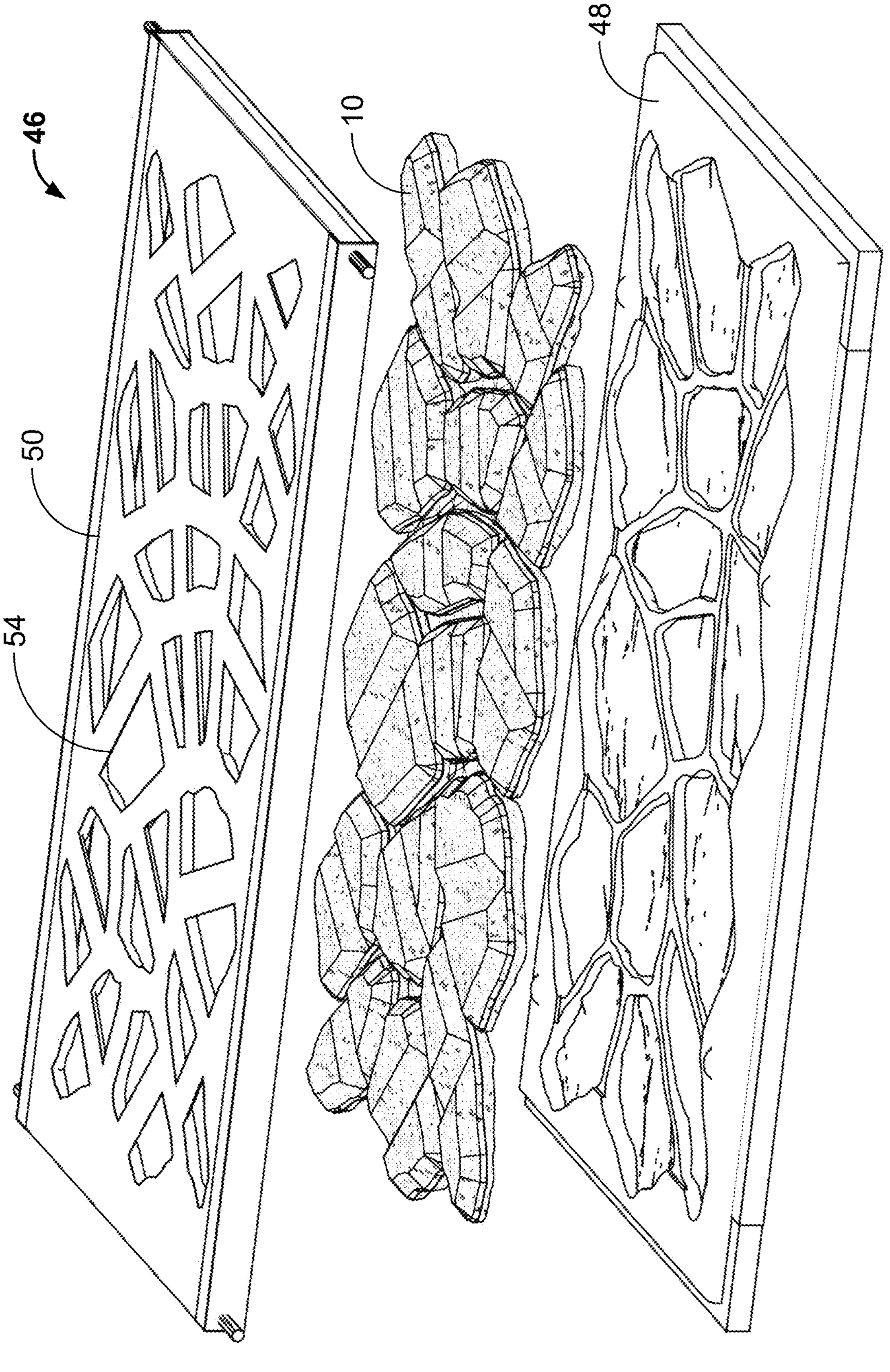
FIG. 17 is an exploded perspective view of a finished surface covering mat shaded to indicate concrete, where the finished mat was formed between the bottom mold and the top mold of FIG. 14.

As best seen in FIG. 8, the embedded geogrid 14 is preferably smaller in size than the perimeter of the mat 10, as long as the geogrid is large enough to have at least one aperture 15 of the geogrid embedded into each of the perimeter units 12 of the mat. This allows the perimeter units 12 to have stone edges that protrude beyond the geogrid 14, allowing clear space between projecting portions of exterior units. This also provides a clean perimeter edge of the mat 10 that facilitates the installation of similarly S-curved shaped adjacent mats to mate with each other without restriction from the embedded geogrid 14. Mating of multiple mats 10 can be seen in FIGS. 9-13. The term "mate" is used to refer to the positioning of adjacent mats where adjacent mats fit together like a jigsaw puzzle, but in the state where either gaps 28 are present between the units, or alternatively where there is contact between adjacent mats 10. In the most preferred embodiment, the mating peripheral surfaces 20 of adjacent mats 10 should mate with gaps 28, but not substantial gaps.

It is contemplated that multiple mats 10 are provided with a different configuration of irregular units 12 such that the appearance of the multiple irregular units that are present in a given layout of mats is preferably of different sizes and shapes in plan view, and with a variable gap 28A spacing between individual units. The multiple, different mats 10 having multiple, different individual units 12 lends to a more natural aesthetic across the layout of mats.

The units 12 within the mat 10 are also spaced from each other by the gap is distance 28A to allow flexibility between the units and for apertures 15 in the geogrid 14 to exist between the units. The individual unit 12 top surfaces 16A are also irregular and designed to mimic natural stone where top surfaces of each unit have a higher height or a lower height than other portions of the top surface of the same unit.

Where the peripheral surface 20 has a height from the bottom surface 18 to the top surface 16, the S-curve may be defined by the outermost peripheral projection of the surface 20 in the radial direction from the center of the unit 12 (where the radial direction is generally parallel to the top surface and the bottom surface of the unit), i.e. the outermost peripheral extent of the surface 20 as viewed in plan view. The peripheral surface 20A of the units 12 are substantially vertical sides, however the peripheral surface can be rounded, beveled or near vertical-straight from the top surfaces 16A of the unit down to the level of the embedded geogrid 14. When the peripheral surface 20A of these individual units 12 are coupled with the irregular gap spacing 28A between units, the entire installed mat 10 appears as individual natural stones installed on the substrate S.

Installations of the mats 10 on slopes will generally be viewed from some distance. Therefore, it is desirable that the individual units 12 be large enough to see their shape and form from that distance. Units 12 that are too small in size would appear from a distance as a layer of small aggregate or stone and not necessarily as aesthetically pleasing larger stones. However, due to gravity, larger units 12 have a tendency to slide down on a slope. The bottom surface 18A of one or more units 12 may include tractive cleats 26. The cleats 26 enable the unit 12 to penetrate and grip into the soil or substrate S, thereby reducing the tendency for the mats 10 to slide down the hill. This also puts the geogrid 14 residing in the gaps 28A between the units 12 directly in touch with the substrate S, which is a desirable position for the geogrid. Additionally, a channel 30 defines two cleats 26 that stabilize the unit 12 with the substrate S.

The embedded geogrid 14 is preferably a triaxial grid, but other configurations of geogrid are envisioned. For example, a biaxial or rectangular grid, mesh, screen, wire, or any other material that is both semi-rigid and flexible, and defines apertures 15 therein, are contemplated. Preferably the geogrid 14 is polypropylene, which has high tensile strength and is generally semi-rigid axially, thereby providing a horizontal and flexible articulating structure through the units. The flexible articulation allows installations of mats 10 where multiple mats fitted together do not necessarily need to be oriented in one direction or another across a hill or slope. One such geogrid 14 is commercially available under the trademark TENSAR®. Other types of geogrid 14, such as polyethylene or polyester, which are bundled fibers, may be used but are not preferred as these will easily collapse between the units causing the mats to be difficult to handle and install. Not only does the geogrid 14 provide flexible articulation in the gaps 28A between the units 12, but it also provides vertical stability between the individual units by restricting their vertical movement due to the geogrid being embedded through the units. Polypropylene geogrid 14, while axially semi-rigid, also provides some radial flexibility in gaps 28A between the units allowing for minor on-site adjustments to the mat 10 to aid installation.

Figure 41:
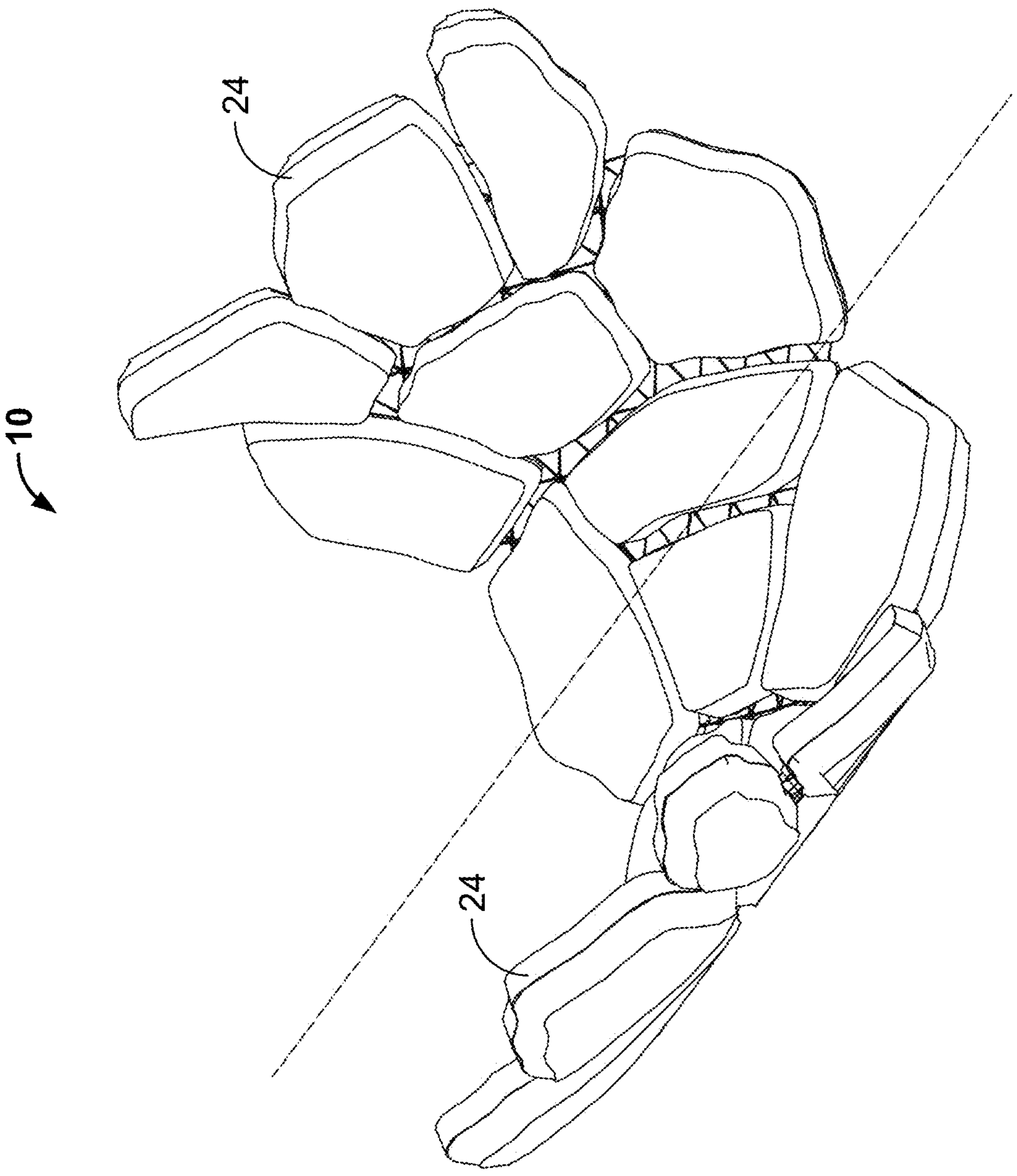
FIG. 41 is a schematic depicting the surface covering mat in a first direction of articulation that is end-to-end.
Figure 42:
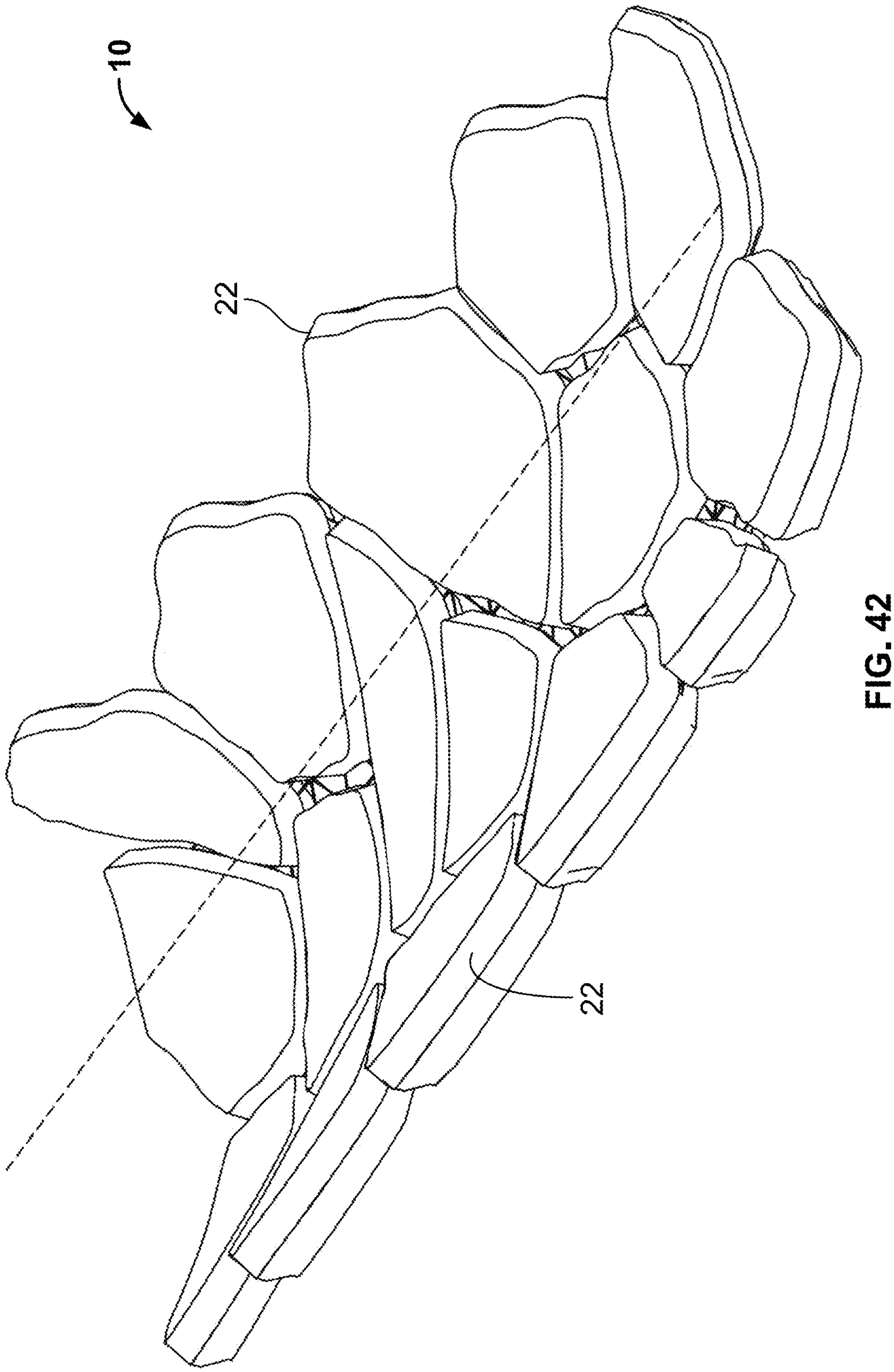
FIG. 42 is a schematic depicting the surface covering mat in a second direction of articulation that is side-to-side.
Figure 43:
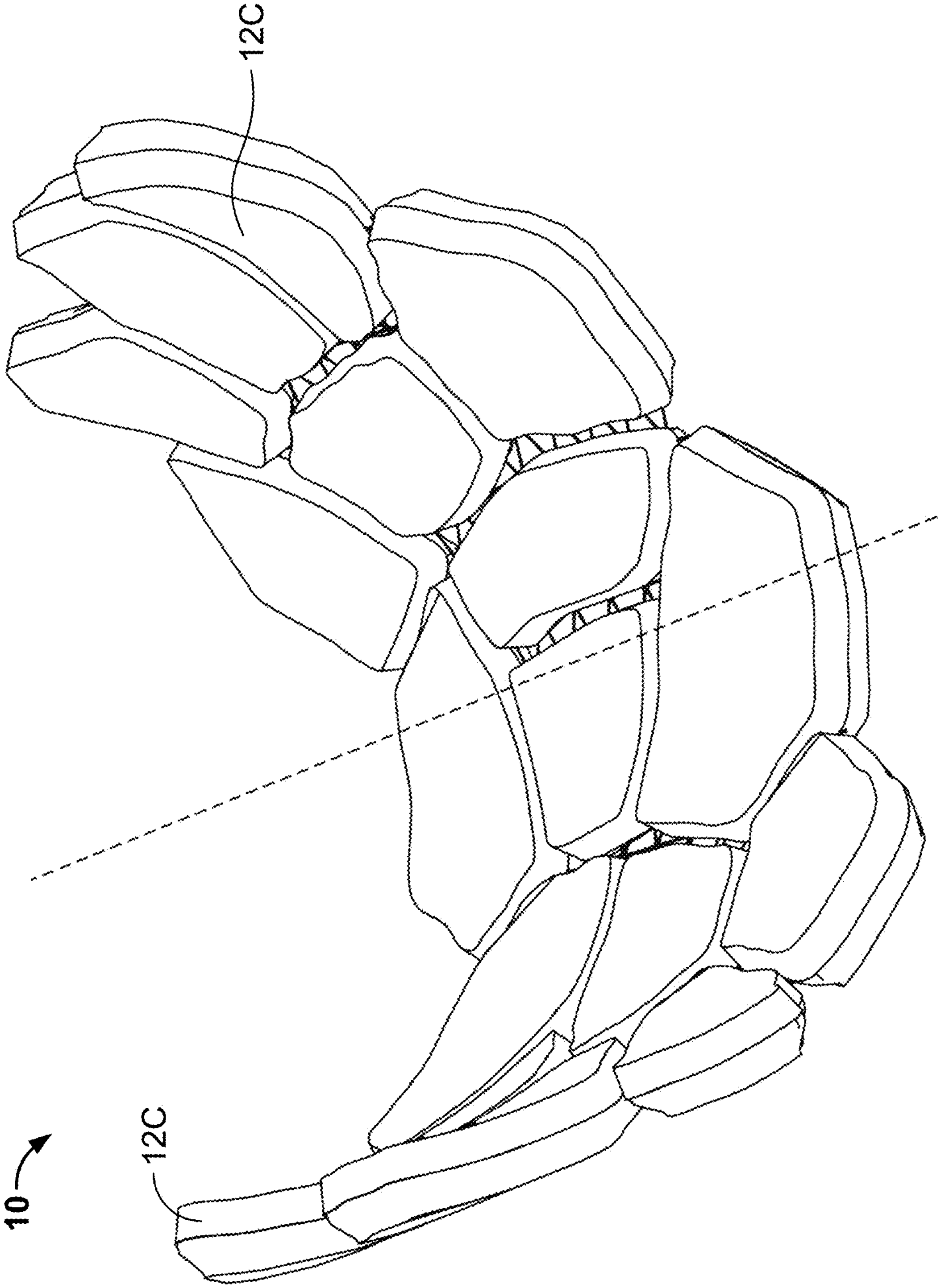
FIG. 43 is a schematic depicting the surface covering mat in a third direction of articulation that is two diagonally opposing corners.
Figure 44:
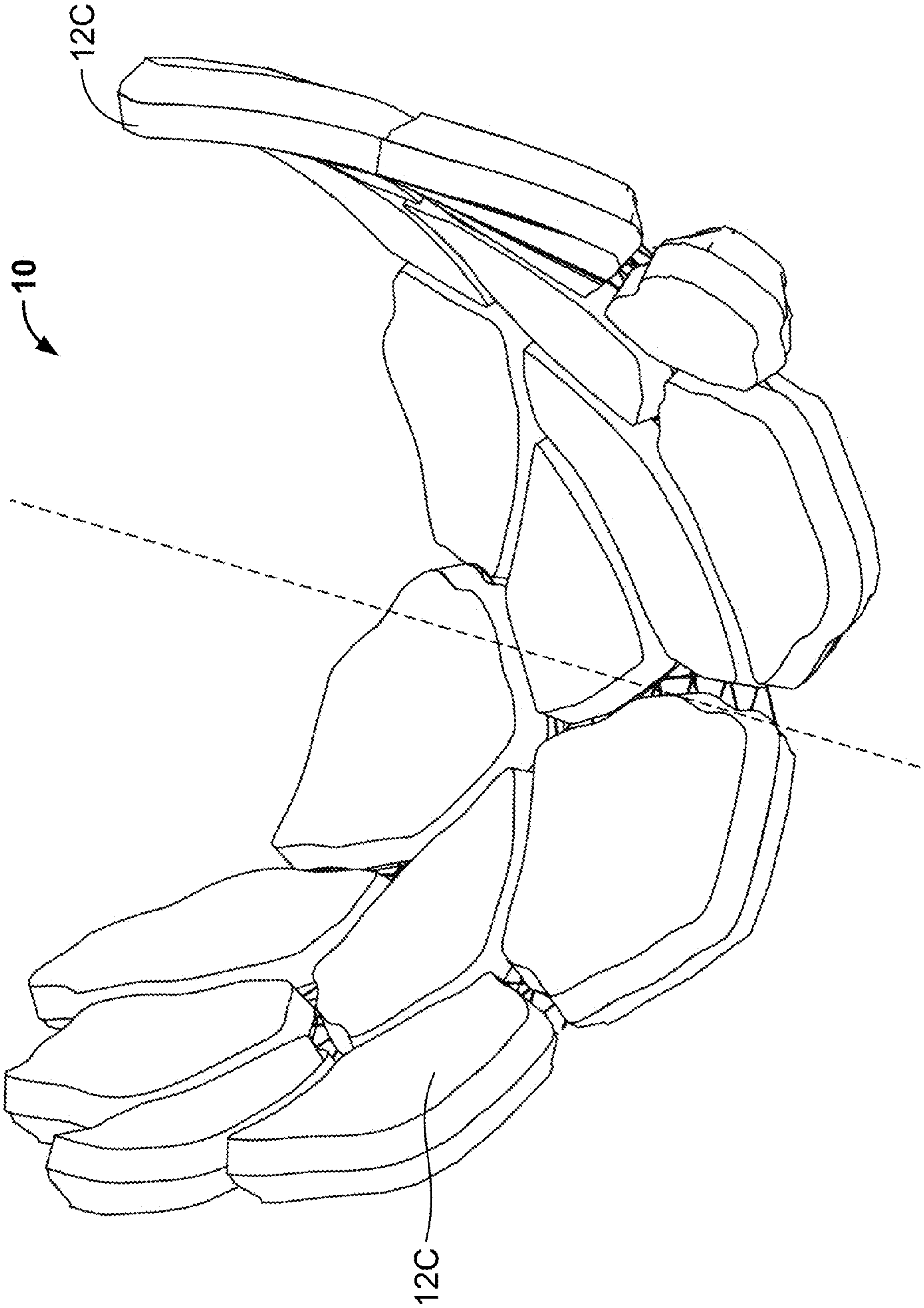
FIG. 44 is a schematic depicting the surface covering mat in a fourth direction of articulation that is the other two diagonally opposing corners.
Figure 45:
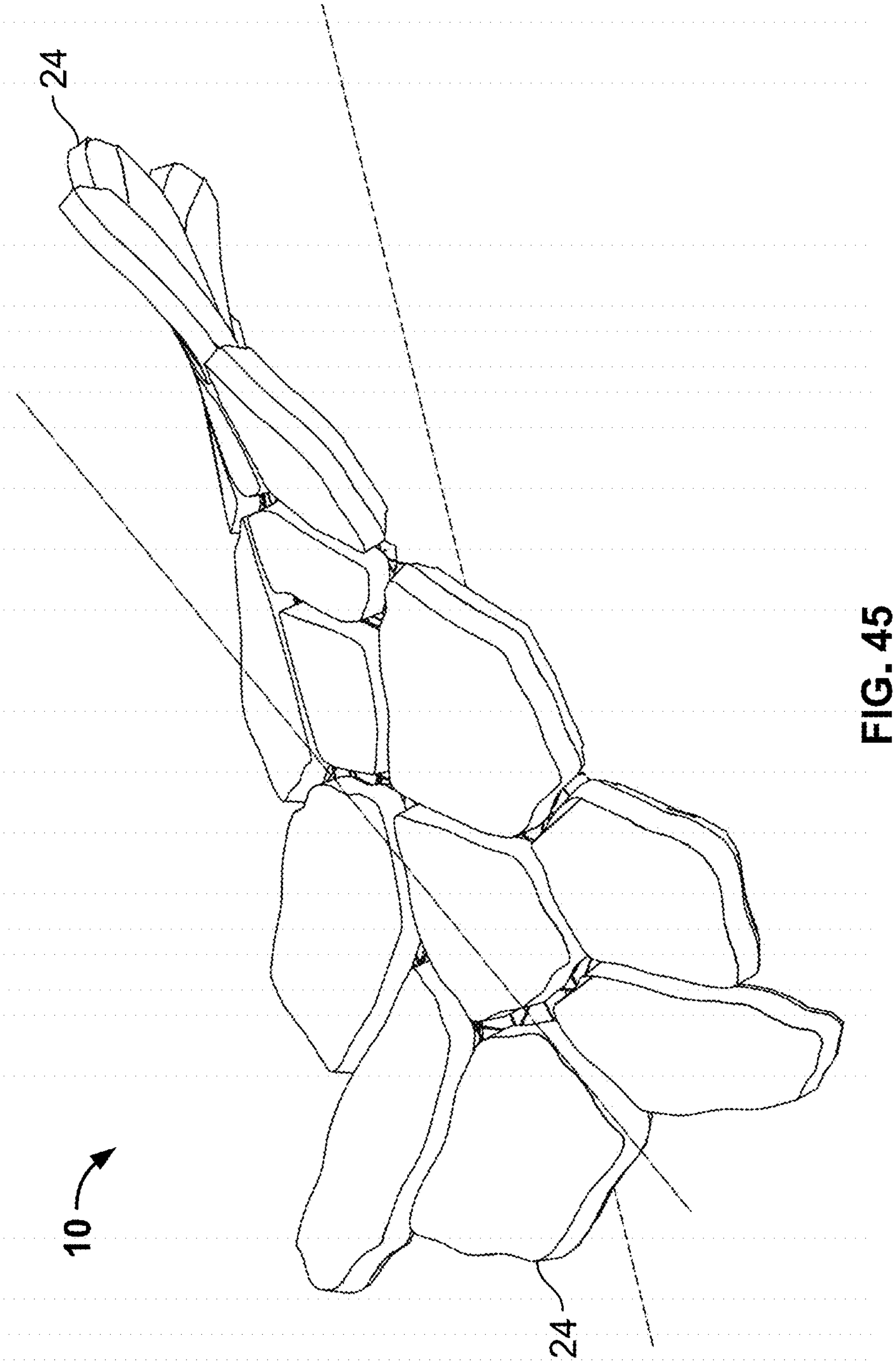
FIG. 45 is a schematic depicting the surface covering mat in a fifth direction of articulation that is a twist.
Figure 46:
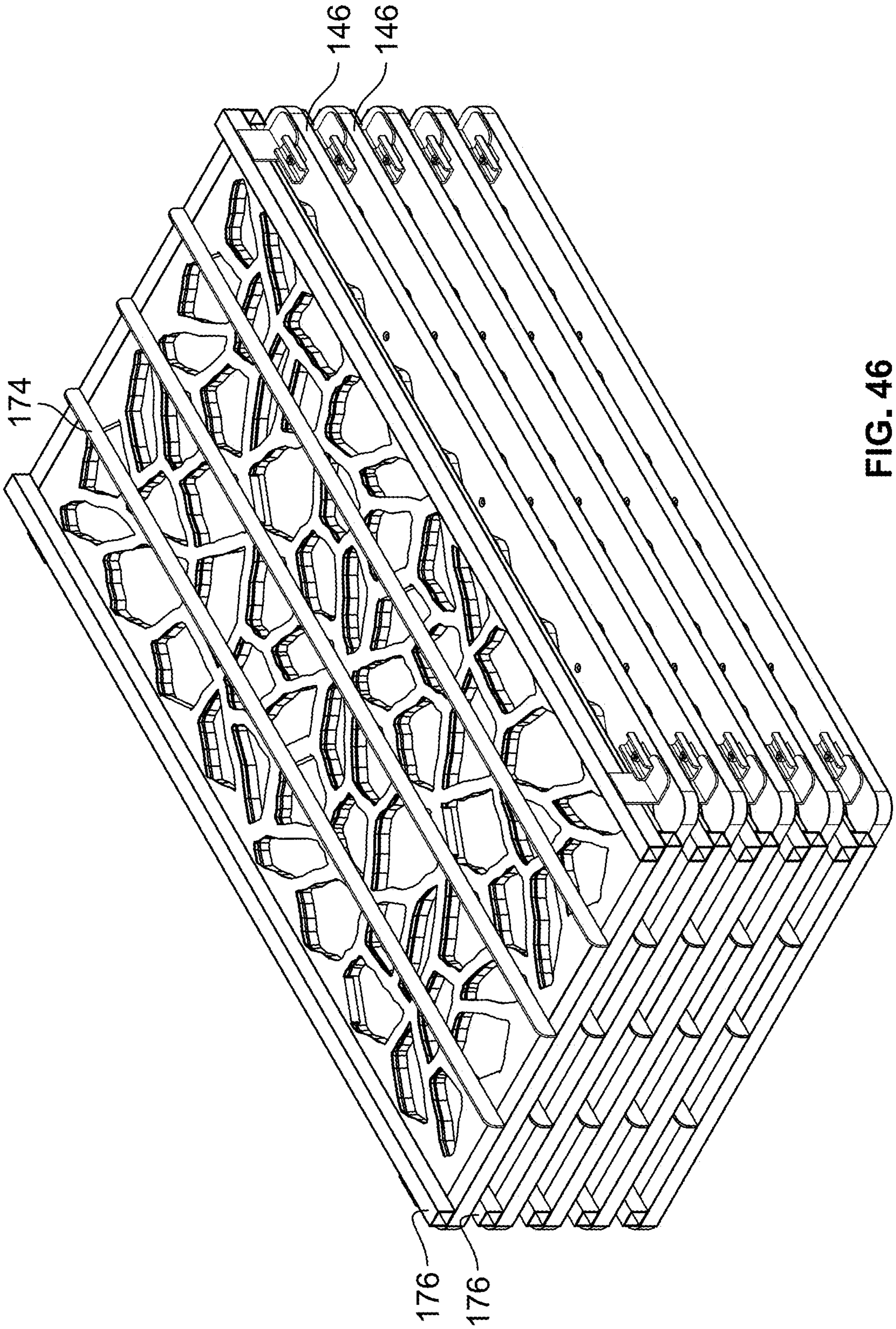
FIG. 46 is a perspective view of multiple mold assemblies being stacked.
Figure 47:
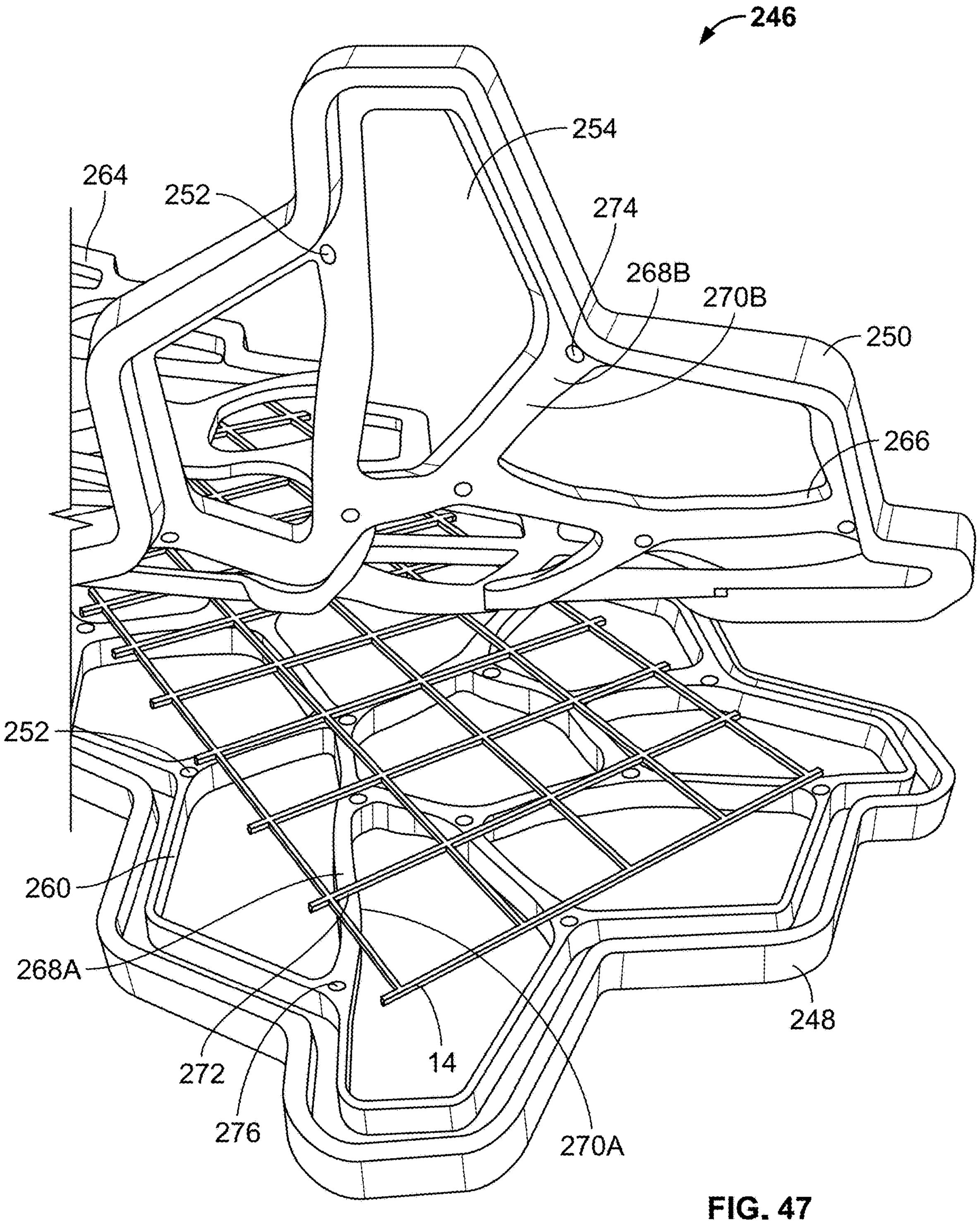
FIG. 47 is a partial perspective view of a third embodiment of mold assembly having a magnetic latch.
Figure 48:
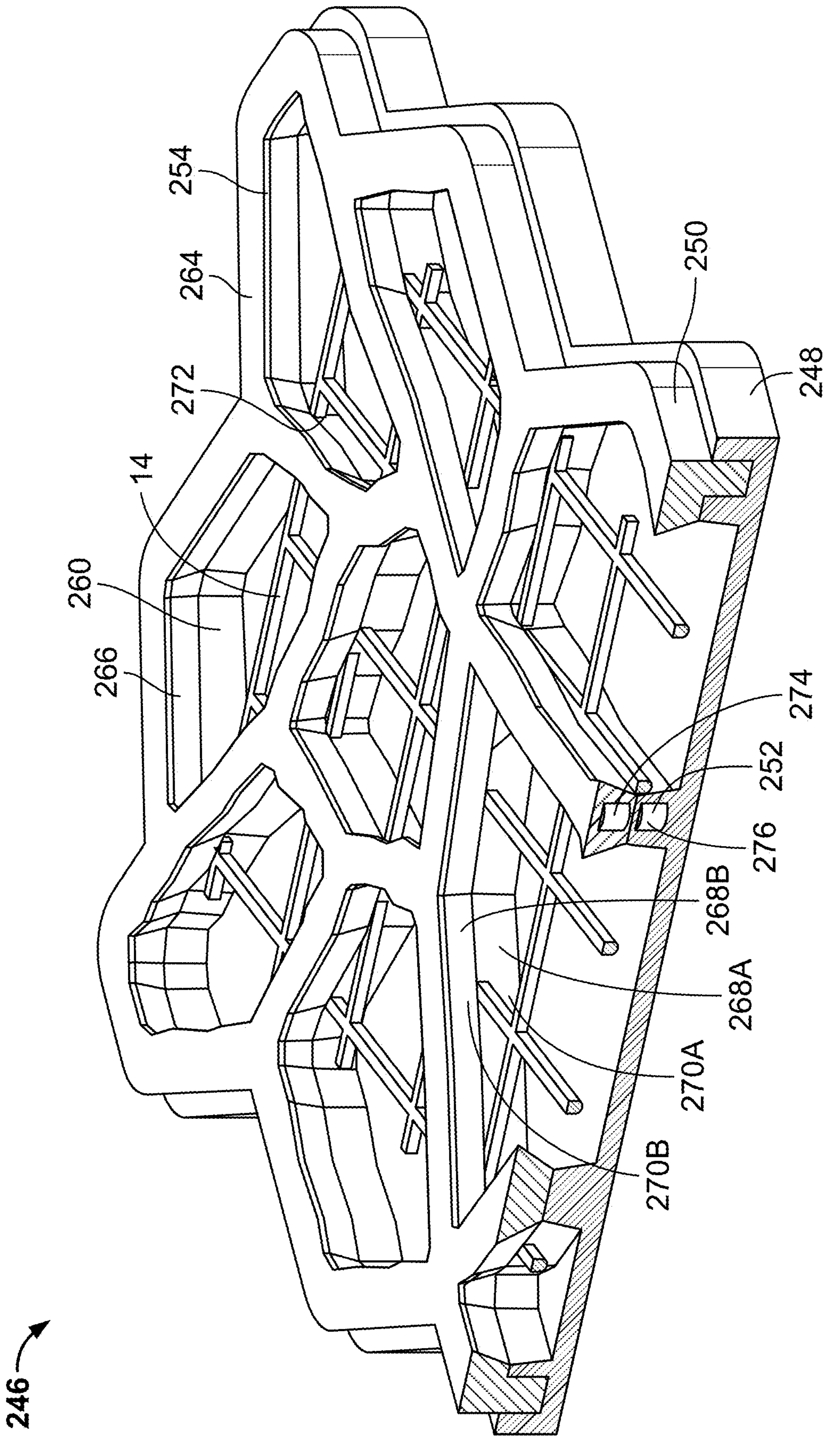
FIG. 48 is a section view of the mold assembly of FIG. 47.

Referring to FIGS. 41-45, the mat 10 is shown in 5-directions of articulation: 1) FIG. 41 shows end-to-end; 2) FIG. 42 shows side-to-side; 3) FIG. 43 shows two diagonally opposing corners; 4) FIG. 44 shows the other two diagonally opposing corners; and 5) FIG. 45 shows a twist (i.e. a non-45-degree and a non-90-degree articulation), which includes anything that is not purely the articulation directions shown in 1) through 4). The degree of articulation in any of the 5-directions is dictated by the gap space 28A between the units 12, the geometry of the individual units 12, the material of the geogrid 14, and the overall geometry of the mat 10. With 5-directions of articulation available to the mat 10, the mat is well-suited for an uneven substrate S.

Referring to FIGS. 9-13, multiple mats can be arranged in relationship to each other in many configurations to form an overall surface covering. Examples of such configurations are half-bond (FIG. 9), basket weave (FIG. 10), herringbone (FIG. 11), straight bond (FIG. 12), offset (FIG. 13), and/or combinations of the same, to cover a substrate S with an overall surface covering and to be aesthetically pleasing. Exemplary units 10 are outlined in bold for purposes of showing their spatial relationship. In the half-bond, one side 22A of a first mat 10A mates with two half-sides 22B, 22C of two mats 10B, 10C. In the basket weave, one side 22A of a first mat 10A mates with two ends 24B, 24C of two mats 10B, 10C. In the herringbone, one end 24A of a first mat 10A mates with half a side 22B of a second mat 10B, a first half of a side 22A of first mat 10A mates with a first half of a side 22C of a third mat 10C, and a first half of a second side 22A' of mat 10A mates with an end 24D of a fourth mat 10D. In the straight bond, the mats 10A and 10B are stacked and have the same rotational placement. In the offset, the first mat 10A is stacked above two mats 10B, 10C, but is offset to be adjacent over ¾ of the second mat 10B, and ¼ of the third mat 10C.

In the finished installation of these five arrangements or combinations of these five arrangements, the individual units 12 of all mats 10 are arranged together to visually appear as separate units 12 that are natural and of irregular thickness. The gaps 28 between the mats 10, and the gaps 28A between the units 12 (as measured at the level of the geogrid) are all irregular, i.e. differing in width.

Additionally, referring back to annotated FIG. 2, the rectangular shape 29 is defined by the outermost extent of the peripheral surface 20 of the mat 10. It can be seen that the S-curve geometry of each side 22, 24 traverses inside the rectangular box 29 at intersecting areas 31. The intersecting areas 31 are configured to receive portions of units 12 of an adjacent mat within the rectangular shape 29 defined by the original mat. In the most preferred embodiment, the intersecting areas 31 are not located symmetrically along the sides of the rectangular shape 29 about the centerpoint CP of the sides 22, 24. This asymmetric location of the intersecting areas 31 further obscures the seams of adjacent mats 10 from view. Additionally, the surface areas of the intersecting areas 31 are dependent on the S-curve geometry, however in a preferred embodiment, the intersecting areas are in the range of 8% to 20% of the rectangular shape, and more preferably in the range of 10% to 17% of the rectangular shape. Thus, as seen in FIGS. 9-13, the resulting appearance of multiple mats 10 has hidden seams between units 10, and is similar to the appearance of a hand placed natural stone.

Figure 19:
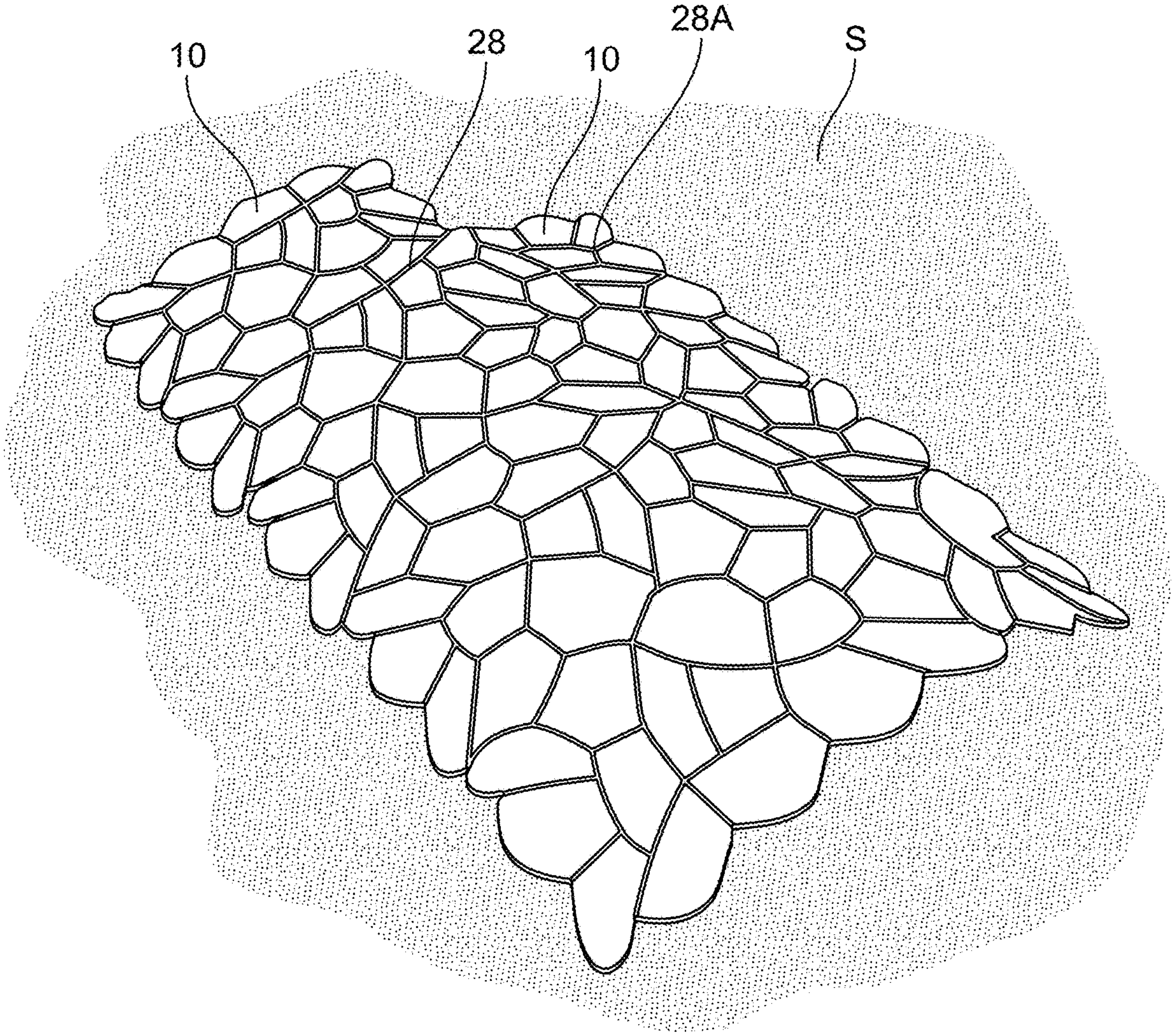
FIG. 19 shows multiple surface covering mats articulating over natural sloped terrain.
Figure 20:
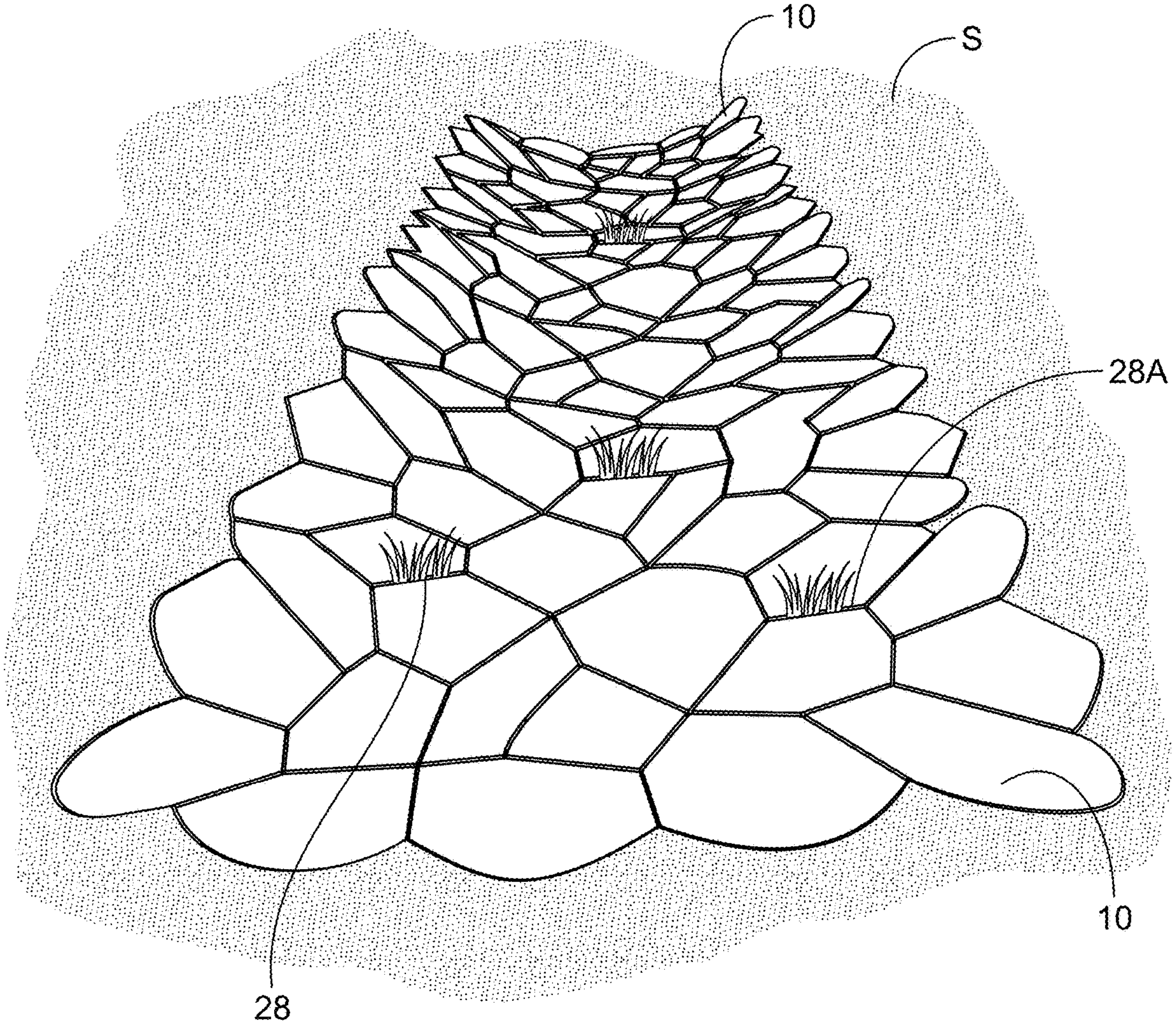
FIG. 20 shows multiple surface covering mats articulating over natural sloped terrain where the individual units are filled with soil to permit vegetation growth.

Referring to FIGS. 19-20, multiple mats 10 are capable of articulation in the 5-directions over natural sloped terrain substrate S. In FIG. 20 it can be seen that soil, grass, sand, gravel, concrete, glass, grout, plantings, or other materials may be used to fill in the gaps 28, 28A. In some geographic regions, condensation and moisture is held underneath and between the units 10, which can promote plant growth in the gaps 28, 28A.

Figure 23:
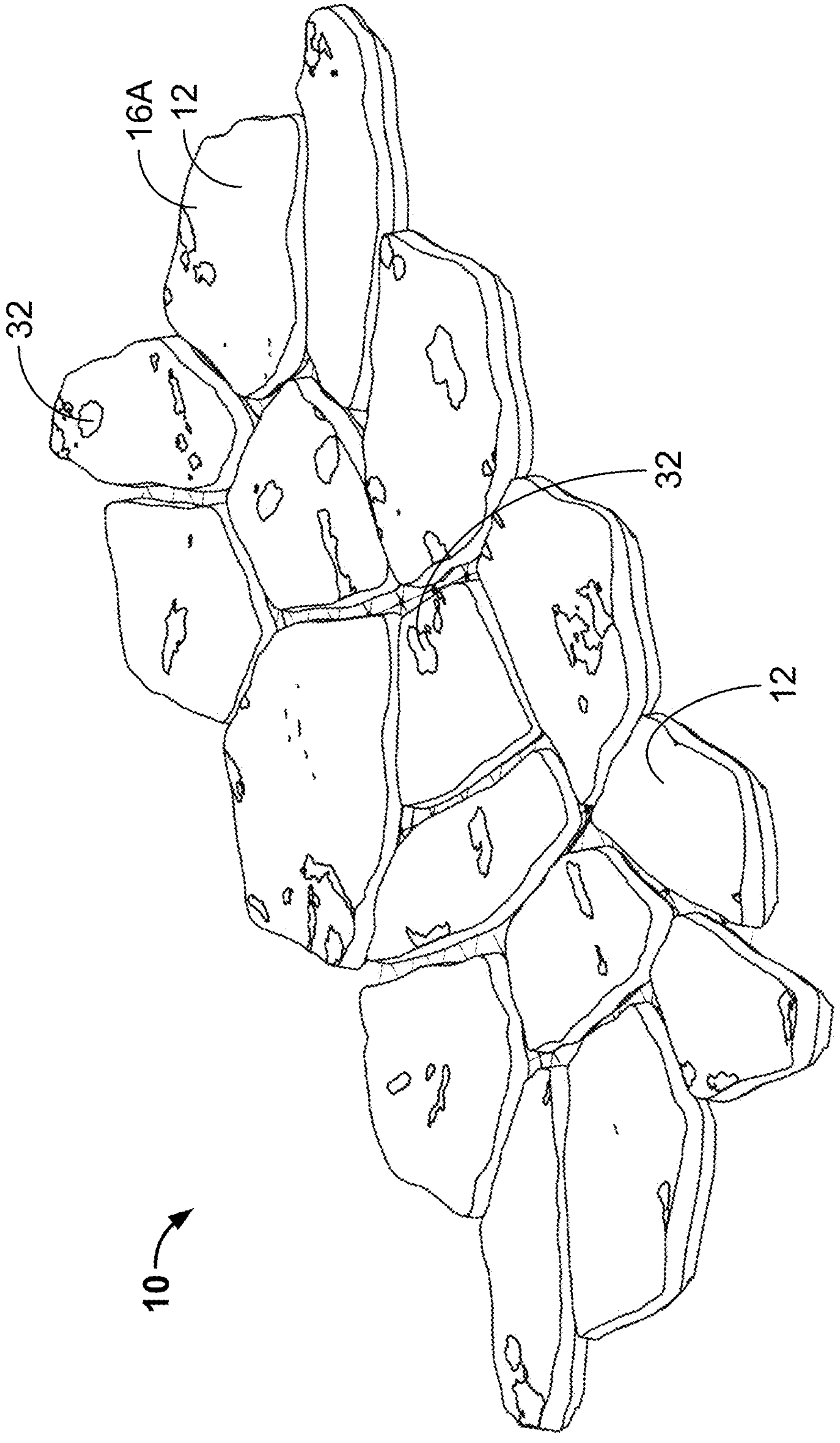
FIG. 23 is a schematic of the surface covering mat having texture on the individual units of a uniform height throughout the mat for even stacking of multiple mats on top of each other.

Referring to FIG. 23, multiple (and preferably all) units 12 have a raised stacking projection 32 that is the same height so that each mat 10 can be stacked substantially level on a pallet. The raised projection 32 is disguised within the natural looking texture on the top surface 16A of the units 12 so that the projection is not easily discerned, but the projection facilitates even stacking of multiple mats 10 on top of each other for delivery to the work site.

Figure 22:
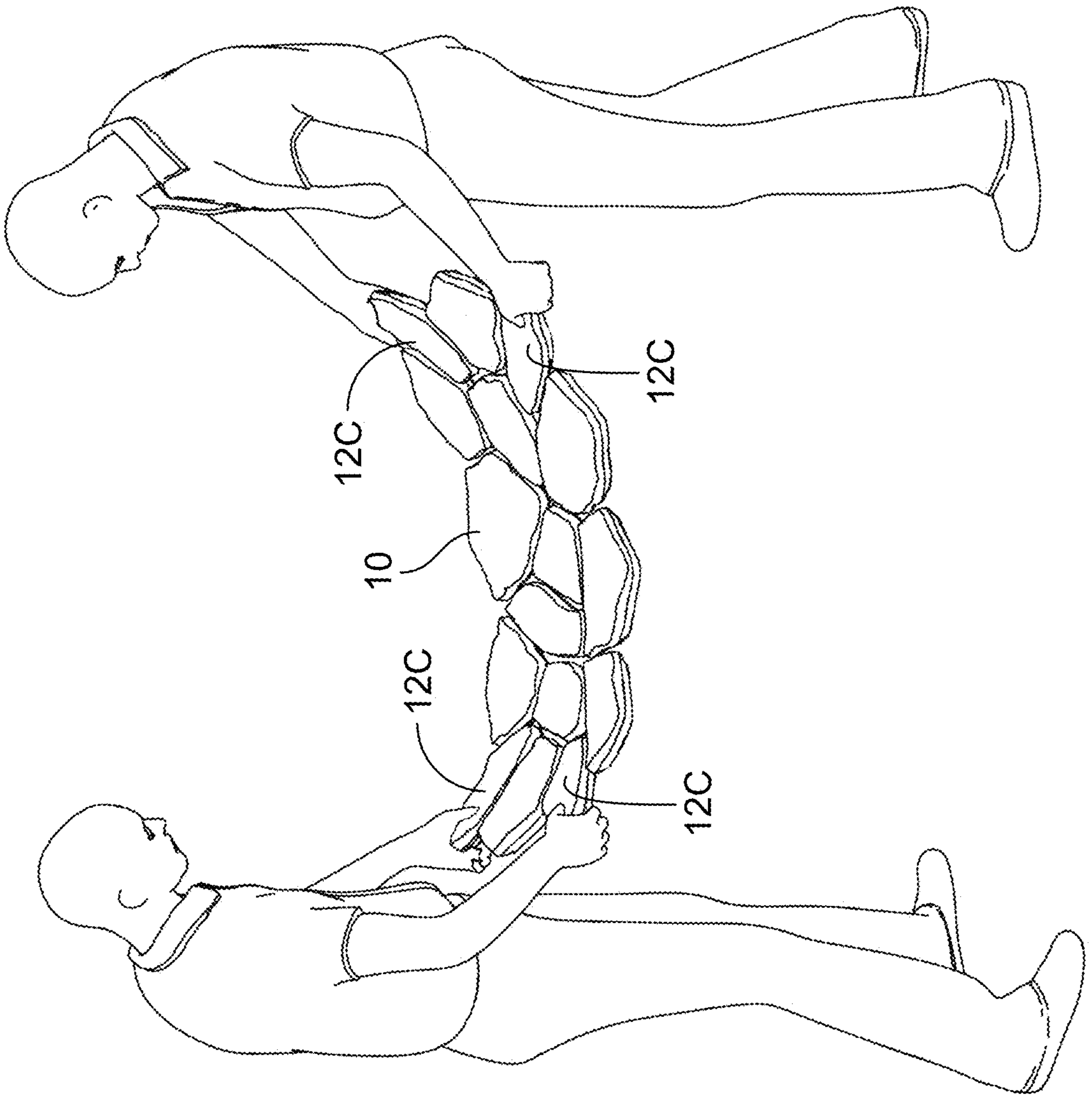
FIG. 22 is a schematic of the surface covering mat having units defining ergonomic handles for users to carry the mat.

The mats 10 arrive at the installation site in a condition to be installed by relatively unskilled workers, in one operation, by directly placing mats onto the soil or substrate S. As seen in FIG. 22, the mat 10 has four corner units 12C that define ergonomic handles for users to carry the mat from the pallet to the location of placement on the substrate S. The corner units 12C have a protruding geometry such that their relatively slim shape allows them to be easily accessible for manual gripping.

Figure 21:
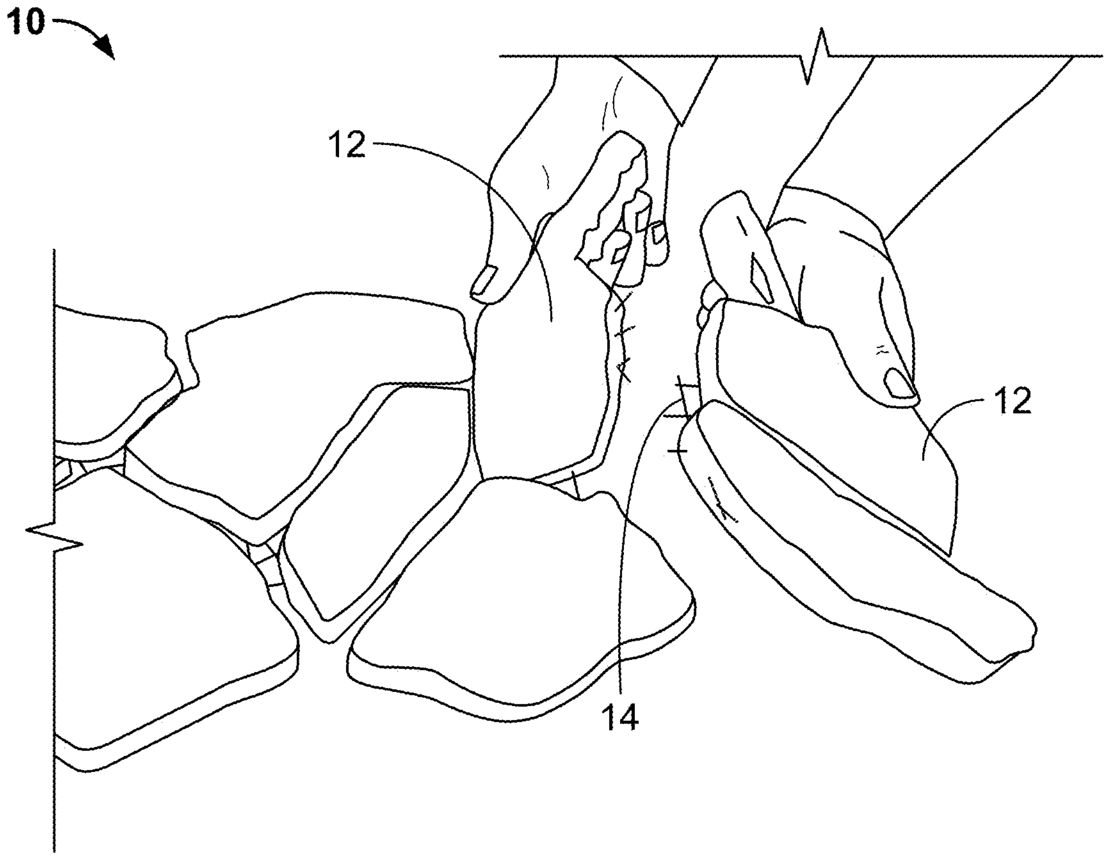
FIG. 21 is perspective view of the surface covering mat being manually broken-away through the geogrid.
Figure 25:
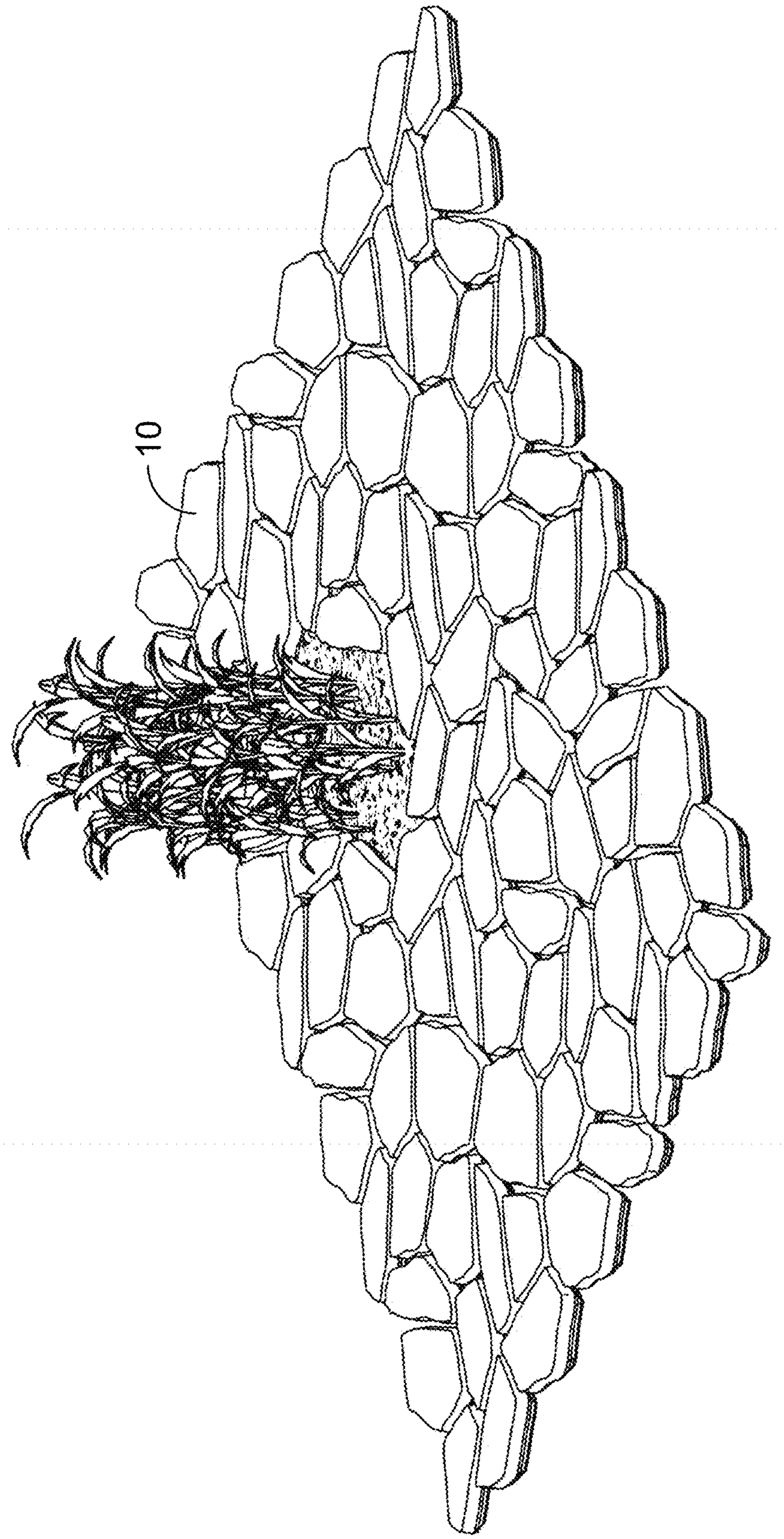
FIG. 25 is a schematic of the surface covering mat that has been trimmed-out to allow for vegetation.

Referring to FIGS. 21 and 25, trimming or cutting the mats 10 to fit around or against obstacles can be accomplished on site by manually breaking away units 12 by is using another unit as a fulcrum and fracturing the geogrid 14 (see FIG. 21).

Alternatively, the geogrid 14 can be cut between units 10 with a simple set of hand shears. Either way, trimming away portions of the mats 10 can allow space for vegetation or other obstacles (FIG. 25).

Figure 24:
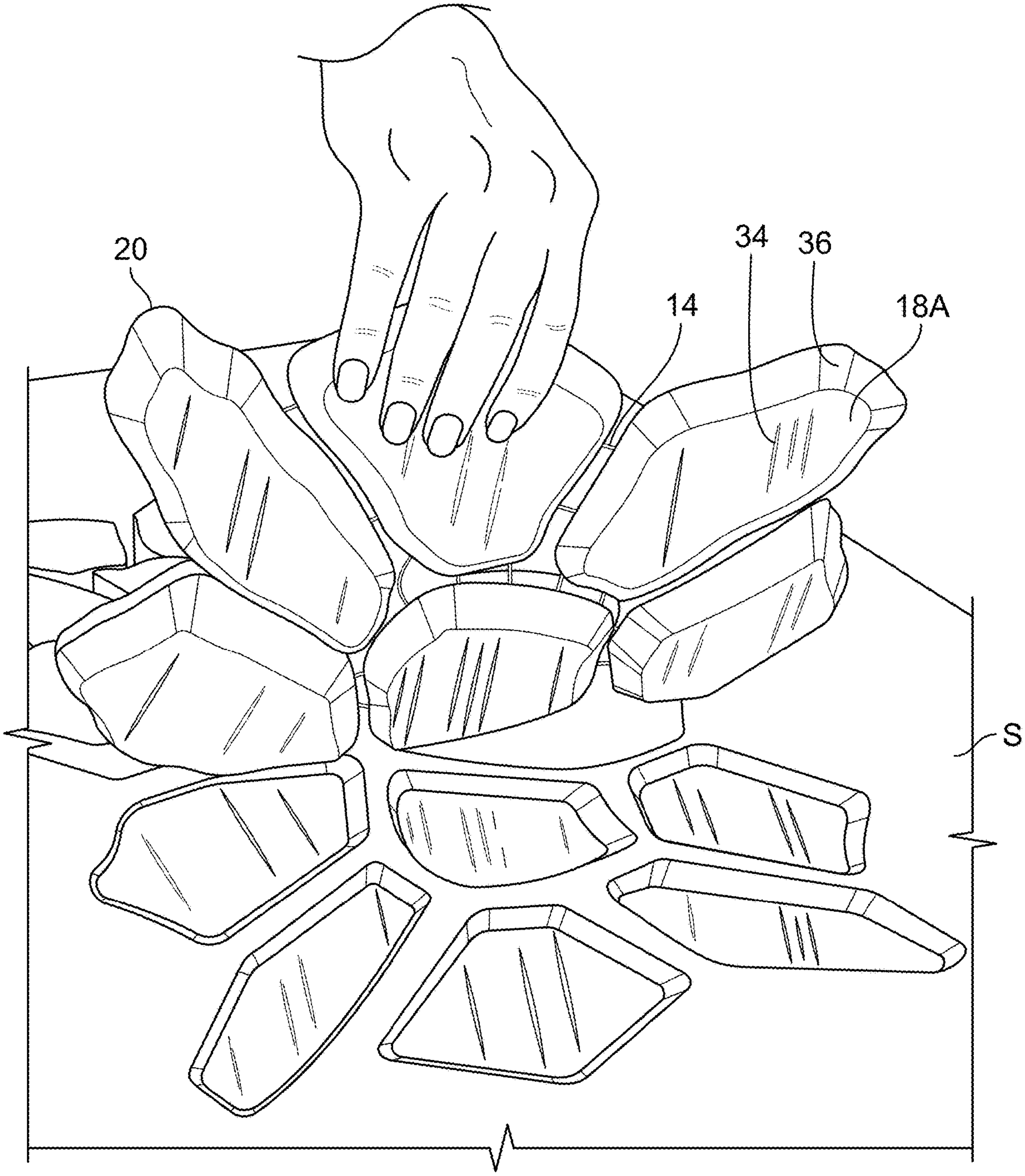
FIG. 24 is a perspective view of the surface covering mat being articulated above a substrate to reveal treads on the bottom surface thereof.

Referring to FIG. 24, the bottom surface 18A of the unit 12 may have treads 34 for gripping the substrate S. Also seen in FIG. 24, the unit 12 may have a bevel 36 in the range of about 20 to 45-degrees around the perimeter of the bottom surface 18A, which provides a smaller footprint of contact of the unit with the substrate S, and provides a larger area for drainage of water between units. The bevel 36 may extend from the bottom surface 18A at about 20 to 45-degrees to about the height of the embedded geogrid 14. When the mat 10 is placed on a substrate S, the bevel and the edge around any of the units 12 provide a channel for the drainage of water around the units.

Figure 26:
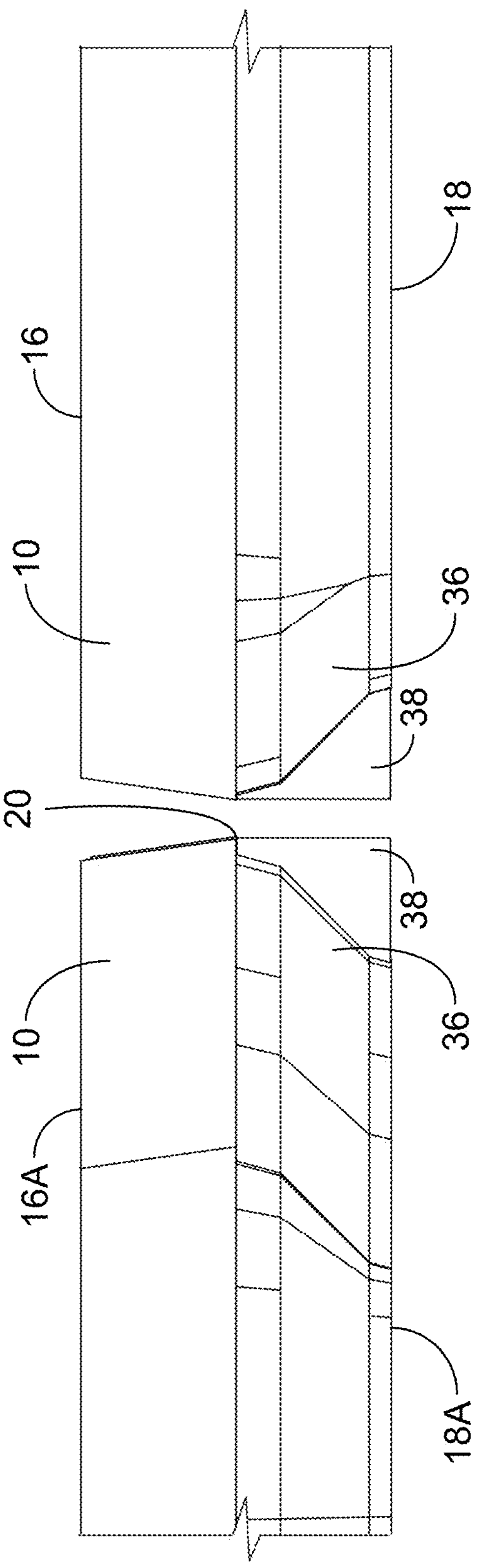
FIG. 26 is a detail view of an overlapping guard on two adjacent surface covering mats.

Extending from the peripheral surface 20 vertically downward in the direction of the substrate S, the mat 10 may have an optional overlap guard 38, as seen in FIG. 26. The overlap guard 38 may extend from the top of the bevel 36, from the level of the geogrid 14, from the outermost extent of the peripheral surface, or anywhere along the peripheral surface. Preferably, the overlap guard 38 extends from beneath the level of geogrid 14. The overlap guard 38 prevents relative sliding of adjacent units 10 so that one unit doesn't slide over the top of an adjacent unit in situ.

Another optional feature of the mats 10 includes spacers (not shown) that are either integrally formed (such as by molding) or removable and located at peripheral surfaces 20 of exterior units 10 to facilitate proper alignment between mats or to help prevent mat edges from sliding over adjacent mat edges during installation. Spacers are not required because irregular spacing between mats 10 also lends to the natural appearance of the finished installation.

Figure 27:
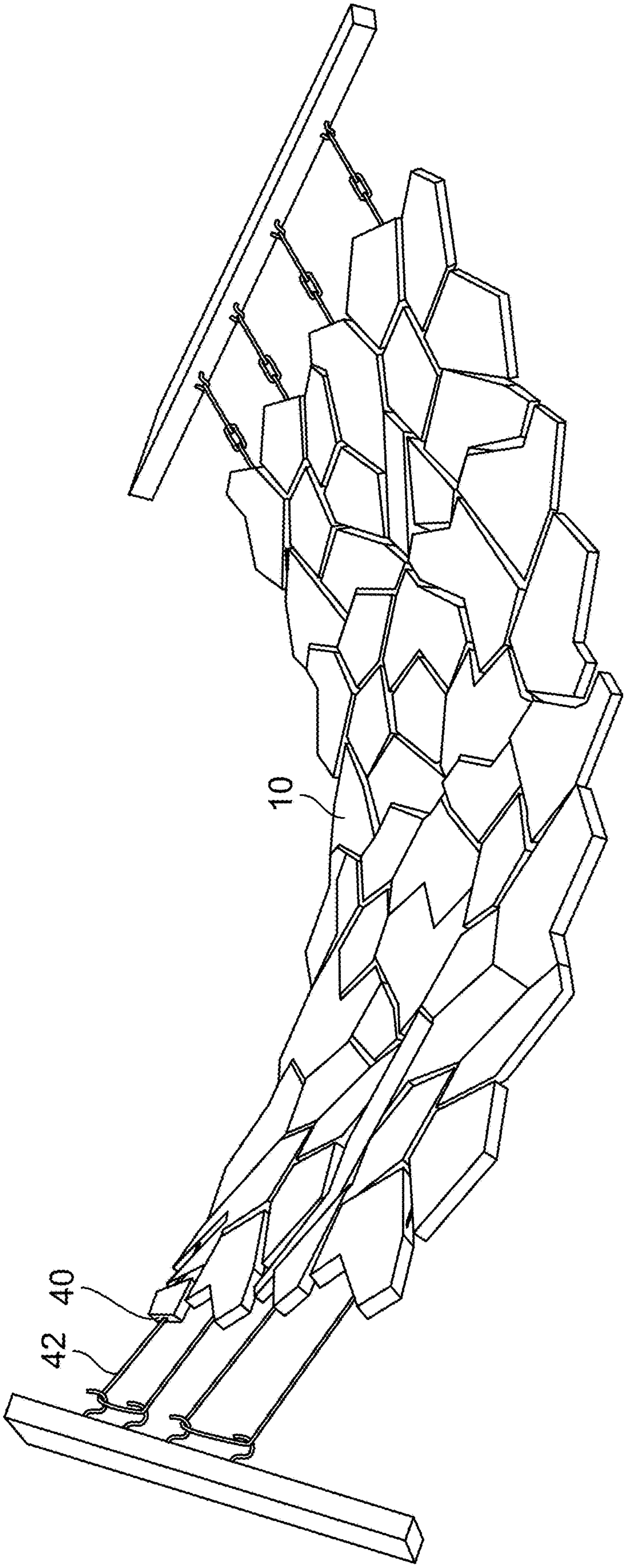
FIG. 27 is a perspective view of a surface covering mat having embedded cables.

As an alternative to manually placing the units 10 at the installation site, the mats 10 can incorporate a feed-thru cable-way 40 which would allow a crane to place the mats (See FIG. 27). The cable-way 40 may be molded into the mats, and an embedded cable 42 can extend through the cable-way for connection to a crane or for connection to other mats. The cable-way 40 is particularly well suited for larger mats 10, or where the mats need to be placed in water, or where the mats are to be placed on a steep slope, or on other difficult terrain.

With these features, the mats 10 can be placed on steep slopes without sliding down the substrate S. It has been found that the mats 10 can anchor themselves into the substrate in a 1-to-1 slope. Further, the combination of multiple mats 10, and specifically the cooperation of S-curve geometries on the multiple mats, interlockingly links the overall surface covering formed by the multiple mats, so that one mat cannot slide without pulling the rest of the mats with it. In this way, the interlocking cooperation among the mats 10 keeps the resulting surface covering in place.

Figure 28:
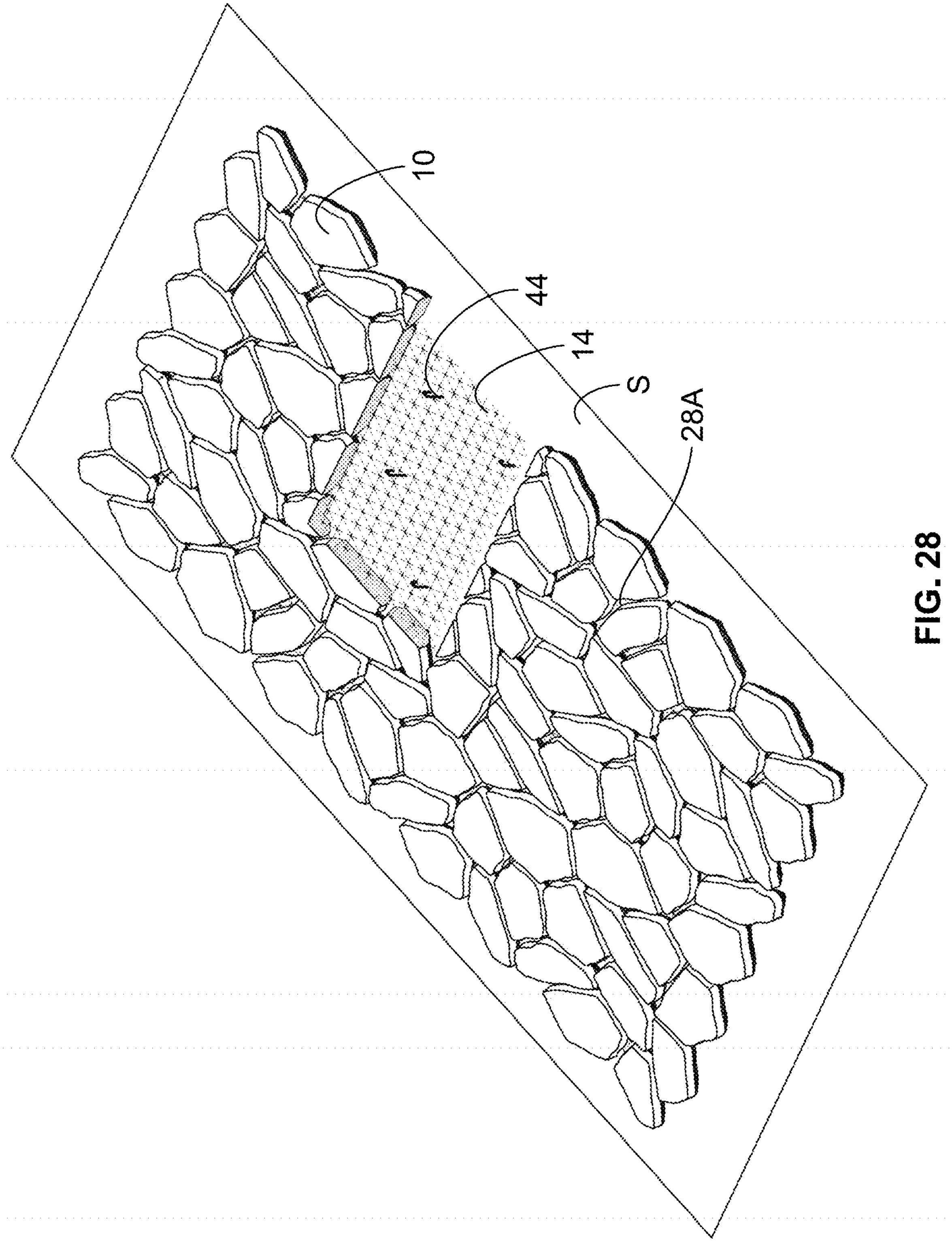
FIG. 28 is a partially cut-away view of the surface covering mat being pinned through the exposed geogrid with a pin to a substrate.
Figure 29:
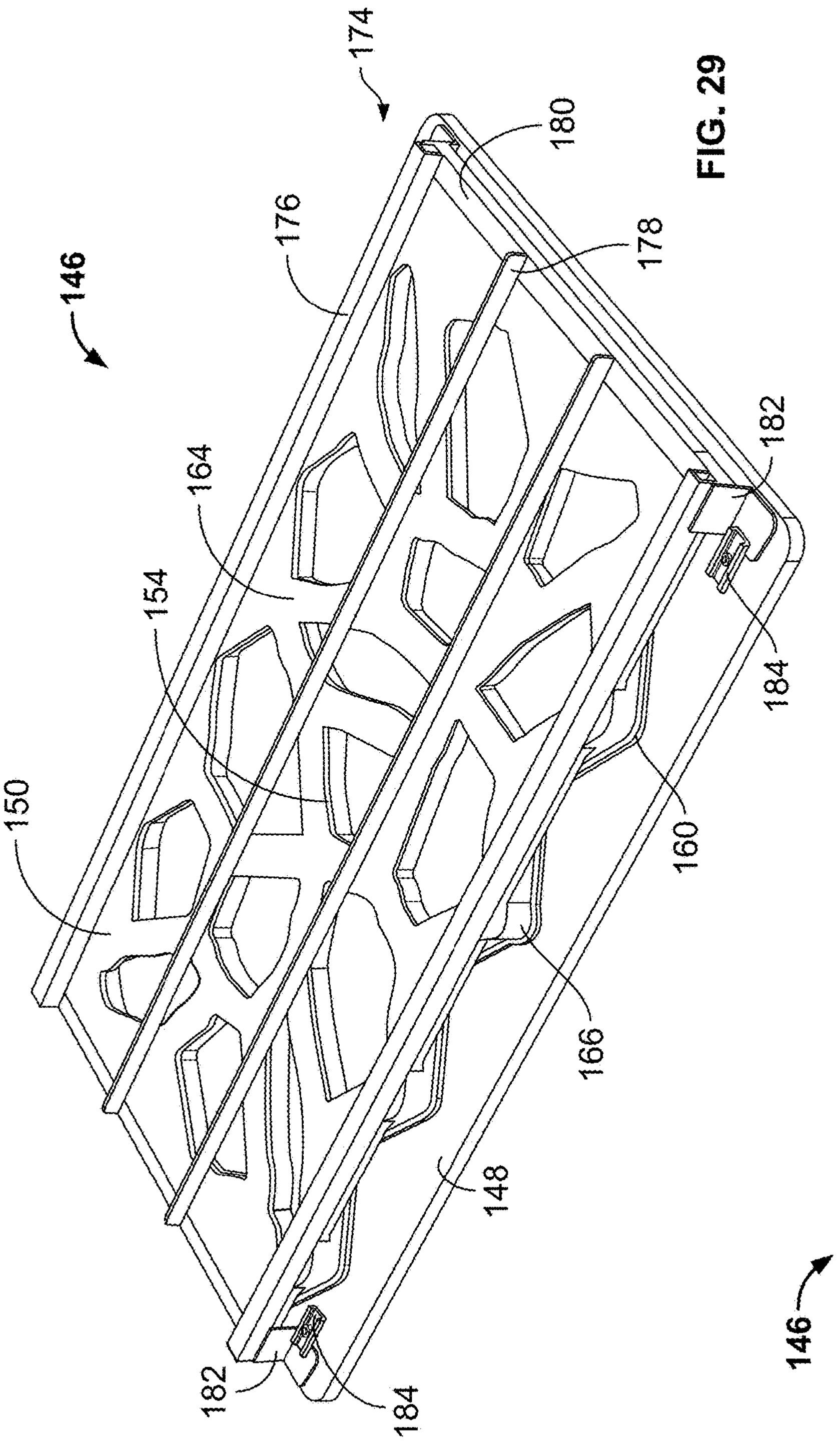
FIG. 29 is a perspective view of a second embodiment of a mold assembly for making the surface covering mat.

However, referring to FIG. 28, pins 44 can be inserted into the geogrid 14 at the gaps 28A to assist in anchoring the mat 10 to the substrate S. It is contemplated that with the assistance of pins 44, the mats can be used on a steep slope up to a near vertical wall. Examples of pins 44 include nails, staples, hooks, and other known anchoring devices.

It is contemplated that different mats 10 can be used for commercial/homeowner purposes than for applied engineering purposes. In the smaller commercial or homeowner embodiment, the mat 10 is preferably about 1.75 square feet in surface area and weighs about 12 pounds, although other surface areas and weights are contemplated. In the applied engineering mat embodiment, the mat 10 is preferably about 5.6 square feet in surface area and has a weight of about 60 pounds, however other surface areas and weights are contemplated.

In the finished installation, mats 10 are arranged in combination with each other to form a covering over the substrate S. Once installed, the individual units 12 contained in the mats 10 will visually appear as individuals and not as mats. The result is a substrate that looks as if it were covered with individual natural stones of irregular shape and thickness.

Referring to FIGS. 14-17, a method of manufacturing the mats 10 is shown in its most simplified form. The mats 10 are manufactured upside-down in mold assemblies 46. The mold assemblies 46 consist of a bottom mold 48 and a top mold 50. The bottom mold 48 has texture and is used to form (face down) the irregular exposed top surface 16 of the individual units 12 of the finished mat 10.

A pre-sized segment or segments of geogrid 14 is placed on the bottom mold 48 in a predetermined position, and then the top mold 50, which forms the underside of the units 12 as well as the optional cleats 26, is placed over the bottom mold 48. When the top mold 50 is placed on the bottom mold 48, the geogrid 25 is sandwiched between the top mold and the bottom mold. The filler 52, preferably concrete, and more preferably fiber reinforced concrete, is then poured or placed into the mold assembly 46 through openings 54 provided in the top mold 50. It is contemplated that the filler 52 can be any sort of wet cast material. Because the geogrid 14 has open apertures 15, the flow of concrete 52 through the geogrid and into the multiple sections of the bottom mold 48 is facilitated. Additional concrete 52 is added until the top mold 50 is completely filled, thereby embedding the geogrid 14. In an embodiment of mat 10 with cleats 26, the protruding cleats are formed at the top surface of the filled concrete. Between the geogrid 14 reinforcing the concrete 52, and the fiber reinforcement within the concrete, the likelihood of flexural, compressive or environmental failure of the units 12 is minimized.

Figure 18:
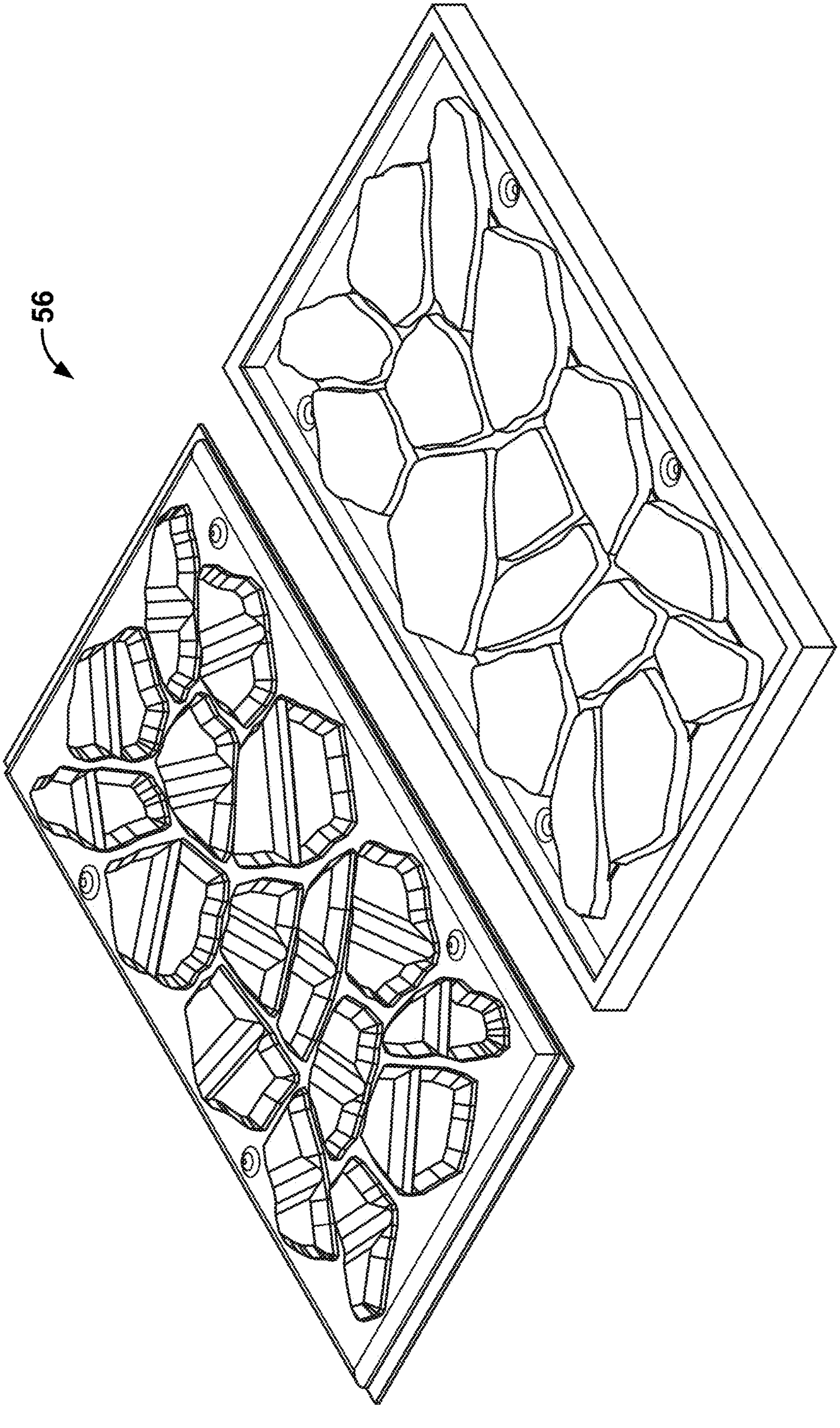
FIG. 18 is a perspective view of two partial master molds for making the bottom mold and the top mold of FIG. 14.

As seen in FIG. 18, the bottom mold 48 and the top mold 50 are created with a master mold 56, which is the inverse profile of the bottom mold and the top mold. The master mold 56 may be sculpted with draft to allow easier release of the mold assembly 46.

Referring now to FIGS. 29-40, a second embodiment of mold assembly is indicated generally at 146, and has a bottom mold 148 and a top mold 150. Like the mold assembly 46, the bottom mold 148 has texture formed into its bottom surface so that it forms (face down) the irregular exposed top surface 16 of the individual units 12 of the finished mat 10. The bottom mold 148 and the top mold 150 are preferably formed of a high-durometer rubber, which renders the mold assembly 146 flexible and easy to clean, however other materials are contemplated. Preferably, the bottom mold 148 is a single component or single assembly, and preferably the top mold 150 is unitarily or integrally formed, which reduces the amount of moving parts that need to be aligned within the mold assembly 146.

The bottom mold 148 has a generally planar bottom surface 158, which preferably includes the texture for forming the irregular top surface 16 of the units 12. The bottom mold 148 also includes multiple transverse walls 160 extending upwards from the planar bottom surface 158 forming chambers 162. These chambers 162 are where the units 12 are molded. The top mold 150 has a generally planar top surface 164, and multiple transverse walls 166 extending downwards from the planar top surface. The multiple transverse walls 166 of the top mold 150 and/or the generally planar top surface 164 of the top mold define the openings 154 for receiving the concrete or other filler 52 into the mold assembly 146.

Figure 30:
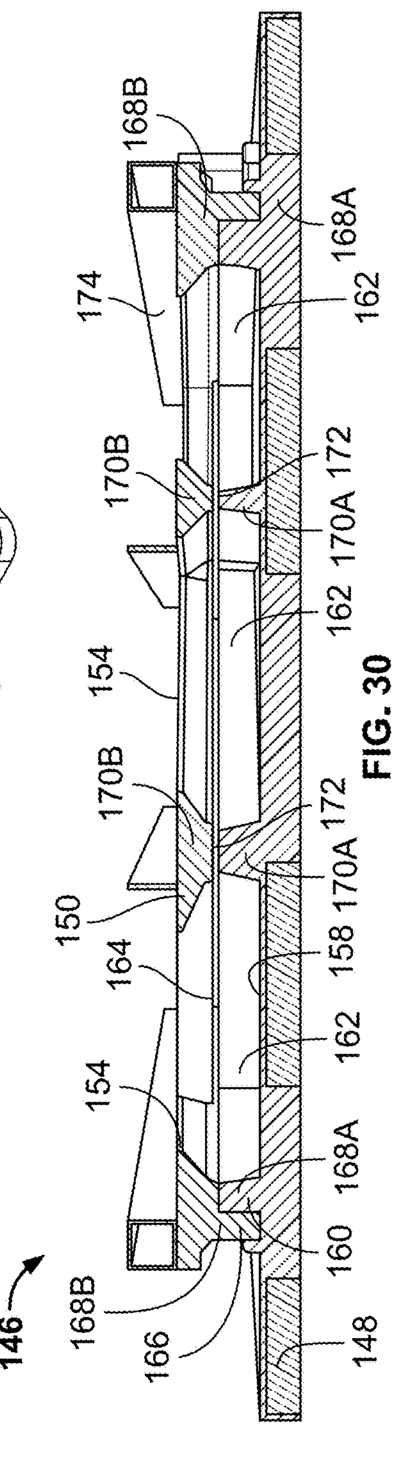
FIG. 30 is a section view of the mold assembly of FIG. 29 showing a cavity for receiving the geogrid.
Figure 31:
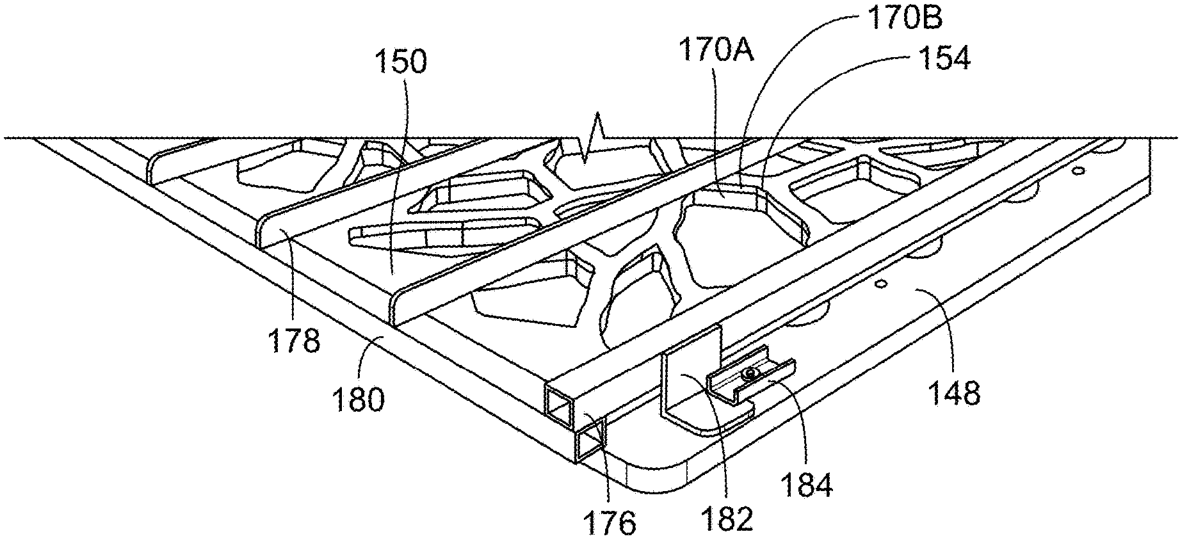
FIG. 31 is a detail view of the mold assembly of FIG. 29 showing a steel frame above the top mold.

When the top mold 150 is placed on the bottom mold 148, a first portion of the transverse walls 160 of the bottom mold 148 are non-sealing walls 170A and a first portion of the transverse walls 166 of the top mold 150 are non-sealing walls 170B that define a cavity 172 for receiving the geogrid 14 (see FIG. 30). It is contemplated that the bottom mold 148, the top mold 150, or a combination of both the bottom and top molds can define the cavity 172. Since in use, the non-sealing walls 170A, 170B have geogrid 14 sandwiched between them, depending on the filler 52 used, some seepage may occur at the cavity 172, through the geogrid, and through the non-sealing walls. The height of the cavity 172 is preferably the same or slightly larger than the thickest point on the geogrid 14, which is typically located at the node of the geogrid.

A second portion of the transverse walls 160 of the bottom mold 148 are sealing walls 168A, and a second portion of the transverse walls 166 of the top mold 150 are sealing walls 168B that, in the absence of the geogrid 14 therebetween, contact each other and positively seal to prevent seepage of the filler. The sealing walls 168A, 168B are generally located at the periphery of the mold assembly 146, however in an embodiment of the mold where more than one mat 10 is formed at once, then the sealing walls are also located within the interior of the mold (as will be discussed with detail with respect to FIG. 32 below).

After the concrete or other filler 52 is received into the mold assembly 146, the mold has a tendency to be pushed apart by the forces exerted by the concrete. A press 174 is applied to the top planar surface 164 of the top mold 150 to aid in maintaining the top mold 150 on the bottom mold 148. The press 174 is preferably a steel frame 176 having longitudinal members 178 that run generally the length of the mold assembly 146, and lateral members 180 connecting the longitudinal members, however any number and arrangement of rigid members forming a frame are contemplated. Both the longitudinal and lateral members 178 and 180 preferably abut the planar top surface 164 of the top mold 150 to press the top mold against the bottom mold 148.

At least two, and preferably four, clamping feet 182 extend from the frame 176 downwardly towards the bottom mold 148. A clamp 184 selectively engages the clamping feet 182 to pin the press 174 to the bottom mold 148. It is contemplated that the clamping feet 182 are also steel, or any other rigid material, such that the press 174 forms a frame 176 that permits stacking of multiple mold assemblies 146 one on top of the other (See FIG. 46).

Figure 32:
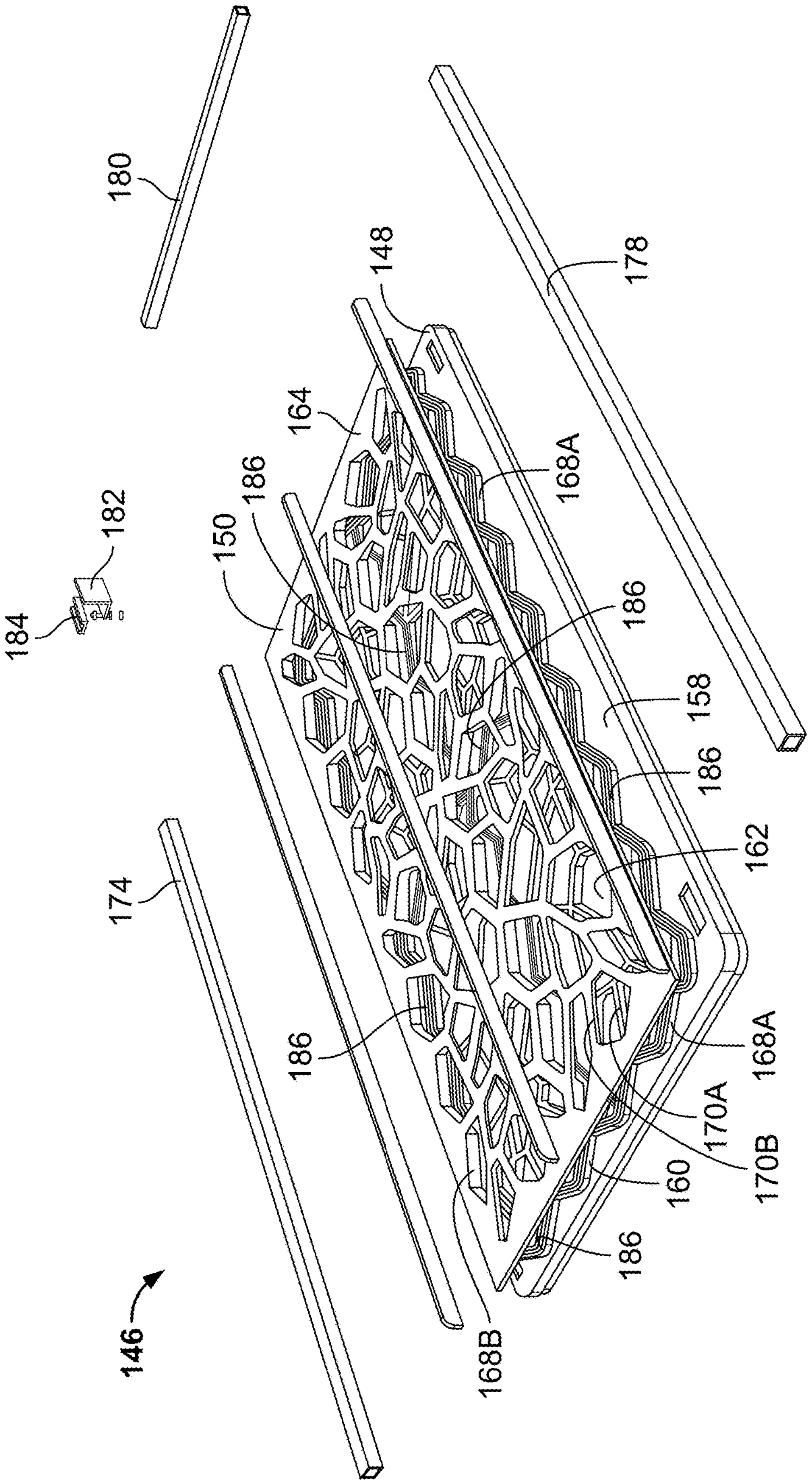
FIG. 32 is an exploded view of the mold assembly of FIG. 29 showing a groove in the bottom mold.

Referring to FIG. 32, it can be seen that four mats 10 are formed in a single mold assembly 146 at one time, i.e. four mats per cycle on each mold assembly. Although the following description is made with respect to four mats 10, any number of mats in multiples of two are contemplated. The transverse walls 160 in the planar bottom surface 158 include both sealing walls 168A and non-sealing walls 170A. The sealing walls 168A can be seen at the periphery as having grooves 186. Additionally, grooves 186 are formed into the sealing walls 168A that generally bisect the mold longitudinally and laterally. Corresponding positive structures 188 are formed into the sealing walls 168B of the top mold planar surface 164 (as seen in FIGS. 30 and 35).

Figure 33:
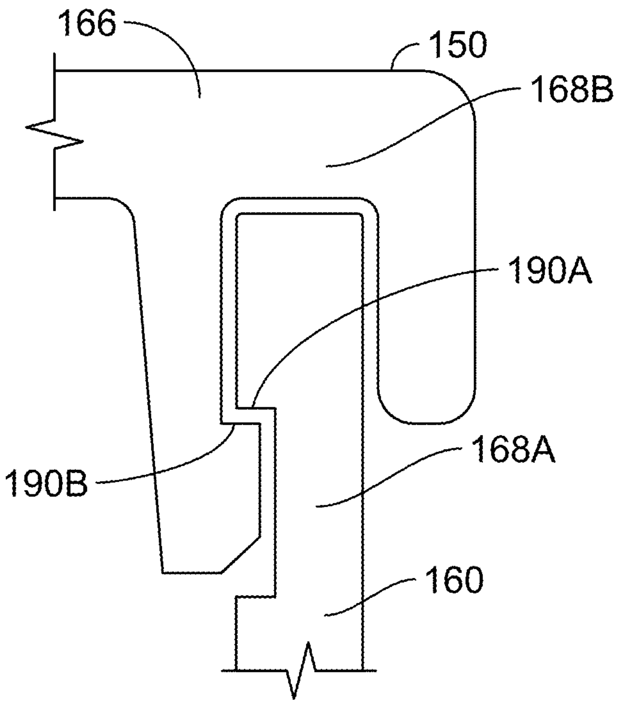
FIG. 33 is a detail section view of a first embodiment of snap-fit between the top mold and the bottom mold at the location of the trough.
Figure 34:
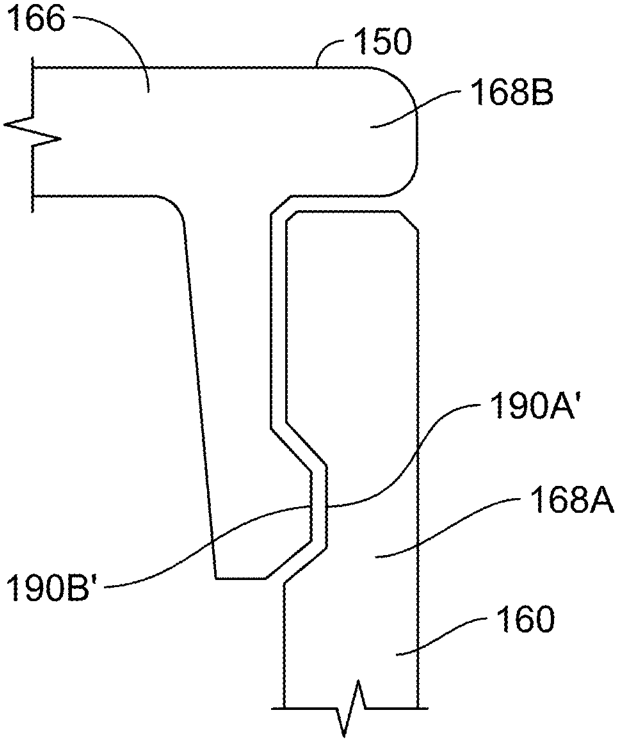
FIG. 34 is a detail section view of a second embodiment of snap-fit between the top mold and the bottom mold at the location of the trough.

It is contemplated that the sealing walls 168B of the top mold 150 and the sealing walls 168A of the bottom mold 148 may have a selectively releasable snap-fit structure 190A, 190B and 190A' and 190B' as shown in FIGS. 33 and 34. The structures shown in FIGS. 33 and 34 are just two examples of releasable snap-fit structures, and other snap-fit structures are contemplated. One such snap-fit structure would be substantially identical to structures 190A, 190B and 190A',190B' except that they would be double-sided, having a mirror image along a vertical plane (not shown) of FIGS. 33 and 34. The sealing wall 168A, 168B includes bottom transverse wall 160 and upper transverse wall 166 that engage each other. Each transverse wall 160 and 166 is flexible and is provided with a complimentary shape. The engagement of the sealing wall 168A, 168B is accomplished by pushing the interlocking components together, and separation of the sealing wall 168A, 168B is accomplished by elastically deforming the wall. It is also contemplated that incorporation of the snap-fit structures 190A, 190B and 190A' and 190B' could obviate the use of the press 174.

Figure 38:
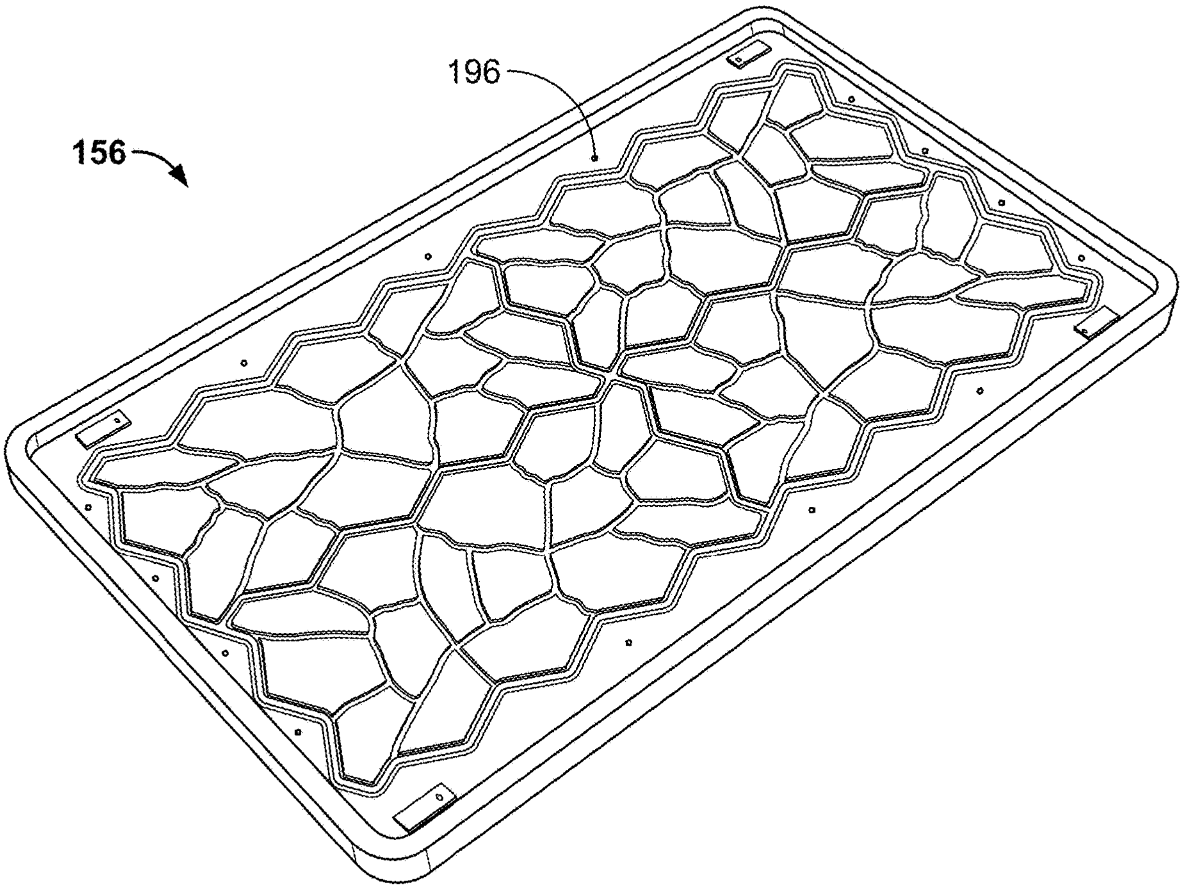
FIG. 38 is a perspective view of the mother mold having suspension points for the plywood core.
Figure 39:
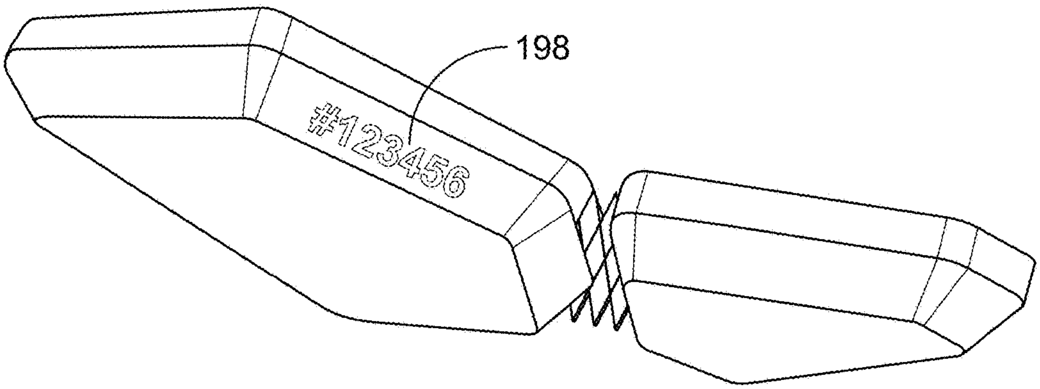
FIG. 39 is a perspective view of a branded unit.

Still referring to FIG. 32, and as can be further seen in FIG. 38, the upper right mat and the lower left mat to be formed in the mold assembly 146 are the same mats, albeit rotated 180-degrees. Further, the upper left mat and the lower right mat to be formed in the mold assembly 146 are the same units, albeit rotated 180-degrees. In other words, the upper right mat to be formed is defined by transverse walls 160 that are identical, but rotated 180-degrees, to the transverse walls 160 on the lower left of the is bottom mold 148, and the upper left mat to be formed is defined by transverse walls 160 that are identical, but rotated 180-degrees, to the transverse walls 160 on the lower right of the bottom mold 148. With this particular configuration, the top mold 150 can be placed onto the bottom mold 148 in either a 0-degree direction or in a 180-degree rotated direction. This means that in a rectangular mold assembly 146, user error is reduced because the rectangular top mold 150 will only go onto the rectangular bottom mold 150 in two orientations (0-degrees or 180-degrees) and both of these orientations will result in a sealing of the transverse wall 160, 166 and the mat 10 being formed.

Figure 35:
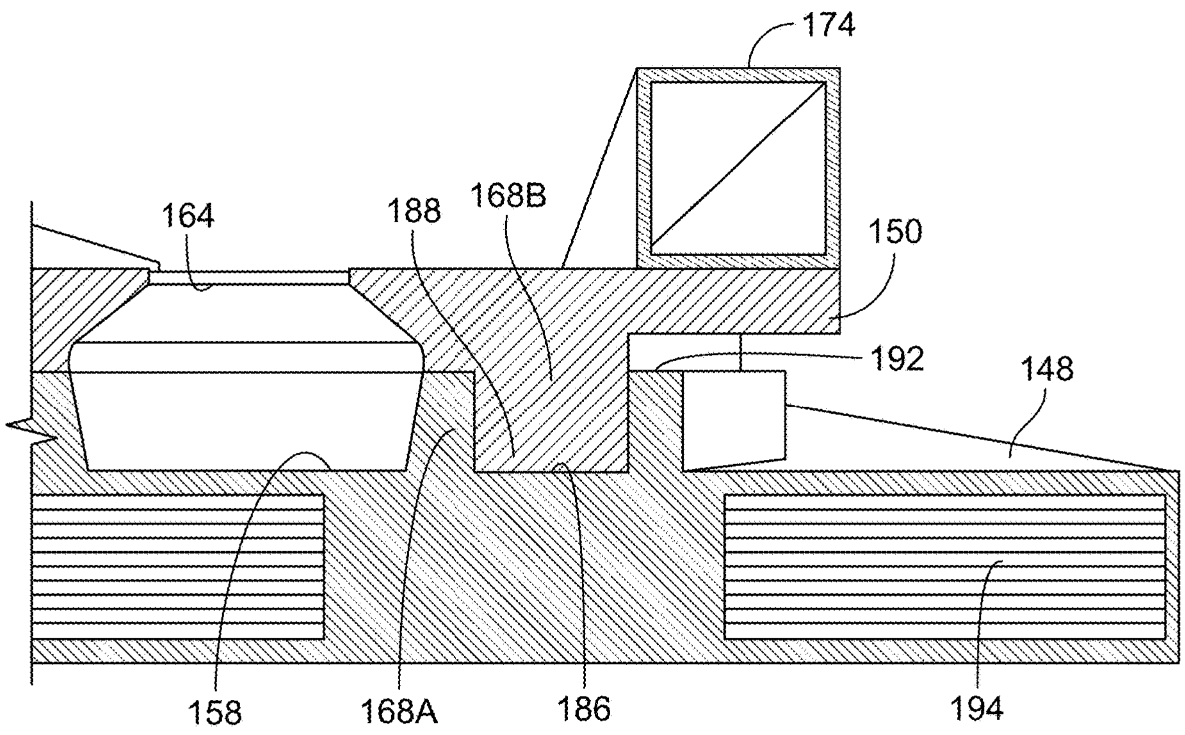
FIG. 35 is a detail section view of an outer gasket on the bottom mold.
Figure 36:
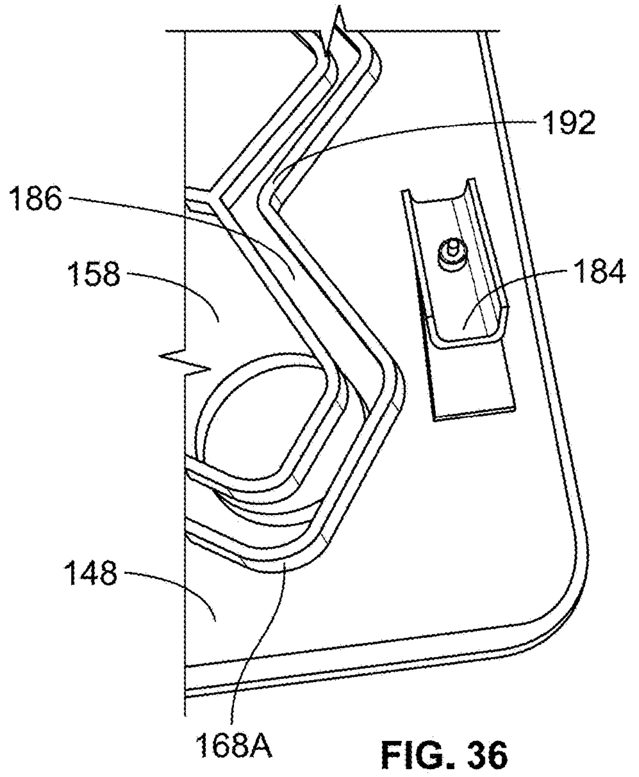
FIG. 36 is a detail perspective view of the outer gasket on the bottom mold.

As seen in FIGS. 35 and 36, the sealing wall 168A of the bottom mold planar bottom surface 158 sealingly engages with corresponding positive structure 188 of the sealing wall 168B of the top mold planar top surface 164. In the preferred embodiment, the sealing wall 168A is a double-wall with the groove 186 therebetween. A gasket 192 may be formed in the exterior double-wall of the sealing wall 168A, or alternatively may be formed in the sealing wall 168B of the top mold 150, to further seal the periphery of the mold assembly 146. With the gasket 192, leaks outside of the mold assembly 146 can be prevented or reduced. Gaskets 192 may also be located at any of the sealing walls 168.

Figure 37:
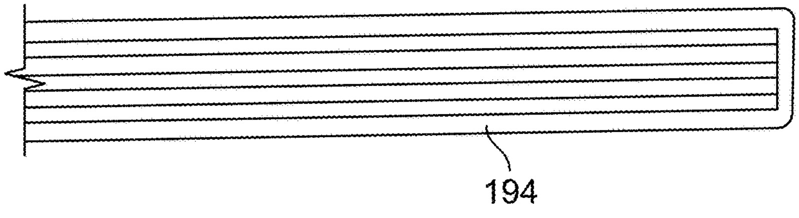
FIG. 37 is a detail view of an encapsulated plywood core of a mother mold.

Referring to FIG. 37, the bottom mold 148 may include a solid core 194, such as a plywood core, that is encapsulated in rubber. The plywood provides rigidity to manufacture larger mats 10, and the rubber is easy to clean. Referring now to FIG. 38, the master mold 156 for forming the mold assembly 146 includes suspension points 196 for receiving the plywood core. It is also contemplated that branding inserts can be used to incorporate branding 198 onto the units 12 (See FIG. 39).

To manufacture the unit 10, the bottom mold 148 is disposed on a substantially level surface, and the geogrid 14 is placed horizontally on the bottom mold, and specifically within the cavity 172. The geogrid 14 preferably does not extend over the top of the sealing walls 168A. Thereafter, the top mold 150 is placed over the bottom mold 148, thereby sandwiching the geogrid between the top mold and the bottom mold. The sealing walls 168B of the top mold 150 are sealingly engaged to the sealing walls 168A of the bottom mold 148, preferably by engaging the positive structures 188 of the top mold into the grooves 186 in the bottom mold. The snap-fit structure 190A, 190B may be used to seal the walls 168A, 168B. Likewise, the non-sealing walls 170B of the top mold 150 are preferably engaged on the geogrid 14, which is in turn engaged on the non-sealing walls 170A of the bottom mold 148.

The press 174 is positioned over the top of the top mold 150, and the clamping feet 182 are secured with the clamps 184. The concrete filler 52 is then poured or placed into the mold assembly 146 through the openings 154 provided in the top mold 150. Because the geogrid 14 has open apertures, the flow of concrete 52 through the geogrid and into the multiple chambers 162 of the bottom mold 148 is facilitated. Additional concrete 52 is added until the top mold 50 is completely filled, thereby embedding the geogrid 14.

Figure 40:
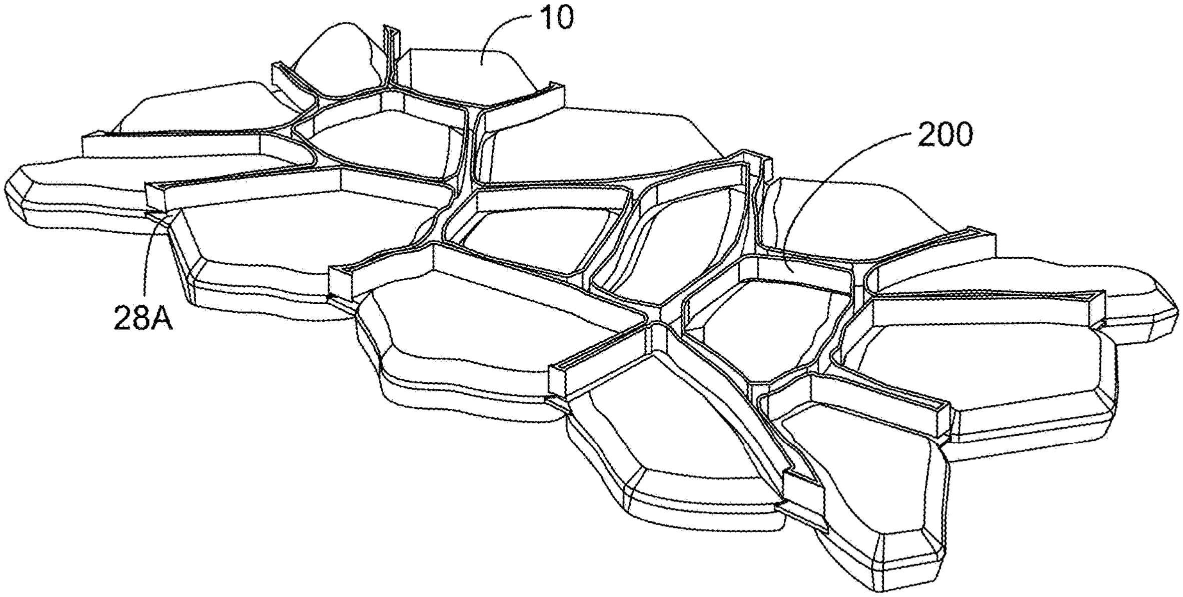
FIG. 40 is a perspective view of the surface covering mat having a flash dislodger placed between the individual units to dislodge the flash between the units.

Referring to FIG. 40, a flash dislodger 200 may be inserted into the flash that may result following formation of the mat 10. The flash dislodger 200 may be inserted after molding and initial set, while the unit 10 is still in the mold assembly 146, or alternately after the unit has been removed from the mold assembly. The flash dislodger 200 is preferably a steel plate having a shape that corresponds with the gaps 28A in the mat 10. Upon insertion of the flash dislodger 200 into the formed mat 10, the flash dislodger is vibrated, and optionally pressure may be applied, to dislodge the flash and free up the geogrid 14 between the individual units 12. It is contemplated that the flash dislodger 200 has near vertical edges. It is also contemplated that the flash dislodger 200 may have saw-toothed edges to facilitate removal of the flash.

The mats 10 are preferably molded of fiber reinforced concrete, however materials such as ceramics, plastic, natural or synthetic rubber, glass or other suitable material, or combinations thereof are contemplated. To further improve the natural appearance of the mats 10, it is desirable to provide variations in the individual units 12. In addition to differing the shapes of the units 12, dyes and colorants may be added, and the color and quantity of dye may be regulated to produce color variations from unit-to-unit and mat-to-mat. Surface variations in the top surface 16 and the peripheral surface 20 from unit-to-unit and mat-to-mat are also desirable.

Referring now to FIGS. 47-51, a third embodiment of mold assembly is indicated generally at 246, and has a bottom mold 248 and a top mold 250. Like the mold assembly 146, the bottom mold 248 and the top mold 250 are preferably formed of a high-durometer rubber, which renders the mold assembly 246 flexible and easy to clean, however other materials are contemplated. It is contemplated that the mold assembly 246 can incorporate all or some of the features of the mold assembly 146 to manufacture mats 10 having all or some or all of the features previously discussed. Further, it is contemplated that the mold assembly 246 can be used to form mats 10 having both regularly-shaped units having regular or irregular spacing between the units 12 and irregularly-shaped units having irregular or regular spacing between the units. The mold assembly 246 includes a magnetic latch 252, which will be described with more particularity below.

The multiple transverse walls 266 of the top mold 250 and/or the generally planar top surface 264 of the top mold define the openings 254 for receiving the concrete or other filler 52 into the mold assembly 246. After the concrete or other filler 52 is received into the mold assembly 246, the mold assembly has a tendency to be pushed apart by the forces exerted by the filler 52. The magnetic latch 252 maintains the top mold 250 on the bottom mold 248 and obviates the need for the press 174 of the second embodiment. Alternatively, it is contemplated that the magnetic latch 252 can be used in tandem with the press 174.

Specifically, when the top mold 250 is placed on the bottom mold 248, a first is portion of the transverse walls 260 of the bottom mold 248 are cavity walls 270A and a first portion of the transverse walls 266 of the top mold 250 are cavity walls 270B that define the cavity 272 for receiving the geogrid 14. It is contemplated that the bottom mold 248, the top mold 250, or a combination of both the bottom and top molds can define the cavity 272. A second portion of the transverse walls 260, 266 form sealing walls 268A at the bottom mold 248 and 268B at the top mold 250. In the mold assembly 246, the sealing walls 268A, 268B are walls that contact an opposing sealing wall, which are preferably every portion of the transverse walls 260, 266 except for at the location of the cavity 272. At the location of the cavity 272, the transverse walls 260 and 266 do not contact each other.

Since in use, the cavity walls 270A, 270B have geogrid 14 sandwiched between them, depending on the filler 52 used, the cavity walls 270A and 270B may separate, and some seepage may occur outside of the walls that define the units 12. When seepage occurs with materials such as concrete, removal of the subsequent flash from the units 12 can be burdensome and can require mechanical means to remove the flash, such as with the flash dislodger 200. In addition, the sealing walls 268A, 268B have forces exerted on them by the filler that causes them to want to separate.

The magnetic latch 252 maintains the sealing walls 268A, 268B of the transverse walls 260, 266 in contact with each other in a closed position, and maintains the cavity walls 270A and 270B pressed against the geogrid 14. In the most basic form, the magnetic latch 252 includes at least a first magnet 274 located on, within or attached to either the top mold 250 or the bottom mold 248, and a second magnet 276 (including any material that is feromagnetic) that is attracted to the first magnet that is located either on, within, or attached to the other of the top mold or the bottom mold, or alternatively located in such a manner as to magnetically force the top and bottom molds together. In a preferred embodiment, at least a first magnet 274 is located in one or more locations at the transverse walls 266 of the top mold 250 (or alternatively in is one or more locations at the transverse walls 260 of the bottom mold 248), and at least one second magnet 276 is located in one or more locations at the transverse walls 260 of the bottom mold 248 (or alternatively in one or more locations in the transverse walls 266 of the top mold 250). In this preferred embodiment, at least one first magnet 274 is located in the transverse wall 266 and at least one second magnet 276 is located in the transverse wall 260 to prevent the upwards movement of cavity wall 270B away from cavity wall 270A. It is preferred that multiple first magnets 274 are located in a spaced arrangement throughout and along the length of the transverse walls 266 at the sealing walls 268B (i.e. anywhere other than the location of the geogrid 14), and multiple second magnets 276 are located in a spaced arrangement throughout and along the length of the transverse walls 260 at the sealing walls 268A (i.e. anywhere other than the location of the geogrid 14). In one preferred embodiment, there are at least three sets of magnets 274, 276 on the transverse walls 260, 266 that define each unit 12 of the mat 10, however the number and the spacing of the magnets 274, 276 may be determined by the size of the mold assembly 246, the size of the units 12, the strength of the magnets, the strength/rigidity of the molds 248, 250, and in particular the strength/rigidity of the sealing walls 268A, 268B.

It is contemplated that the magnetic latch 252 may be placed anywhere on the top and bottom molds 250, 248. In the preferred embodiment, the first magnets 274 are located in multiple locations throughout the length of the transverse walls 266 of the top mold 250 (or alternatively in multiple locations throughout the length of the transverse walls 260 of the bottom mold 252). In another embodiment, the first magnets 274 are located only in the corners of the top mold 250 or the bottom mold 248. Alternatively, instead of having second magnets 276 located in the bottom mold 248, it is contemplated that the bottom mold may be placed on a platform that incorporates ferromagnetic material and the top mold includes a first magnet, such that the top mold is sealed to the bottom mold by the first magnet's attraction to the ferromagnetic platform. Alternatively, the first magnet may be attracted to any other ferromagnetic structure located beneath the bottom mold 248. Further still, it is contemplated that first magnets 274 are located only in the bottom mold 248 and that the first magnet is attracted to a structure of ferromagnetic material placed over the top of the top mold 250.

In the preferred embodiment, the first magnet 274 and the second magnet 276 are received into the sealing walls 268A, 268B of the transverse walls 260, 266 such that they are encapsulated by a layer of the mold. In this configuration, the magnets 274, 276 retain their attraction to each other while being prevented from being pulled out of the transverse walls 260, 266 when the top mold 250 and the bottom mold 248 are separated from each other. Other configurations of maintaining the magnets 274, 276 within their respective molds 248, 250 are contemplated, such as a friction fit, reinforcing the mold, molding into a recess of the magnet, and casting the magnet in a suspended state when the mold is cast.

Figure 49:
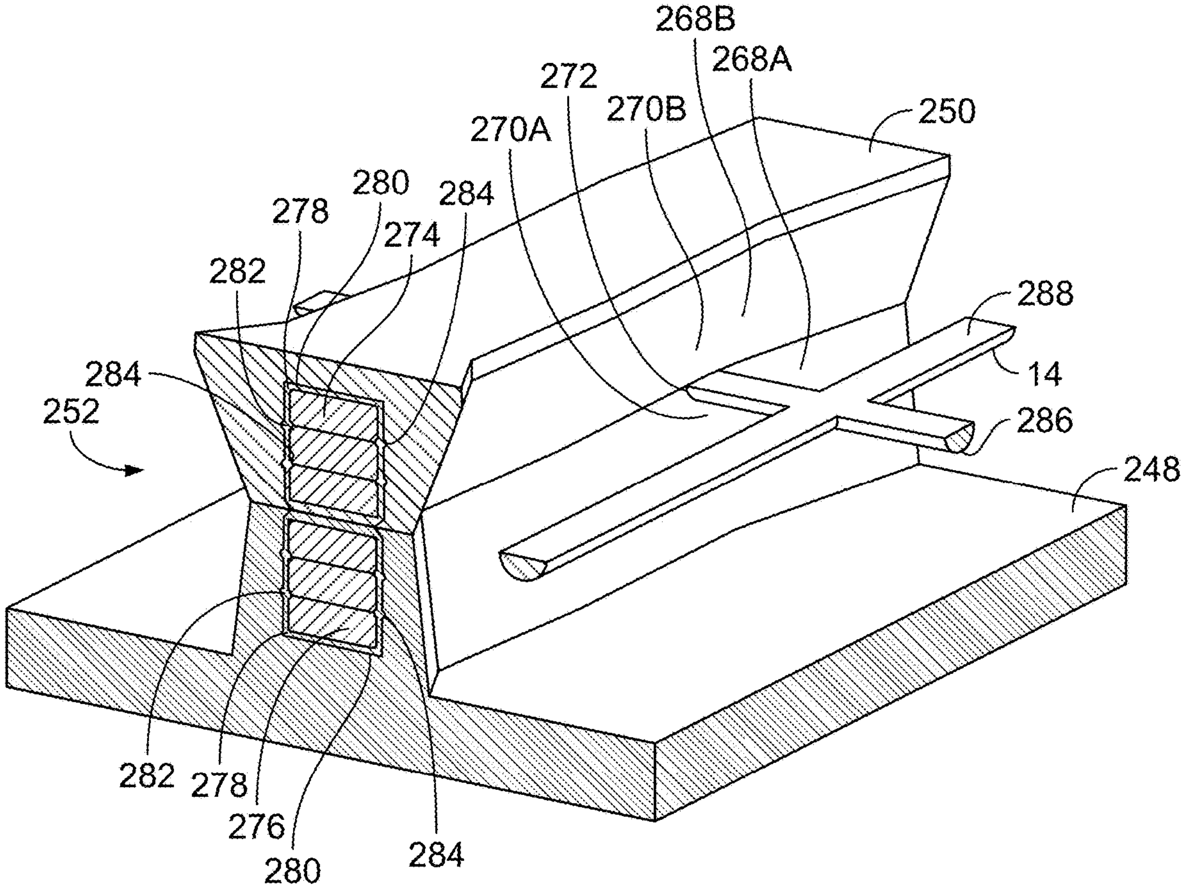
FIG. 49 is a detail view of the magnetic latch encapsulated in the mold assembly of FIG. 47.
Figure 50:
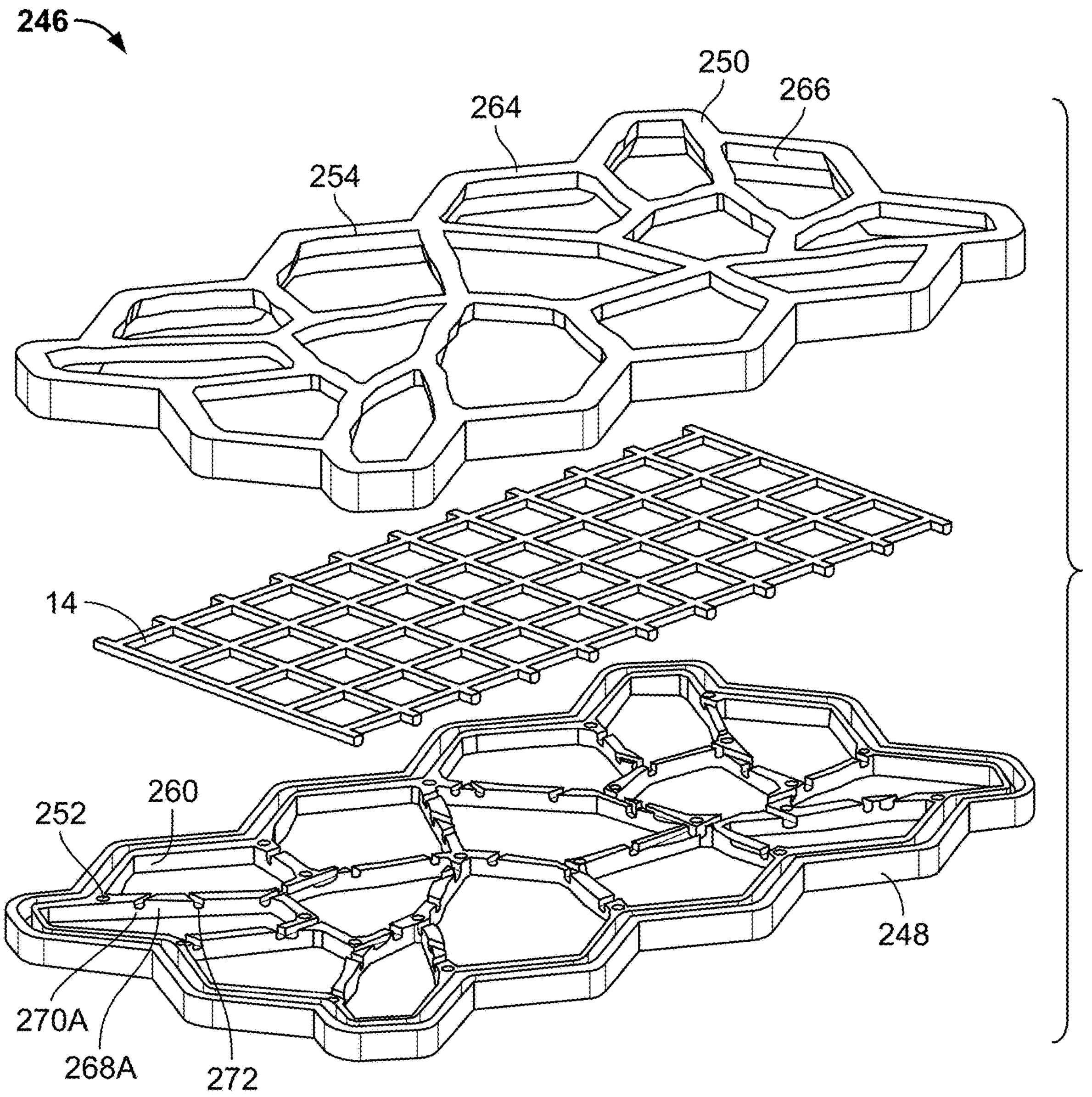
FIG. 50 is an exploded view of one of multiple mold assemblies that incorporate a universal geogrid.
Figure 51:
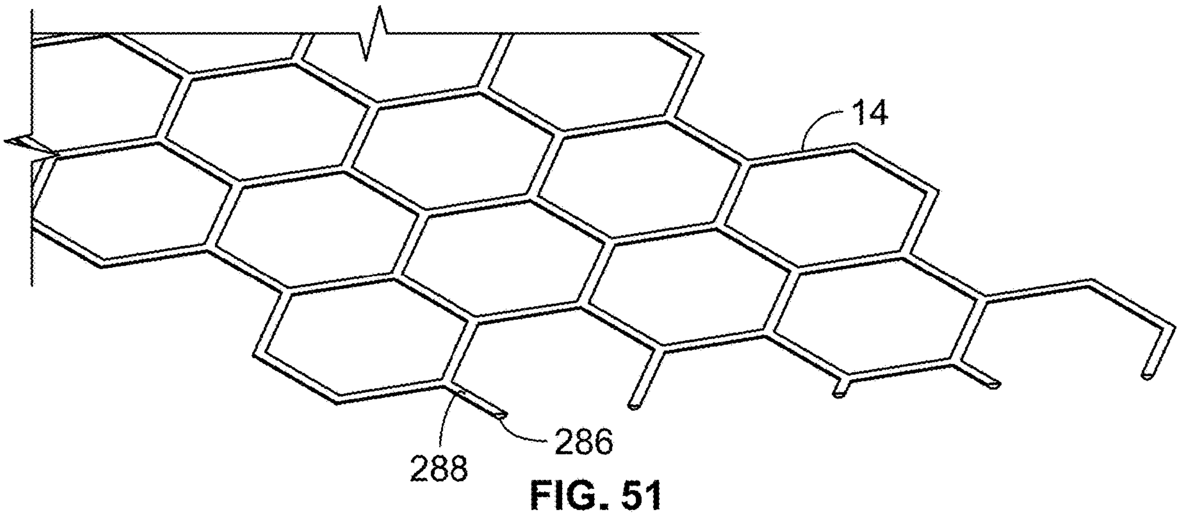
FIG. 51 is an orthogonal cross-section of a hexagonal geogrid.

Referring to FIG. 49, the first and second magnets 274, 276 comprise one or more magnets that are received into a friction-fit plug 278. When the molds 248, 250 are initially cast, a recess 280 that receives the magnets 274, 276 is formed larger than the magnet size. This provides a clearance between the magnet 274, 276 and the molds 248, 250.

After the mold 248, 250 is cured, rubber (or other viscous material that cures) forming the friction-fit plug 278 is deposited into the recess 280 and the magnets 274, 276 are pressed into the recess. Ribs 282 may be formed as the rubber flows between the molds 248, 250 and the magnets 274, 276 into side recesses 284 in the mold and/or magnets. The friction-fit plug 278 will secure the magnets 274, 276 into the recess 280.

With respect to the resulting shape of the units 12 formed by the mold assembly 246 having the magnetic latch 252, it is contemplated that the molds 248, 250 may be sized and shaped differently to accommodate the magnetic latch 252. Specifically, it is contemplated that the angle or profile of the transverse walls 260, 266 may have to be modified from the corresponding transverse walls 160, 166 of the mold assembly 146 to accommodate the magnetic latch 252.

Another feature of the process for the formation of articulating composite surface covering mats 10 is that a universal geogrid 14 is used with multiple mold assemblies 46, 146, 246 that can define different mats having different shapes and sizes of spaced apart units 12. The term "universal geogrid" as used herein is to denote a geogrid that can be used with multiple mold assemblies, where the locations of the nodes and spans (i.e. the positive space) and the locations of the apertures between the nodes and spans (i.e. the negative space) of the geogrid are known relative to the transverse walls 266, 260 of multiple mold assemblies, so that the positive space of the geogrid is received into the cavity 272 and not over the top of the sealing walls (i.e. so that the positive space does not interfere with the ability of the top mold 250 to seal with the bottom mold 248). In other words, the universal geogrid 14 can be received in each of the multiple mold assemblies having differing shapes such that the positive space of the universal geogrid 14 is received between the cavity walls 270A, 270B of the top mold 250 and the bottom mold 248, and there is only negative space of the geogrid at the engagement of the top mold sealing walls 268B to the bottom mold sealing walls 268A, i.e the positive space of the universal geogrid does not intersect with the engagement of the upper sealing walls and the bottom sealing walls, except at the cavities 272. To accomplish this, the multiple mold assemblies 246 have the locations of the cavities 272 for receiving the geogrid at predetermined locations according to the geometry of the universal geogrid 14 that is to be used with the corresponding multiple mold assemblies.

Many different geogrids 14 can be used, however one preferred geogrid is rectangular and has a rounded base 286 and a flat top 288 (see FIG. 49). Referring to is FIG. 51, a most preferred geogrid 14 is hexagonal and also has the rounded base 286 and the flat top 288. The rounded base 286 facilitates the placement of the geogrid 14 into the mold assembly 246 and also allows the fill material to more completely fill underneath the geogrid. The hexagonal geogrid does not have 90-degree corners, making it easier for the flow of plastic or other material to more easily flow throughout the geogrid during manufacture of the geogrid itself. Further, the flat top 288 allows a simpler mold assembly 246 to be built that utilizes a rounded bottom mold 248 and a flat top mold 250. The flat top 288 also makes the geogrid molding process easier and less expensive.

While particular embodiments of mats 10 and methods of making same have been described herein, it will be appreciated by those skilled in the art that changes and modifications may be made thereto without departing from the invention in its broader aspects as set forth in the following claims.

The invention claimed is:

1. A process for the formation of an articulating composite surface covering mat which comprises spaced apart units that are held together by a geogrid, the process comprising the steps:

disposing a bottom mold on a substantially level surface, wherein the bottom mold has a generally planar bottom surface that defines the top surface of the formed mat, and transverse walls extending from the bottom surface of the bottom mold;

locating a geogrid such that the geogrid extends into each of the spaced apart units to be formed;

placing a top mold over the bottom mold to form the mold assembly, wherein the top mold has a generally planar top surface and transverse walls extending therefrom, wherein at least one of the top mold and bottom mold is flexible;

sealingly engaging at least a portion of the transverse walls of the top mold with corresponding transverse walls of the bottom mold;

latching the top mold to the bottom mold into a sealed engagement with a magnetic latch that includes at least one first magnet located in the top mold and at least one second magnet located in the bottom mold; and adding a filler to the mold assembly through openings in the top mold.

2. An articulating composite surface covering mat, comprising:

multiple units having a natural or irregular appearance and formed of a filler, each having an irregular peripheral shape as viewed in plan view;

a flexible geogrid extending through and between each of the multiple units to define the mat;

a peripheral surface of the mat defined by segments of peripheral surfaces of at least some of the multiple units, the peripheral surface of the mat having at least three sides, wherein at least two of the at least three sides comprise the segments of the peripheral surfaces of the multiple units defining S-curve geometry, wherein at least two of the three sides of the mat has a center point, and a first segment of the side is a 180-rotation of a second segment of the side about the center point;

wherein the mat comprises two sides, two ends, and four corners, and wherein the mat can articulate in at least five directions including side-to-side, end-to-end, corner-to-corner, opposite corner to corner, and twist.

* * * * *